(12) United States Patent
Chaganti et al.

(10) Patent No.: US 12,254,879 B2
(45) Date of Patent: Mar. 18, 2025

(54) DATA PROCESSING IN A MULTI-ASSISTANT SYSTEM

(71) Applicant: Amazon Technologies, Inc., Seattle, WA (US)

(72) Inventors: Ramya Chaganti, San Jose, CA (US); Mark Lawrence, Bainbridge Island, WA (US); Ryan McCrate, Kirkland, WA (US); Melanie C B Gens, Honolulu, HI (US); Andrew Smith, Seattle, WA (US); Raja Bose, San Jose, CA (US); Zexiong Yan, Hamburg (DE); Jyoti Chhabra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 354 days.

(21) Appl. No.: 17/952,630

(22) Filed: Sep. 26, 2022

(65) Prior Publication Data

US 2024/0105171 A1    Mar. 28, 2024

(51) Int. Cl.
| | | |
|---|---|---|
| *G10L 15/22* | (2006.01) | |
| *G10L 15/06* | (2013.01) | |
| *G10L 15/08* | (2006.01) | |
| G06F 3/16 | (2006.01) | |
| G10L 13/00 | (2006.01) | |

(52) U.S. Cl.
CPC ............ *G10L 15/22* (2013.01); *G10L 15/063* (2013.01); *G10L 15/08* (2013.01); *G10L 2015/088* (2013.01); *G10L 2015/223* (2013.01)

(58) Field of Classification Search
CPC ....... G10L 15/22; G10L 15/063; G10L 15/08; G10L 2015/088; G10L 2015/223; G10L 13/00; G06F 16/90332; G06F 2221/2149; G06F 21/32; G06F 21/62; G06F 21/6245; G06F 3/167; G06N 20/00; H04L 63/105
See application file for complete search history.

(56) References Cited

U.S. PATENT DOCUMENTS

| | | |
|---|---|---|
| 9,418,663 B2 | 8/2016 | Chen et al. |
| 10,971,158 B1 | 4/2021 | Patangay et al. |

(Continued)

OTHER PUBLICATIONS

International Search Report and Written Opinion mailed on Nov. 29, 2023 for International Patent Application No. PCT/US2023/032694.

*Primary Examiner* — Daniel C Washburn
*Assistant Examiner* — Penny L Caudle
(74) *Attorney, Agent, or Firm* — Pierce Atwood LLP

(57) ABSTRACT

Techniques for enabling access in a multi-assistant speech processing system are described, where a first assistant system may use components of a second assistant system as data processing components. Runtime operational data and user input data related to the first assistant may be kept separate from the processing data and input data related to the second assistant by propagating a first account ID, for user inputs directed to the first assistant, through the processing pipeline, and using a second account for user inputs directed to the second assistant. A mapping between the first account ID and the second account ID may be accessible to a select number of system components. Handoffs between the two assistants are handled in a manner where data related to one assistant is not accessible by the other assistant.

20 Claims, 18 Drawing Sheets

(56) References Cited

U.S. PATENT DOCUMENTS

| | | |
|---|---|---|
| 10,971,173 B2 | 4/2021 | Kothari et al. |
| 11,120,790 B2 | 9/2021 | Mahmood et al. |
| 11,538,478 B2 | 12/2022 | Bobbili et al. |
| 2022/0180867 A1* | 6/2022 | Bobbili .................. G10L 15/30 |

* cited by examiner

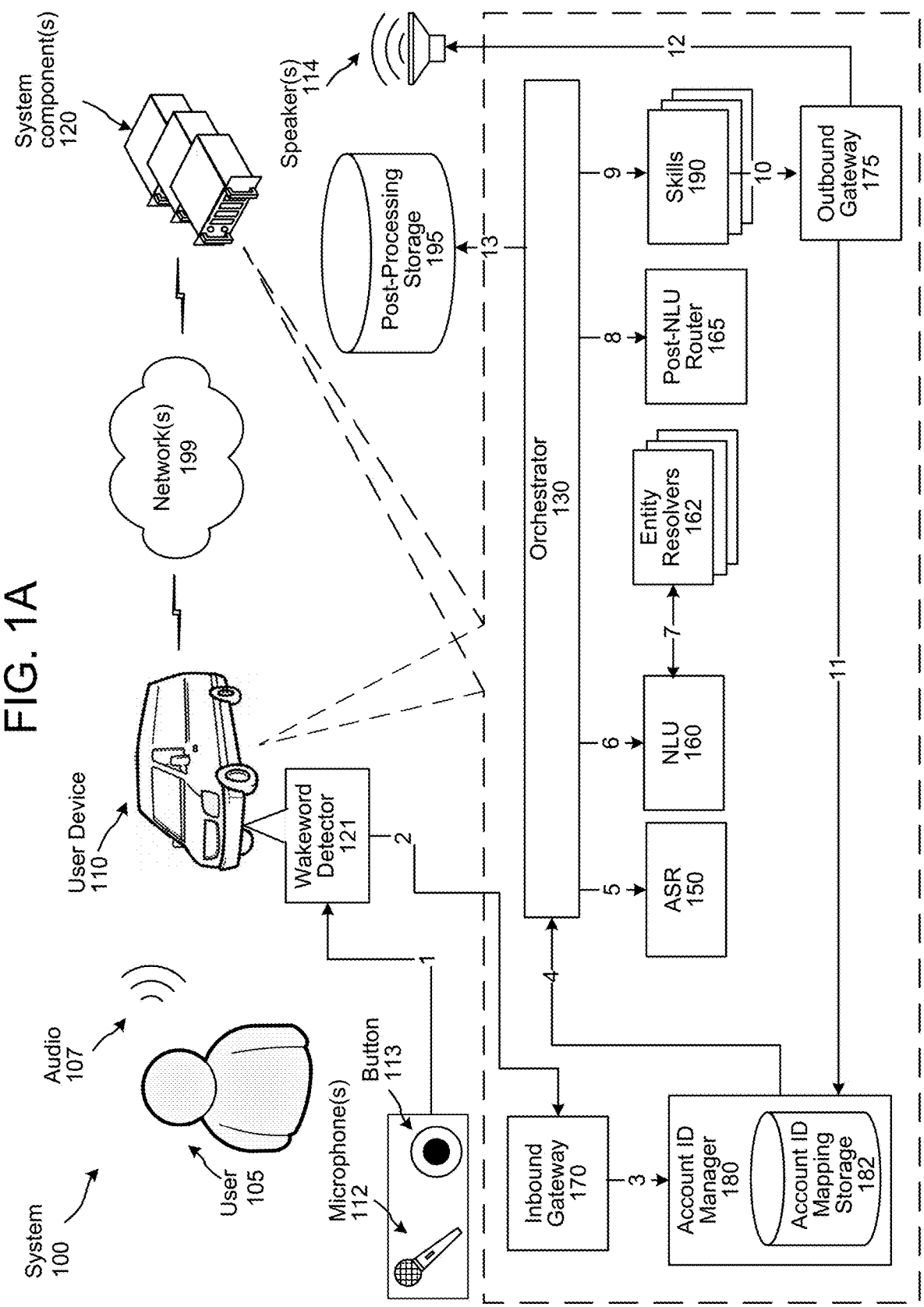

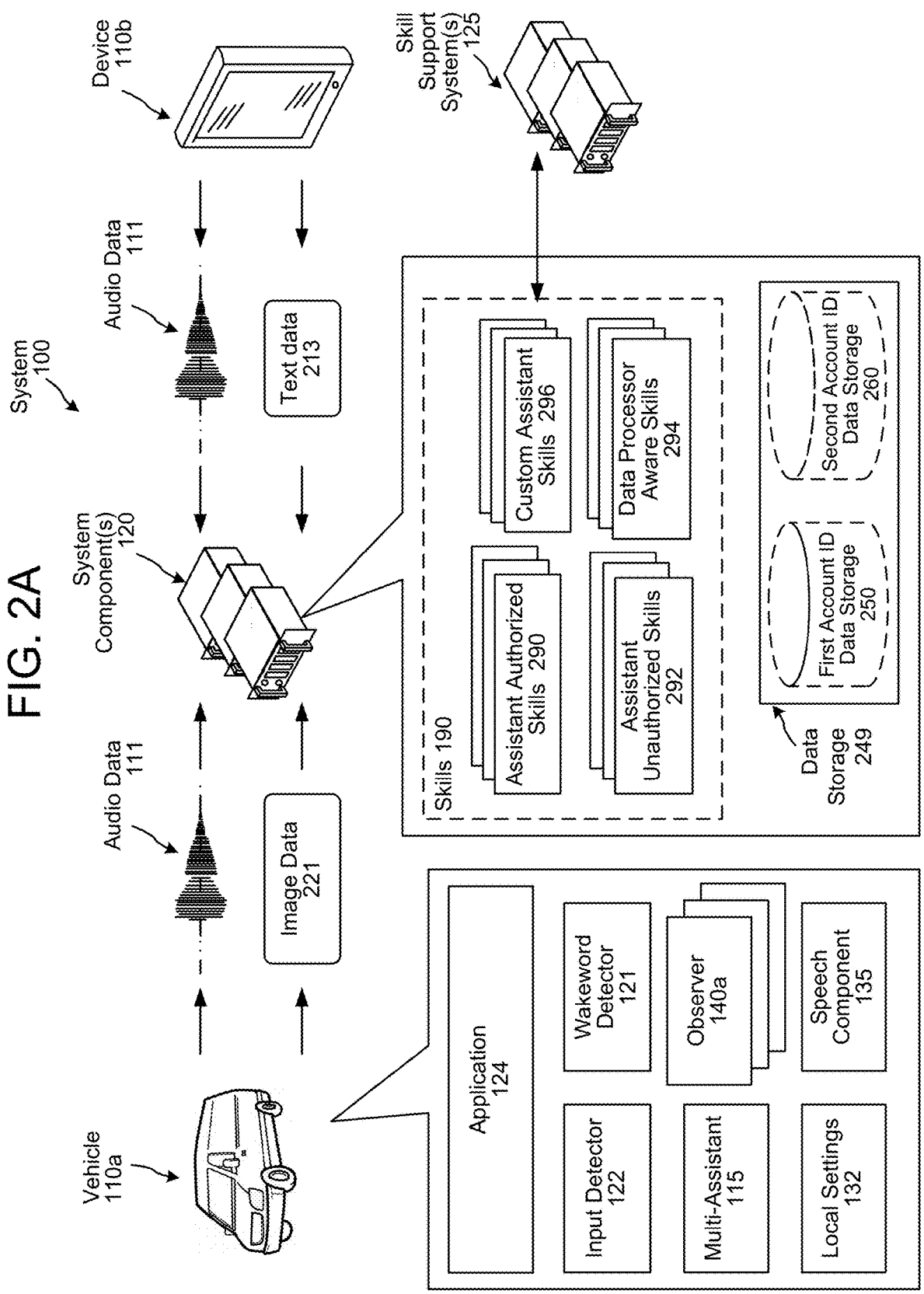

FIG. 2C

| Data Storage 249 | | | |
|---|---|---|---|
| First Portion of Data 252 | User ID | First Account ID | Device ID | Vehicle Sensors |
| | User ID | First Account ID | Device ID | Vehicle Settings |
| | User ID | First Account ID | Device ID | Tunable Stations |
| Second Portion of Data 254 | User ID | Second Account ID | Device ID | Smart Home Devices |
| | User ID | Second Account ID | Device ID | Media Providers |
| | User ID | Second Account ID | Device ID | Account Preferences |

. . .

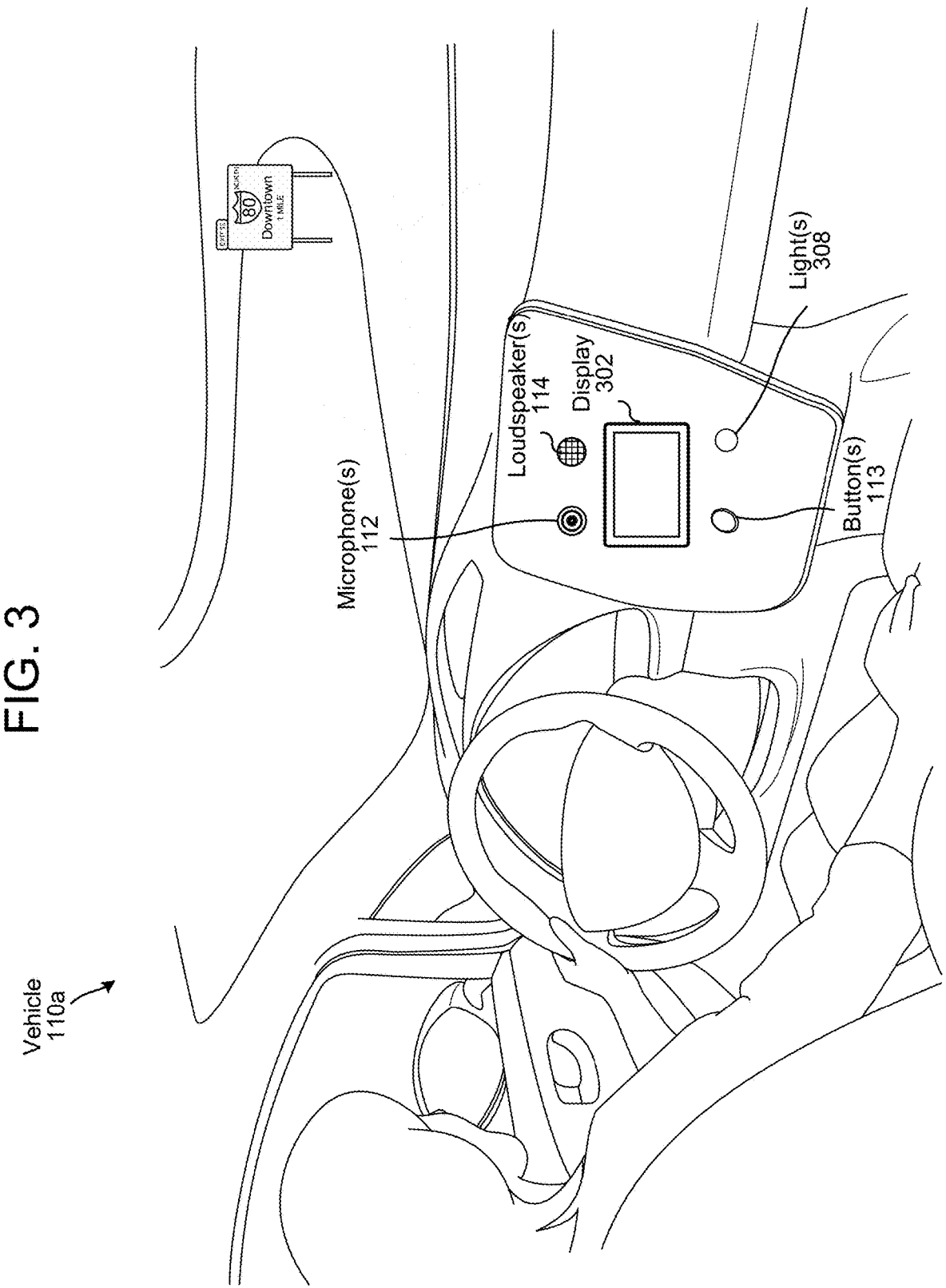

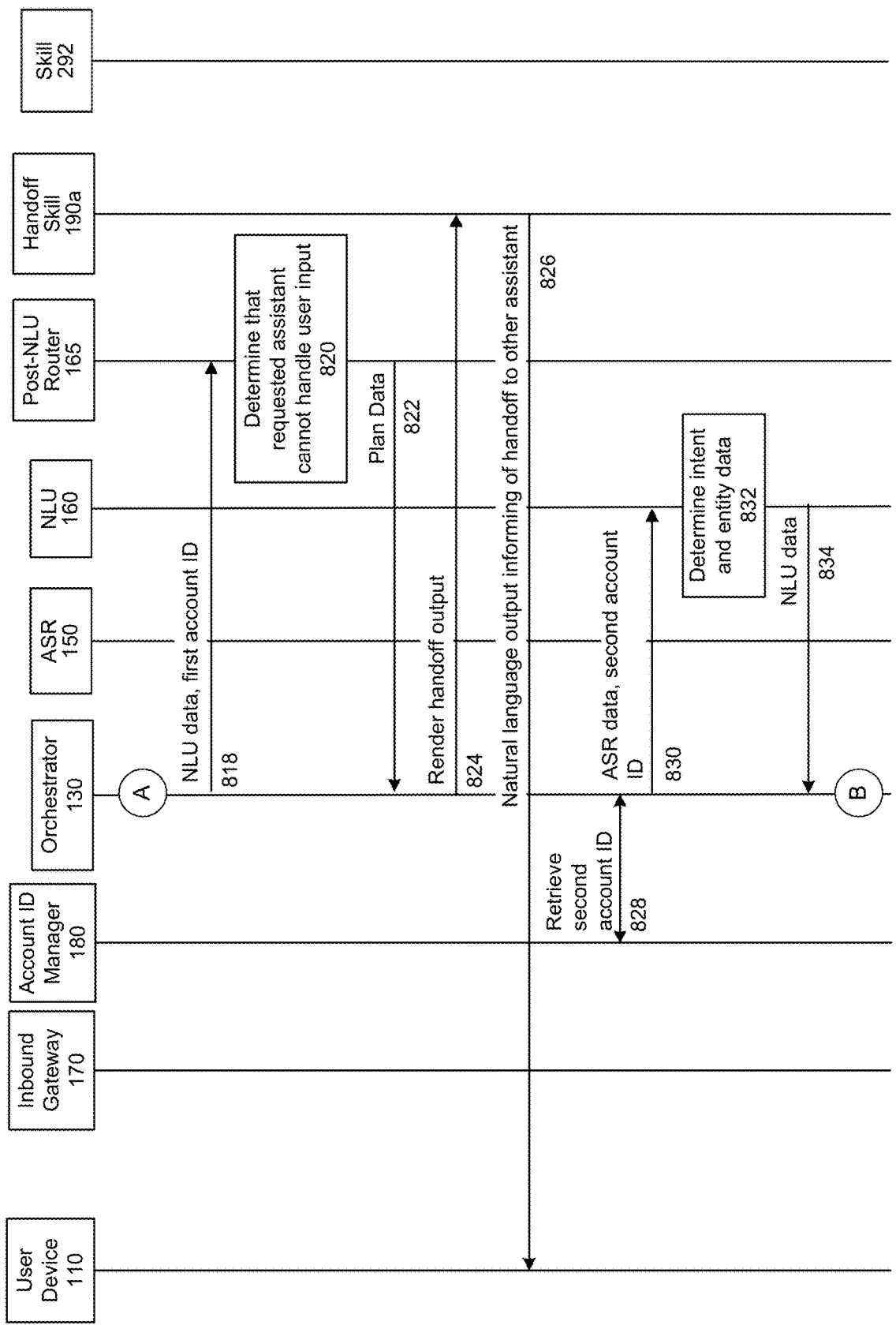

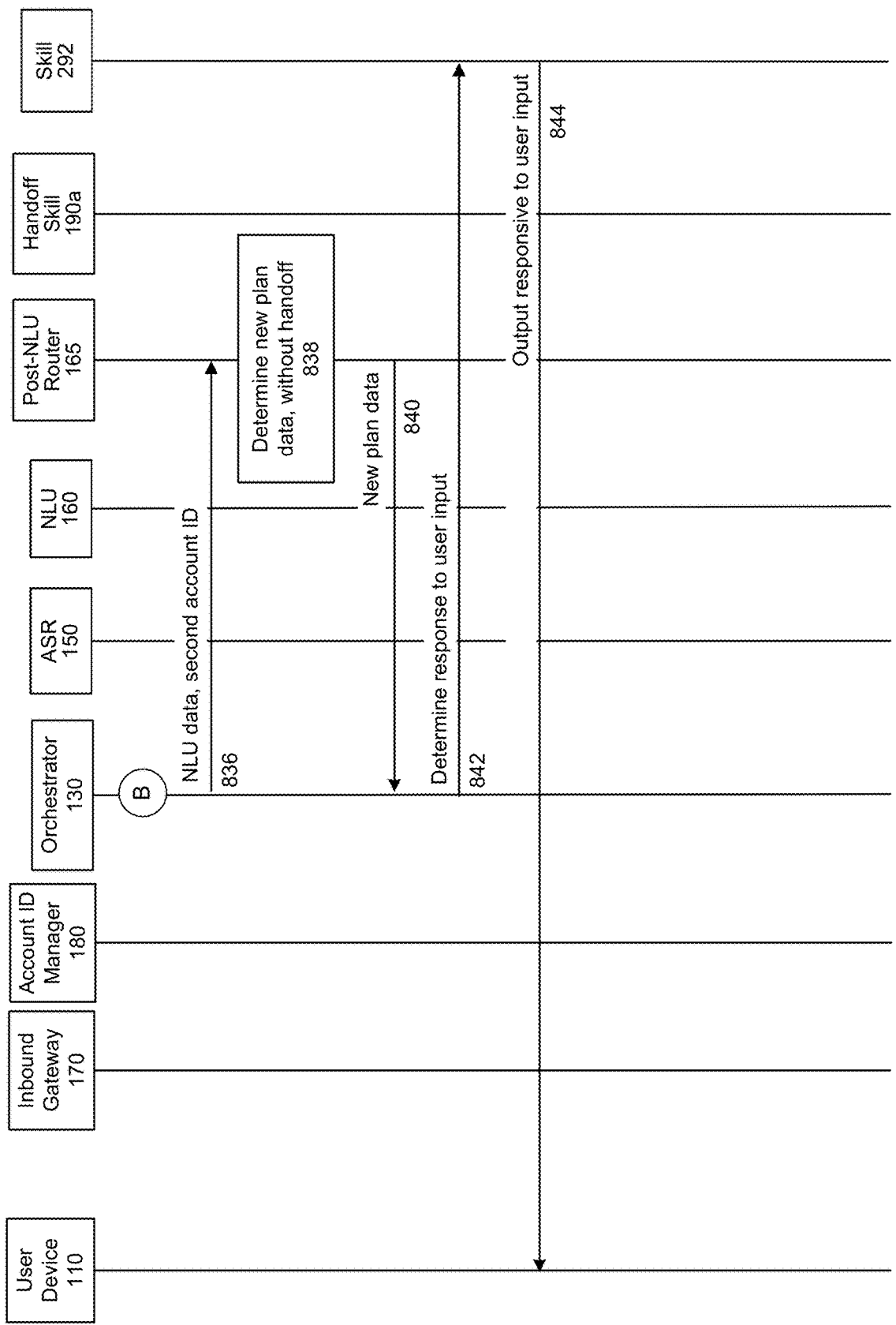

DATA PROCESSING IN A MULTI-ASSISTANT SYSTEM

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a conceptual diagram illustrating components of a system allowing interaction with multiple assistant systems, according to embodiments of the present disclosure.

FIG. 2A is a conceptual diagram illustrating system components for processing involving multiple assistants, according to embodiments of the present disclosure.

FIG. 2C illustrates example data that may be stored in a data storage for different assistant systems.

FIG. 3 illustrates a vehicle-based user interface according to embodiments of the present disclosure.

FIGS. 8A-8C are a signal flow diagram illustrating how a handoff from one assistant to another assistant may be performed, according to embodiments of the present disclosure.

DETAILED DESCRIPTION

Figure 1B:
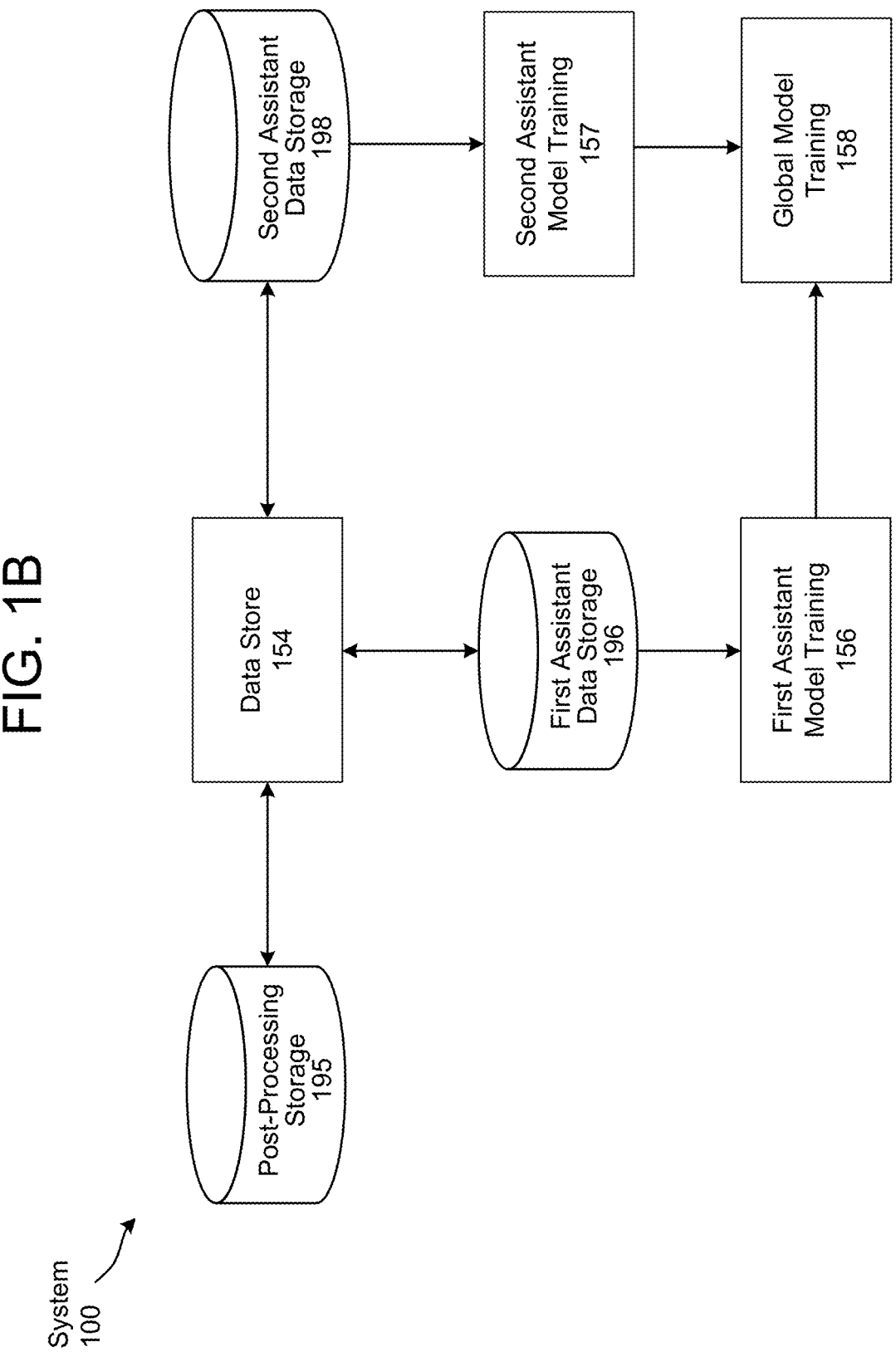
FIG. 1B is a conceptual diagram illustrating components of a federated learning system, according to embodiments of the present disclosure.

Speech processing systems and speech generation systems have been combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into word data (e.g., text data, token data, etc.) representative of that speech. Similarly, natural language understanding (NLU) is a field of computer science, artificial intelligence, and linguistics concerned with enabling machines to derive meaning from inputs containing natural language. ASR and NLU may be used together as part of a speech processing system, sometimes referred to as a spoken language understanding (SLU) system. Natural language generation (NLG) is a field of artificial intelligence concerned with automatically transforming data into natural language (e.g., English) content. Text-to-speech (TTS) is a field of computer science concerning transforming natural language data into audio data that is synthesized to resemble human speech. ASR, NLU, NLG, and TTS may be used together as part of a speech-processing system. The assistant can leverage the speech-processing system as well as additional skill components to perform tasks for and/or on behalf of the user.

A voice-controlled user device and/or other system components may be configured to receive a spoken user input and, using ASR, detect a wakeword and/or other words in the user input. The device(s) may determine a command related to the user input using NLU and provide a response to the command using NLG, TTS and/or other components. In some embodiments, the device(s) may be configured to detect a gesture, that is, a non-verbal movement detectable by the device. The device(s) may be configured to process a spoken user input received with and/or following a detected gesture. A user may thus control the voice-controlled user device, another user device, and/or the system component(s) by voice. In some embodiments, in response to the user device detecting the wakeword and/or gesture, the user device may send input data representing the user input to the system component(s) for further processing. The system component(s) may further process the input data to verify that it includes a representation of the wakeword, determine the command, determine a skill component to respond to the command, etc. The user device may then receive, from the system component(s), output audio, video, or other data related to a response to the command and/or other data needed to perform an action associated with the response.

A user may be able to interact with more than one assistant using the speech-processing system. One assistant may be configured to offer a different user experience than another assistant. Each assistant may be associated with commands and/or responses to those commands unique to that assistant. In one example, a first assistant may be associated with device control (such as control of a vehicle), while another assistant may be associated with general informational commands or queries. In another example, a first assistant may be preferred by a user for online shopping, while a second assistant may be preferred for navigation. A user may thus wish to direct online-shopping commands to the first assistant, and wish to direct navigation commands to the second assistant. A user may invoke a particular assistant with a wakeword and/or a gesture (e.g., a non-verbal movement) associated with that assistant. For example, a first assistant may be invoked using the wakeword "Alexa," while a second assistant may be invoked using the wakeword "Car." Wakewords and/or gestures may be set by system default and/or may be user-assignable. One assistant system may be configured to handle certain operations (e.g., a system for "Alexa" handling general interactions, informational requests, etc.) while another assistant system may be configured to handle other operations (e.g., a system for "Car" handling commands and requests related to a vehicle). In addition to being associated with its own, maybe unique, interpretation of user inputs and/or commands, each assistant may provide its own, maybe unique responses, and/or may otherwise be perceived as having a particular "personality." This personality may include, for example, a particular albeit artificial speaking voice, style, etc., such as a "newscaster," a "celebrity," etc. An assistant may respond with synthesized speech (generated by, for example, the TTS component) exhibiting aspects (e.g., audio characteristics) corresponding to the personality. Thus one assistant may have a different voice from another assistant. A user may thus come to associate a certain assistant with a certain personality, and thus recognize synthesized speech as being associated with a particular assistant by recognizing the personality.

Functions of an assistant may be provided by the system components. The system components may include settings and/or resources used for speech processing to provide the functions of the corresponding assistant. In some embodiments, the assistants may share certain resources of a speech-processing system; for example, the ASR component(s), NLU component(s), and/or TTS component(s). In other embodiments, however, each assistant may have its own dedicated ASR component(s), NLU component(s), and/or TTS component(s). In certain system configurations one assistant's system may be functionally more capable of performing various operations than another assistant's system, particularly if the first system is a more general system with more users, more computing resources, or the like.

An assistant may be associated with different back-end applications, and/or other types of skill components. For example, a first assistant may be associated with a shopping skill component and a second assistant may be associated with a vehicle navigation skill component. In addition or in the alternative, a first assistant and second assistant may share skill components, for example, they may share a navigation skill component while only the first assistant has access to a device control skill component and only second assistant has access to a shopping skill component. In addition or in the alternative, a first assistant and second assistant may have access to different skill components that perform the same (or similar) operations. For example, the first assistant may have access to a first navigation skill component while the second assistant has access to a second navigation skill component. As can be appreciated, many different arrangements of assistant architecture, skill component access, settings, etc. may be configured.

An assistant may be associated with certain settings and/or other data maintained in a respective or shared assistant metadata component. An assistant metadata component may include information regarding functionality of assistants, such as which assistants are available with respect to a particular device and/or location, and which commands and/or skill components are associated with an assistant. The assistant metadata component may include information regarding user experience, such as which wakewords and/or gestures are associated with an assistant, light patterns and/or images that give a visual indication of the active assistant, TTS parameters and settings for giving an assistant a distinctive voice, etc. In some implementations, assistant-specific data such as intent, entity libraries, etc., may be provided to language processing components to streamline and/or augment language processing, and provide more accurate results. In cases where two (or more) assistant systems may share skill components (e.g., the first assistant system is authorized to invoke a first skill component and the second assistant system is also authorized to invoke the first skill component), the system may include policies and/or other types of rules configured to indicate which assistant will handle responding to a user input.

In some situations, direct sharing of certain information (particularly utterance information, user information, assistant information, etc.) between a first assistant and second assistant may not be desired. Even in a situation where a first assistant and second assistant may each be invoked from the same user device, the assistant systems themselves may be configured to prevent sharing of information directly between them or between their respective components, even if those components may operate on the same device. This may be for a number of reasons. First, a user may have one set of permissions with a first assistant that does not allow sharing of certain data to a second assistant. Such user settings may not permit sharing of user utterance information to an assistant that was not directly invoked by the user. Thus protection of user privacy may prevent communication between different assistant components. Second, a user may be permitted to interact with a first assistant but not a second assistant, such as when the user is a child and the first assistant is authorized for child use but the second assistant is not. Third, a first assistant may be configured to process certain type of confidential or private data of the user (e.g., health-related data, personally identifiable data, etc.) that a second assistant is not permitted to access. Thus it may not be desired to share information directly between different assistant system components.

The present disclosure describes techniques for performing speech processing and related processing while maintaining separation of certain data, such that processing data associated with one assistant is not accessible/visible by another assistant which should not have access to the certain data. The present disclosure describes techniques for performing such processing while both protecting the certain data and while using certain shared system components. The system components, in some embodiments, may include an orchestrator component, an ASR component, a NLU component, a post-NLU router component, some skill components, etc. The system components may be under the control of (e.g., developed by, maintained by, configured by, etc.) a first assistant system. In sharing the components, the system components may be used to process user inputs directed to the first assistant system and to process user inputs directed to a second assistant system. While the system components may be shared, the data resulting from the processing of the user inputs and other stored data associated with one assistant may not be shared with the other assistant.

Data sharing between assistant systems may occur in cases where a user has authorized such sharing, and the data sharing may be performed in compliance with configured rules, using data anonymization techniques, etc.; however, examples described herein generally relate to cases where such sharing is not approved or desired.

One assistant system (e.g., the foregoing second assistant) may be configured as a data controller, while another assistant system (e.g., the foregoing first assistant that is control of the system components) may be configured as a data processor. For user inputs directed to it, the data controller assistant system may determine the purposes and means for processing user's data, for example, what processing can be performed using the user data, etc. For the user inputs directed to the data controller assistant system, the data processor assistant system may handle the user data strictly in accordance with the data controller's instructions, constraints, etc. to allow for processing of the data while preventing any undesired access to/storage of, the data to be protected.

In a non-limiting example illustrating the data controller and data processor architecture, a user can use an automotive assistant system to access settings for controlling the user's car through in-cabin applications, to access a user voice history through an application provided by the automotive assistant system, etc. The user may invoke the automotive assistant system using a wakeword (e.g., "Car turn on the headlights") or using a Push to Talk (PTT) button in the car. Along with the utterance data, other data that may be used by the automotive assistant system may include sensor data from the car, tunable radio stations, etc. The automotive assistant system may be configured as the data controller, and may instruct another assistant system, which may be configured as the data processor, to process the utterance data and the other data to determine a command inputted by the user and a response to the command. This may be done to allow the automotive assistant system to use potentially more capable processing components of a different assistant system.

The user may optionally link or add an account for another assistant system (e.g., Amazon Alexa) to enable use in the car. The user may invoke the other assistant system using a different wakeword (e.g., "Alexa search for [product]"). The utterance data corresponding to invocation of the automotive assistant system (e.g., through the push of a dedicated button or by saying "Car") is exclusively used by the shared system components while processing that utterance, while the utterance data corresponding to invocation of the other assistant system (e.g., through saying "Alexa") is exclusively used by the shared system components while processing that utterance.

In some embodiments, the utterance data, the runtime operational data, and other data may also be kept separate between the two assistant systems. The utterance data may include, for example, the audio of the utterance, data derived from the audio, such as ASR and NLU interpretations, any raw transcriptions that may be passed to skill components, and any related data that may be used, for example, for training a system component(s). The other data may include personal data, personally identifiable data, etc. Runtime operational data may be read by various system components while processing a user request, and may include, for example, smart home device state, user preferences, skill component configurations, car sensor state, etc.

Some embodiments use different account identifiers (IDs), for a user, to keep data separate between the two (or more) assistant systems. In some embodiments, the account IDs may be generated by the data processor assistant system. The two distinct account IDs may be used to partition all runtime operational data inside the data processor assistant system, where runtime operational data for an individual user request is associated with an account ID. Thus, a first ID that refers to a particular user for a first assistant system may be different from a second ID that refers to the same particular user for a second assistant system. The first account ID may be propagated to the system components while processing a user input directed to the first assistant, and the second account ID may be propagated to the system components while processing a user input directed to a second assistant.

To handle separation of utterance data, the data processor system components may be configured to only route utterances directed to the automotive assistant system to skill components that are authorized to receive data from the automotive assistant system. Additionally or alternatively, the data processor system components that receive data associated with the automotive assistant system may not store the received data long term (e.g., beyond processing of the user input), and may send the data and related processing information to a data store, within the automotive assistant's control, for record keeping, auditing, etc. After processing with respect to a user request is complete, the data processor system components may send the utterance data to the data controller/automotive assistant system. In some cases, utterance data may be discarded after a response to the user request is presented. The components of the data processor system can implement strict permissions policies such that processes of the system that are operating on behalf (e.g., specific instances or based on state) of the data processor system cannot access data associated with the data controller system and vice versa. The permissions policies can be implemented based on associating account IDs or similar identifiers with the data at each stage of the processing including during run-time processing. Any combination of these techniques can be used to separate the access and control of the data between the data processor and the data controller as well as to share the data in specific circumstances.

In some situations, a user may invoke a first assistant for handling a command; for example, using a wakeword and/or a gesture associated with a first assistant. The first assistant may attempt to respond to the command, but not be able to because the skill components, data, etc. available to the first assistant may not be sufficient or configured to do so. In such cases, the system may perform, what is referred to herein as, a handoff from the first assistant to a second assistant, so the second assistant's system can assist with processing the command. A handoff may only be performed if the user has enabled/approved such handoffs, where the enablement/approval may be specifically for handoffs between the first assistant and the second assistant and/or enabled specifically by the user for certain skill components, commands, etc. Handoffs to other assistants may need separate enablement/approval. As discussed herein, the handoffs may be performed in a manner so that processing data related to one assistant is kept separate from certain components of the other assistant.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A is a conceptual diagram illustrating components of a system 100 for processing user inputs received at a user device 110 and that may relate to different assistants, according to embodiments of the present disclosure. The various system components may be located on same or different physical devices, such as the user device 110, the system components 120, and/or another system. Communication between various system components may occur directly or across a network(s) 199. The system 100 may include one or more user devices 110, local to a user 105, in communication, via the network(s) 199, with one or more system components 120, that may be configured to provide speech processing functionalities, assistant functionalities, and other related functionalities. The network(s) 199 may include the Internet and/or any other wide- or local-area network, and may wired, wireless, and/or cellular network hardware. Although the figures and discussion of the present disclosure illustrate certain steps in a particular order, the steps described may be performed in a different order (as well as certain steps removed or added) without departing from the present disclosure.

Some embodiments involve (at least) two assistant systems, where one assistant system is configured as a data controller and the other assistant system is configured as a data processor for the data controller assistant system. For discussion purposes, the description herein uses an automotive assistant system as one example data controller assistant system, and FIG. 1A shows an example of the user device 110 as a vehicle. However, it should be appreciated that other types of assistants and other types of user devices 110 (e.g., devices 110 illustrated in FIG. 12) can be included in the system 100. For example, the system 100 may include a health care assistant system configured as a (an additional or alternative) data controller. As another example, the system 100 may include an assistant system for controlling other types of devices (e.g., a home appliance assistant, a smart home door assistant, a home security assistant, etc.). As yet another example, the system 100 may include an assistant system for performing other types of actions (e.g., a food ordering assistant, an organization assistant, etc.). For the foregoing examples, the data processor assistant system may be the same assistant embodied in the system component(s) 120, or may be another separate system embodied in separate/different system components.

As described herein, the system 100 may propagate a first account ID, for the user 105 and associated with the automotive assistant, to the system component(s) 120 for processing a user input directed to the automotive assistant, and may propagate a second account ID, for the user 105 and associated with the other assistant, to the system component(s) 120 for processing a user input directed to the other assistant. Some of the system components, for example, an inbound gateway 170 and/or an orchestrator component 130, may have access to both of the account IDs at the same time, for example, via an account ID manager 180, to convert from one account ID to another based on the assistant for which the user input is being processed. The orchestrator component 130 may send the appropriate account ID to the other system components for processing a user input. The other system components, such as an ASR component 150, an NLU component 160, a post-NLU router 165, a skill component 190, etc., may not have access to both of the account IDs at the same time. Instead, the other system components uses the account ID received from the orchestrator component 130 to determine how the user input is processed, what data is used to process the user input, etc.

Figure 12:
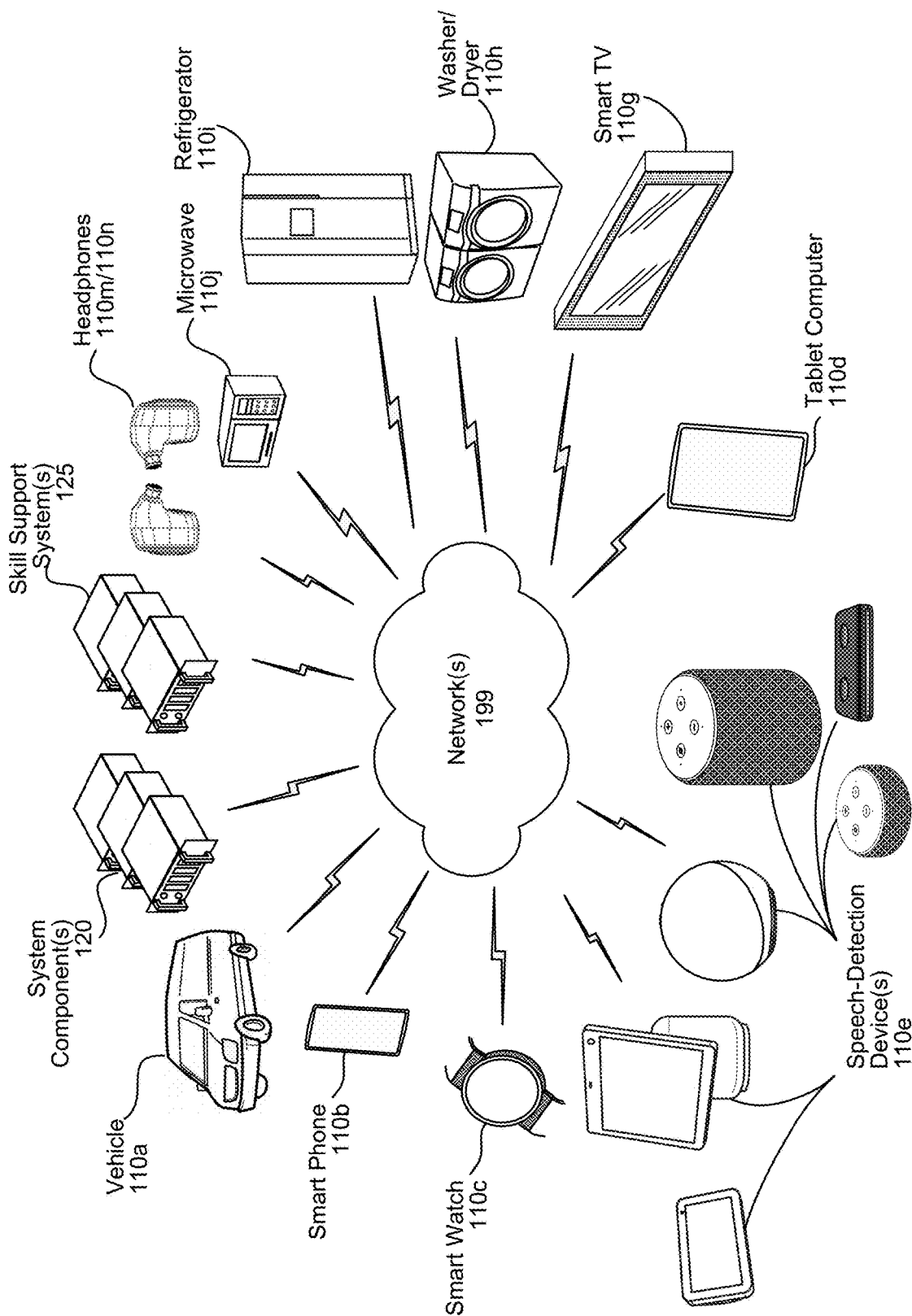
FIG. 12 illustrates an example of a computer network for use with the overall system, according to embodiments of the present disclosure.

FIG. 12 illustrates other example user devices 110 that may be part of the system 100 such as a smart phone 110b, a smart watch 110c, a speech-detection device with display 110f, a refrigerator 110i, headphones 110m/110n, etc. The user device 110 may include various components for input and output such as one or more microphones 112, one or more buttons 113, one or more speakers 114, etc. In some implementations, the button(s) 113 may be touch sensitive (e.g., non-mechanical), a softkey (e.g., programmable to have different functions or trigger different operations), and/or be presented via a touchscreen (e.g., display 302 shown in FIG. 3), etc. In some examples, the button(s) 113 may be attached to and/or integrated within a vehicle 110a (e.g., such as steering wheel-mounted controls of the vehicle 110a).

At least one of the buttons 113 may activate the microphone 112 and allow the system 100 to receive verbal commands and requests from a user. In some implementations, the system 100 may detect various gestures (e.g., non-physical movements) that indicate the system 100 is to receive an input such as audio 107. The system 100 may respond to the user 105 by various means including synthesized speech (e.g., emitted by the speaker(s) 114) conveying a natural language message.

In other examples, a (first) user device 110 may be in communication with another (second) user device 110 that may be used to operate the first user device, may facilitate communications between the first user device and the system component(s) 120, etc. For example, a smart phone 110b may include a vehicle control app, a speech controlled app, etc. that may be enabled to receive inputs from the user 105 to operate various functionalities of a vehicle 110a.

The user device 110 may provide the user 105 access to one or more assistants. An assistant may be configured with certain functionalities that it can perform for and/or on behalf of a user. An assistant may further be configured with certain identifying characteristics that may be output to the user 105 to indicate which assistant is receiving an input (e.g., listening via the microphone 112), processing (e.g., performing ASR, NLU, and/or executing actions), and/or providing output (e.g., speaking via synthesized speech). A user may invoke a particular assistant by, for example, speaking a wakeword associated with that assistant. The system 100 may determine which assistant is to handle the utterance, and process the utterance as described below.

As shown in FIG. 1A, the user 105 may speak an utterance represented by audio 107. The user device 110 may capture the audio 107 using the microphone(s) 112. The user device 110 may include a wakeword detector 121, which may process the captured audio 107 to determine whether a wakeword is included in the spoken input, and/or which wakeword is included in the spoken input. The microphone(s) 112 may send (step 1) the audio 107 to the wakeword detector 121 for processing. In some embodiments, an indication of the button(s) 113 being activated may also be received (e.g., in step 1) by the wakeword detector 121.

The wakeword detector 121 may determine that audio data corresponding to the audio 107 contains a representation of a wakeword (as described in greater detail below); the user device 110 may thereafter send the audio data to the system component(s) 120 for processing. The user device 110 may instead or in addition send the audio data to the system component(s) 120 when an input detector 122 (shown in FIG. 2A) detects an input—such as a key press, button press, touch-screen touch—corresponding to sending the audio data is detected. An example button 113 is a "Push to Talk" button. The button and/or the input detector 122 may be capable of differentiating gestures such as tap-to-talk, push-and-hold, double-click, etc. In any event, the user device 110 receives the audio 107, and sends corresponding input data to the system component(s) 120 or other system components as audio data 111, text data 213, a phonetic representation of the command, etc. For purposes of illustration in FIG. 1A the components and operations are shown either executed by components of user device 110 and/or system component(s) 120 however the components may be distributed among many different devices/components according to the system. As described in FIG. 2D, additional language processing and command execution operations can be performed on the device 110, and the disclosure is not limited by whether the user device 110 and/or system component(s) 120 performs operations described herein.

In some embodiments, the microphone(s) 112 may capture the audio 107 in response to the user 105 activating the button(s) 113. In such cases, sometimes the spoken input may not include a wakeword. If a wakeword is not included, the system component(s) 120 may determine that the spoken input corresponds to the automotive assistant system based on the button(s) 113 being associated with/included in the user device/vehicle 110.

The user 105 may use different wakewords to invoke different assistant systems and associated functionalities. The wakeword detector 121 may be configured to detect different wakewords. In some embodiments, the user device 110 may include separate wakeword detectors, each may be configured to detect a different individual wakeword, one or more wakewords associated with an individual assistant system, a set of wakewords associated with multiple assistant systems, etc. As a non-limiting example, the user 105 may use the wakeword "Car" to invoke the automotive assistant system. As another non-limiting example, the user 105 may use the wakeword "Alexa" to invoke the other assistant system, which may be configured as the data processor for the automotive assistant system.

If the wakeword detector 121 determines that the spoken input includes a representation of a wakeword, then the wakeword detector 121 may send (step 2) audio data (e.g., audio data 111 shown in FIGS. 2A-2C) and other related data to an inbound gateway 170 for processing. In some embodiments, the audio data, received by the inbound gateway 170, may include the representation of the wakeword. In other embodiments, the audio data may not include a portion of the audio data that corresponds to the wakeword. The wakeword detector 121 may send other data including an indication of the button(s) 113 being activated, if that is the case. The other data may also include an indication of which wakeword is represented in the spoken input; for example, the other data may be text data, token data or other word representation data indicative of the wakeword (e.g., "Alexa", "Car", etc.); as another example, the other data may include an alphanumerical, Boolean value, or another type of data corresponding to a specific wakeword or specific assistant system (e.g., "1" corresponding to "Car", "2" corresponding to "Alexa", "A" corresponding to the automotive assistant system, "B" corresponding to the other assistant system, etc.). The other data may include another invoking input (touch input, gesture, etc.) so the system component(s) 120 has data that can be used to determine which assistant is invoked by the user 105.

Other data that may be sent by the user device 110 to the system component(s) 120 may include the identity of the user 105 who spoke the utterance (if the user device 110 is configured to determine such data), timing of the input audio and other inputs (for example, time of utterance start, time of utterance completion, utterance duration, etc.), device ID of the user device 110 that captured the utterance, device type, state data for the user device 110, etc.

As described herein, the system component(s) 120 may correspond to another assistant (e.g., Amazon Alexa) that acts as data processor for the automotive assistant system. The user 105 may, in some cases, have an account and associated account ID for the assistant system of the system component(s) 120. The user device 110 may maintain a standing connection with the system component(s) 120; in some examples, in particular with the inbound gateway 170. The connection may be established with an authentication token that identifies a data source name (DSN) of the user device 110 and an account ID of the user 105 for the other assistant. The user device 110 may send a new request/message and start transmitting audio, and other data (which may be included in the request), when the wakeword is recognized. In the example illustrated in FIG. 1A, the other data may include the device ID for the vehicle 110, and may also include a (first) account ID for the user 105 for the automotive assistant system. The request and data may be received (step 2) by the inbound gateway 170.

The system component(s) 120 may include an account ID manager 180. The account ID manager 180 may include an SDK to receive and send requests to the system components. The account ID manager may also include an account ID mapping storage 182, as shown in FIG. 1A. The account ID manager 180 may maintain an association between an initial (first) account ID, which is created when the vehicle 110 is activated and linked to the automotive assistant system, and a (second) account ID for the other assistant acting as a data-processor. The system component(s) 120 may set up and maintain these mappings through a new capability agent and events. The account ID manager 180 may be configured to ensure that whenever the user 105 uses a particular wakeword, the system component(s) 120 only uses the corresponding account ID while processing the user input.

In some cases, the user 105 may not have an account set up with the data processor system/the other assistant system. In such cases, the system 100 may create a placeholder or an otherwise default account, which may enable user access to a limited set of functionalities (e.g., a weather skill component, etc.). The account ID manager 180 may map the default account ID to the first account ID of the automotive assistant system. When, and if, the user 105 sets up an account with the data processor system/the other assistant system, the account ID manager 180 may replace or otherwise modify the mapping, so that the account ID for the user-created account is mapped to the first account ID.

Using separate account IDs the system component(s) 120 can ensure that the runtime operational data for the automotive assistant and the other assistant is segregated between the system components without additional configurations needed to the components. For example, the ASR component 150, the NLU component 160, the post-NLU router 165, etc. may access data related to the automotive assistant system based on receiving a first account ID associated with the automotive assistant system. As another example, the ASR component 150, the NLU component 160, the post-NLU router 165, etc. may access data related to the other assistant system based on receiving a second account ID associated with the other assistant system.

In some embodiments, the inbound gateway 170 may send the request, created in response to the user 105 providing an input via the user device 110, to the account ID manager 180 in certain situations. In one example embodiment, the user device 110 (e.g., the vehicle) may be associated, as default, with an account for the automotive assistant system, such the system 100 expects user inputs received at the user device 110 to be relating to the automotive assistant system. As such, a request from the user device 110, in response to receipt of a user input, may include the first account ID for the automotive assistant, regardless of which wakeword is included in the user input. In cases where the user input invokes the other assistant system, the inbound gateway 170 may send the request to the account ID manager 180 to determine the second account ID of the user 105, so that the user input is processed according to the other assistant system. In one example, for a user input "Alexa, play music" received at the vehicle 110, the inbound gateway 170 may receive a request including a first account ID for the automotive assistant system, may determine that the user input relates to the other/data processor assistant system based on the wakeword "Alexa", and may send the request to the account ID manager 180 to convert the first account ID to a second account ID associated with the other/data processor assistant system. In another example, for a user input "Car, open the windows" received at the vehicle 110, the inbound gateway 170 may receive a request including the first account ID for the automotive assistant system, may determine that the user input relates to the data controller/automotive assistant system based on the wakeword "Car", and may send the request to another system component (e.g., an orchestrator 130) for further processing, without sending the request to the account ID manager 180 for converting the account ID, since the request already includes the first account ID corresponding to the requested automotive assistant.

Assuming that the user input relates to the other/data processor assistant, the inbound gateway 170 may send (step 3) the received request to the account ID manager 180. The account ID manager 180 may look up, in the account ID mapping storage 182, a second account ID associated with the user 105 for the other assistant system acting as a data processor. The account ID manager 180 may identify the second account ID based on the first account ID (for the automotive assistant system) included in the request. In other examples, the account ID manager 180 may use data identifying the user 105 to identify the second account ID, or other information. In some embodiments, the account ID manager 180 may also identify a device ID associated with the user device 110 and corresponding to the other/data processor assistant system.

The account ID manager 180 may send (step 4) the audio data 111, other data relating to the user input, and the second account ID (and the device ID in some embodiments) to the orchestrator 130, without sending the first account ID. In some embodiments, the second account ID and the device ID may be communicated to a response orchestration component that may determine an event corresponding to the receipt of the user input and associated with a device type of the device ID. The response orchestration component may be configured to receive events and send outputs to a user device based on the device type, so that an appropriate device interface is executed at the user device to present the output(s) determined by the system component(s) 120. In some embodiments, the system component(s) 120 may determine how the user input is processed based on the device capabilities of the user device 110, and may also determine how the user input is processed based on information (e.g., user profile data) associated with user's account. The device capabilities may be retrieved (by another system component) based on the device ID for the other/data processor assistant system, and the user account information/user profile may be retrieved based on the second account ID of the user 105 for the other/data processor assistant system.

The orchestrator component 130 may be configured to, among other things, coordinate data transmissions between the system components. The orchestrator component 130 may perform certain processing to set up appropriate data for processing of the user input. One example step the orchestrator component 130 may perform is to determine whether the user device 110 supports a data controller assistant system and a data processor assistant system configuration. The orchestrator component 130 may send a device type, a device ID or other data identifying the user device 110 to the account ID manager 180. In response, the account ID manager 180 may look up the user device 110 in the account ID mapping storage 182, and may return a data processor ID to the orchestrator component 130 (if the user device 110 supports the data controller—data processor configuration described herein). In some cases, the data processor ID may be an assistant ID used to identify the other/data processor assistant system (e.g., an Alexa assistant ID). The orchestrator component 130 may provide the data processor ID to other system components that are configured to perform different functionalities when processing a user input directed to the data processor/other assistant system.

The orchestrator component 130 may generate a data record indicating that the instant user input is being handled according to the data controller—the data processor configuration. The data record may be associated with a user input (utterance) ID. Based on the generated data record, the system component(s) 120 may discard the user input (e.g., the audio 107, the audio data 111, etc.) after processing with respect to the user input is completed. In other embodiments, the system component(s) 120 may retain the user input data if the user input is directed to the data processor/other assistant system, and not the data controller/automotive assistant system, and may use the user input data to retrain, update, etc. one or more system components.

In some embodiments, the orchestrator component 130 may determine (in some embodiments using another component) relevant context data for the user input. The relevant context data may be determined using the second account ID. For example, user profile data associated with the second account ID may be retrieved from a profile storage component (e.g., profile storage component 270). The context data may include a skill component(s) enabled for the user's accounts, a catalog subscription(s) enabled for the user's account, device functionalities enabled for the user's account, user preferences, etc. Using the second account ID limits the context data that is available for the user 105 with respect to the other/data processor assistant system. For example, a particular music catalog or service may be enabled for use via the other assistant system, but not via the automotive assistant system, and the particular music catalog or service may be stored in a user profile as associated with the second account ID (but not the first account ID for the automotive assistant system). The context data may also include device context information, for example, device type of the user device 110, device capabilities, device location, device settings, etc.

The orchestrator component 130 may invoke ASR processing by sending (step 5) the audio data 111 to an ASR component 150. The ASR component 150 may transcribe the audio data 111 into data representative of words spoken by the user 105 (e.g., text data, token data, etc.). ASR output data outputted by the ASR component 150 may include one or more (e.g., in the form of an N-best list) ASR hypotheses, where the individual ASR hypotheses may include text data, token data, etc., and a corresponding confidence value. Additional details on how the ASR component 150 may determine the ASR output data are described below.

In some embodiments, the ASR component 150 may use other data, such as user-specific data, context data related to the user input, etc. to determine the ASR output data. In invoking the ASR component 150, the orchestrator component 130 may send a request to the ASR component 150, which may include the audio data 111 and the second account ID for the user 105. In other cases, the request may include the audio data 111 and the context data determined based on the second account ID. The other data used by the ASR component 150 may be based on the second account ID. The ASR component 150 may use a particular library (or vocabulary) of words based on the user input context, the user profile, the device type, etc., which in this case may be related to the second account ID, but not related to the first account ID. For example, if the user input is directed to the automotive assistant system and the request to the ASR component 150 included the first account ID, then the ASR component 150 may use a library including words related to a vehicle (e.g., headlights, windows, windshield wiper, brakes, seat warmer, etc.), where such words may be boosted for ASR processing, and may help in recognizing vehicle-specific words that may be spoken by the user 105. As another example, the ASR component 150 may use a contact list/address book provided by the user 105 and associated with the automotive assistant system to recognize contacts/persons specifically enabled by the user 105 for use (e.g., to call, message, navigate to, etc.) while using the vehicle 110. As another example, for the instant user input directed to the other assistant system, the ASR component 150 may use a general library of words, which may help in recognizing a wide variety of words that may be spoken by the user 105.

The ASR component 150 may send the ASR output data to the orchestrator component 130. The orchestrator component 130 may then invoke NLU processing by sending (step 6) the ASR output data to a NLU component 160.

The NLU component 160 may be configured to determine a semantic interpretation of the phrase(s) or statement(s) represented in the ASR output data therein by determining one or more meanings associated with the user input. The NLU component 160 may determine an intent representing an action that a user desires be performed and may determine information, such as entity data, that allows a device (e.g., the device 110, the system component(s) 120, a skill component 190, a skill support system(s) 125, etc.) to execute the intent. Entity data may be determined using named entity recognition (NER) and entity resolution. NER may involve determining portions of the user input/ASR hypothesis that correspond to an entity, and determining the type of entity. Entity resolution may involve determining the specific entity value for the entity included in the user input. Further details on NER and entity resolution are described below.

In some embodiments, the NLU component 160 may use (step 7) one or more entity resolvers 162 to determine a specific entity value(s) corresponding to the user input. The NLU component 160 may use the entity resolvers 162 associated with the second account ID. For example, the entity resolver 162 may correspond to a music catalog/service enabled for the second account ID/the other assistant system. In another example, for a user input directed to the automotive assistant system, the NLU component 160 may use entity resolvers 162 enabled for the first account ID.

The entity resolvers 162 may send an entity value corresponding to an entity mentioned in the user input. For example, for the user input "Alexa, play [genre] music," the entity resolver 162 may determine a radio station or a music service that plays music for the indicated genre.

The NLU component 160 may determine NLU output data including one or more (e.g., in the form of an N best list) NLU hypotheses, where individual NLU hypotheses may include an intent, entity data (entity type(s), resolved entity value(s)), and a corresponding confidence score. The NLU component 160 may send the NLU output data to the orchestrator component 130.

The orchestrator component 130 may send (step 8) the NLU output data to a post-NLU router 165. The post-NLU router 165 may determine a ranked list (or a reranked list) of NLU hypotheses based on various other data. The post-NLU router 165 may determine a ranked list of plans to respond to the user input. Further details of the post-NLU router 165 are described below. In some embodiments, the post-NLU router 165 may determine data to coordinate a handoff (described below in detail) between one assistant to another assistant. In some embodiments, the post-NLU router 165 may not handle handoffs between assistants so as to maintain a separation of the data between the different assistants.

The post-NLU router 165 may send plan data to the orchestrator component 130. The orchestrator component 130 may select a plan (e.g., the top ranked plan) to respond to the user input, where the plan may relate to a particular skill component 190. The orchestrator component 130 may send (step 9) the plan data or the NLU hypothesis to the skill component 190 to respond to the user input.

The skill component 190 may determine output data responsive to the user input. The output data may be a natural language output and/or data to be used to perform a particular action. The output data may include one or more device capabilities/interfaces to be used to present an output or perform the action. For example, the output data may indicate that a speech synthesizer is to be invoked, synthesized speech is to be outputted, and an audio player is to be executed. The skill component 190 may send a request to the outbound gateway 175, where the request may include the second account ID and the device ID used by the other assistant system to identify the user device 110.

The skill component 190 may send the output data to an outbound gateway 175, which may determine specific device interfaces of the user device 110 to present the output. To determine the specific device interfaces, the outbound gateway 175 may use an account ID and/or a device ID. Since the request (from the skill component 190) includes IDs used by the other assistant system and the user input is received from the user device 110 associated, by default, with the automotive assistant system, the outbound gateway 175 may request a conversion from the second account ID and the device ID. The outbound gateway 175 may send (step 11) a request to the account ID manager 180 to send IDs for the automotive assistant system corresponding to the second account ID and the device ID used by the other assistant system. The outbound gateway 175 may receive the first account ID and a device ID that is used by the automotive assistant system to identify the user device 110. Using the received device ID, the outbound gateway 175 may determine the specific device interfaces to invoke to present the skill output. In this example, the outbound gateway 175 may cause (step 12) the speaker(s) 114 of the user device 110 to output synthesized speech, via a synthesized speech player interface, and music, via an audio player interface.

In some embodiments, the orchestrator component 130 may send (step 13) data related to the processing of the user input to a post-processing storage 195. In some embodiments, the post-processing storage 195 may be a subject-oriented database (e.g., a Datamart) or other type of database. The orchestrator component 130 may send utterance data (e.g., audio data 111) and other input data (e.g., gestures, button selection, etc.) to the post-processing storage 195. In some examples, the orchestrator component 130 may also send run-time operational data, such as ASR output data, NLU output data, plan data, skill component used to respond to the user input, etc. In sending the data for storage, the orchestrator component 130 may include (e.g., insert in the data record) the account ID for the assistant system that processed the user input. For example, the first account ID may be included for data relating to the automotive assistant system, and the second account ID may be included for data relating to the other assistant system. In this manner, the data in the post-processing storage 195 may be identified on an assistant-basis.

In some embodiments, the orchestrator component 130 may only send data related to a user input that is directed to the other/data processor assistant system (e.g., based on the data being associated with the second account ID), and may not send data related to a user input that is directed to the automotive assistant system (e.g., based on the data being associated with the first account ID). The data from the post-processing storage 195 may be used to retrain, update, configure, etc. one or more system components, for example, the ASR component 150, the NLU component 160, the post-NLU router 165, the skill component 190, etc.

In some embodiments, system components other than the orchestrator component 130 may write/store data to the post-processing storage 195. For example, assistant authorized skill components 290 (described below in relation to FIG. 2A) may store utterance data in the post-processing storage 195. Utterance data and ASR output data may be stored by the corresponding system components using a consistent data record ID that may be created once the voice request reaches the orchestrator component 130. To allow the post-processing storage 195 to identify whether a given user input is directed to a data processor system, the orchestrator component 130 may send a new record that indicates whether a data processor is in use and the assistant ID related to the user input. The post-processing storage 195 may discard all the utterance data (and other data) associated with the same data record ID and the assistant ID of the automotive assistant system.

Some of the system component(s) 120 that are under the control of the other assistant system, may be invoked during speech processing and may receive utterance data. For example, the entity resolvers 162 invoked during NLU processing and some of the skill components 190 invoked by the post-NLU router 165 (e.g., using a dispatcher 714 shown in FIG. 7) may receive utterance data. These system components may be appropriately restricted (e.g., using the account ID) to ensure that any voice/input data directed to the automotive assistant system is only stored and used by components authorized by the automotive assistant system, and that any voice/input data directed to the other assistant system is only stored and used by components authorized by the other assistant system.

Runtime operational data may be consumed by many of the system components of the system 100. Runtime operational data may include personal/user data that is read during processing a user input directed to the automotive assistant system or the other assistant system. The system 100 may propagate the appropriate account ID that is being operated on throughout the service call stack and may store user records in different rows in their corresponding databases using the account ID as part of the record key. The account ID for the request may be derived from the device token used by the user device 110 when it creates its standing connection to the inbound gateway component 170.

The device standing connection may use the first account ID of the automotive assistant system in its access token before an account for the other assistant system is enabled by the user 105. When the user 105 enables the account for the other assistant system, the user device 110 (or another system component) may publish a bidirectional association between the first account ID and the second account ID (for the other assistant system) to the account ID manager 180. After that, the device standing connection may then use the second account ID in its access token. When a request is received at the inbound gateway 170, the request may also include a wakeword that is used to invoke the corresponding assistant as part of the request. The inbound gateway 170 may use the wakeword and the included account ID to determine whether a look up for a corresponding other account ID is to be performed. For example, if the request from the user device 110 to the inbound gateway 170 includes the second account ID and the wakeword for the other assistant system, then the inbound gateway component 170 may not perform a look up via the account ID manager 180, and may send the request and included data to the orchestrator component 130 for processing. As another example, if the request from the user device 110 to the inbound gateway 170 includes the second account ID and the wakeword for the automotive assistant system, then the inbound gateway component 170 may perform a look up for the first account ID for the invoked assistant, from the account ID mapping storage 182, and then propagate the first account ID throughout the rest of the call stack.

In this manner, the inbound gateway 170 may create a single, inspectable point in every user request. This may also ensure that the correct runtime data is used by downstream system components, and allowing downstream components to be compliant with the data separation policies between the two assistant systems. Only one service—the account ID service—in the processing stack may store the relationship between the first account ID (for the automotive assistant system) and the second account ID (for the other assistant system), and since this association is not propagated through the processing stack, the user data for the two assistants cannot be rejoined or accidentally processed together. In some embodiments, access to the account ID manager 180 may be controlled using authentication mechanisms, such as CloudAuthentication; Authentication, Authorization and Accounting (AAA), etc.

Device accounts may be used by one or more of the system components. The system component(s) 120 may retrieve data from a device master service (DMS), which may be accessed using the (first or second) account ID, device type and device serial number (DSN) of the user device 110. Sometimes the DMS only allows one device account per user. In such cases, to enable the user device 110 to participate in the data controller—data processor architecture, the user device 110 may be associated with (at least) two DSNs, one corresponding to the first account ID and the other corresponding to the second account ID.

FIG. 1B is a conceptual diagram illustrating components of a federated learning system, according to embodiments of the present disclosure. As described above, the system component(s) 120, for example, the orchestrator component 130 may store data related to the user input and processing thereof in the post-processing data storage 195, where the data may be stored along with the account ID corresponding to the assistant system that processed the user input. For example, for a user input processed by the automotive assistant system, the orchestrator component 130 may store data (e.g., the utterance data and runtime operational data) along with the first account ID, for the automotive assistant system, in the post-processing data storage 195. As another example, for a user input processed by the other assistant system, the orchestrator component 130 may store data along with the second account ID for the other assistant system, in the post-processing data storage 195.

As part of the federated learning system shown in FIG. 1B, the system 100 may include a data store component 154 configured to control access to the data stored in the post-processing data storage 195 based on an assistant-basis. The data in the post-processing data storage 195 may be used to train, update, configure, report on, etc., various system components 120, system components of the automotive assistant system and/or system components of the other assistant system. Such use may be restricted to use of data "belonging" to the respective assistant, where data may "belong" to an assistant when the assistant processed with respect to the user input. A first assistant data storage 196 may be associated with the automotive assistant system, and may request retrieval of data from the post-processing data storage 195 via the data store component 154. In response to the request, the data store component 154 may retrieve (first) data associated with the first account ID in the post-processing data storage 195, and send (or otherwise make available for storage) the first data to the first assistant data storage 196. A second assistant data storage 198 may be associated with the other assistant system/the system components 120, and may request retrieval of data from the post-processing data storage 195 via the data store component 154. In response to the request, the data store component 154 may retrieve (second) data associated with the second account ID in the post-processing data storage 195, and send (or otherwise make available for storage) the second data to the second assistant data storage 198.

Using the first data of the first assistant data storage 196, a first assistant model training component 156 may perform operations to train, update, configure, etc. one or more components of the automotive assistant system, which may include one or more models (e.g., machine learning (ML) models, statistical models, probabilistic models, etc.). Using the second data of the second assistant data storage 198, a second assistant model training component 157 may perform operations to train, update, configure, etc. one or more components of the other assistant system (e.g., the system components 120), which may include one or more models (e.g., machine learning (ML) models, statistical models, probabilistic models, etc.).

In some embodiments, the second data from the second assistant data storage 198 may be used to train, update, configure, etc. one or more system components 120, for example, the ASR component 150, the NLU component 160, the post-NLU router 165, the skill component 190, etc.

Using federated learning techniques, in one example, the first assistant model training component 156 may train a first ML model(s) (which may be referred to as a first local model or local model of the automotive assistant system) using the first data from the first assistant data storage 196. The second assistant model training component 157 may train a second ML model(s) (which may be referred to as a second local model or local model of the other assistant system) using the second data from the second assistant data storage 198. The first ML model(s) and the second ML model(s) (and/or associated data) may be used by a global model training component 158 to determine (e.g., train, update, configure, etc.) a global ML model(s) that may combine the locally-learned features from the local ML model(s).

In this manner, the personal/local data of different assistants may be used according to federated learning techniques to generate a robust model without sharing of the personal/local data between the assistants, thus, allowing data separation between different assistants, enhancing data privacy, enhancing data security, etc. This is enabled by the use of different account IDs for the user 105 as described herein.

In other embodiments, the second assistant model training component 157 may receive an anonymized version of the first data stored in the first assistant data storage 196. Such anonymized first data may be received from a component of the automotive assistant system. The second assistant model training component 157 may use the anonymized first data to train, update, configure, etc. one or more components, which may include one or more models. The automotive assistant system may perform one or more data anonymization techniques, which may involve removing personally identifiable information from the first data, so that the user whom the data relates to remains anonymous.

FIG. 2A is a conceptual diagram illustrating further components of the system 100. As illustrated, the user devices 110 may include, for example, a vehicle 110a and/or a tablet computer 110b. Other user devices 110, such as those illustrated in FIG. 12 and described below, may be used instead or additionally. As described, the user device 110 may include the wakeword detector 121 for detecting one or more wakewords, an input detector 122 for detecting user input such as a gesture (e.g., a button press or touch-screen touch), and one or more applications 124 for receiving input, providing output, and/or changing a state of the device 110.

Although the user device 110 may initiate speech processing in response to detection of a wakeword, in the case of touch input detection, the audio data 111 may not include a wakeword. The user device 110 may be equipped with a camera for capturing image data 221. The user device 110 and/or the system component(s) 120 may process the image data 221 for purposes of gesture detection (e.g., when the gesture does not include touching a touch- or force-sensitive component), for user recognition, or for detecting context (e.g., is it day/night). The user device 110 may also receive text input (or generate text data 213 based on an input) and transmit the text data 213 to the system component(s) 120.

The user device 110 may include a multi-assistant component 115. In some embodiments, the multi-assistant component 115 may receive and process requests to enable and/or disable processing with respect to an assistant. The multi-assistant component 115 may process changes in assistant settings, such as invocation methods, wakewords, gestures, buttons, etc. The multi-assistant component 115 may distill the settings change request by seeing how the requested setting differs from the current settings state stored in the local settings component 132, update the local settings component 132 with the new/changed settings, transmit the updated settings to the system component(s) 120, and assign an observer component 140 to the assistant. The multi-assistant component 115 may retrieve eligible assistant information from system component(s) 120 to provide the user 105 with a list of assistants that may be eligible for use with the user device 110.

The user device 110 may include a local settings component 132. The local settings component 132 may be a memory or storage that maintains settings related to the one or more assistants eligible and/or enabled for the user device 110. When the user requests a change to the assistant settings, the multi-assistant component 115 may refer to the local settings component 132 to determine how the requested setting change differs from the current settings state stored in the local settings component 132. Following this process of distillation, the multi-assistant component 115 may transmit an indication of one or more assistant settings, that have changed, to the system component(s) 120. The system component(s) 120 may include another settings storage in, for example, the assistant metadata component 155.

The user device 110 may include a speech component 135. The speech component 135 may receive input audio data from the application 124 and transmit it to the system component(s) 120 for processing. In some implementations, the speech component 135 may include speech and/or language processing components such as those described with respect to the language processing component 295 described below with reference to FIG. 2B and FIG. 2D. In some implementations, the speech component 135 may receive input audio data 111 and send it to the system component(s) 120 in its original form; that is, as unprocessed audio data. In some implementations, the speech component 135 may process the audio data 111 and transmit the resulting data in the form of ASR data such as phonemes, token data, or text, or NLU data in the form of an intent, entity identifiers, and/or slot data.

The user device 110 may include one or more observer components 140a, 140b, and 140c, etc. (collectively "observer components 140"). The multi-assistant component 115 may assign an observer component 140 to each assistant enabled for the device 110. The observer component 140 may monitor the application 124, input detector 122, and/or wakeword detector 121 for invocations of the assistant for which it is assigned. The observer component 140 may notify the system component(s) 120 of assistant invocation and provide the system component(s) 120 with audio data 111, image data 221, and/or text data 213 associated with the invocation.

The system component(s) 120 may include one or more skill components 190 that may be invoked by the orchestrator component 130 to respond to a user input. The skill components 190 may communicate with one or more skill support system 125, which may augment the resources of the skill components 190. Further details for skill components 190 are described below.

In some embodiments, the skill components 190 may include different sets of skills that may be configured and/or enabled for use with particular assistants. In the data controller—data processor architecture, the system component(s) 100 may be configured to route user inputs directed to the data controller/automotive assistant system to skill components 190 that are enabled for the automotive assistant system, and that user inputs directed to the data processor/other assistant system are routed to skill components 190 that are enabled for the other assistant system.

As shown in FIG. 2A, the skill components 190 may include one or more assistant authorized skill components 290, one or more assistant unauthorized skill components 292, custom assistant skill components 296 and data processor aware skill components 294. In some embodiments, the system component(s) 120 and the skill components 190 may be in the control of the other assistant system; that is an organization of the other assistant (e.g., Amazon Alexa) may be responsible for maintaining, developing, supporting, configuring, etc. of the system components of the system component(s) 120. As such, in some examples, the skill components 190 may be developed, supported, and otherwise provided by the other assistant, and the automotive assistant system may need (prior) authorization/enablement for use to respond to user inputs directed to the automotive assistant.

The assistant authorized skill component(s) 290 may be skill components that have been authorized for use by the automotive assistant system. An example of assistant authorized skill components 290 may be an automotive and navigation skill component. In some embodiments, the assistant authorized skill components 290 may be used to respond to user inputs directed to the automotive assistant system and the other/data processor assistant system.

The assistant unauthorized skill component(s) 292 may be skill components that are not authorized for use by the automotive assistant system, but can be used by the other/data processor assistant system. An example of assistant unauthorized skill component 292 may be a shopping skill component.

The data processor aware skill component(s) 294 may be skill components that may be used by either the automotive assistant system or the other/data processor assistant system. The data processor skill component(s) 294 may need, as inputs, an indication of which assistant system the user input relates to, and whether or not access to assistant-specific data (e.g., run-time operational data, other data such as personal data, utterance data, etc.) is needed to respond to the user input. An example of the data processor aware skill component 294 is a communications skill component, which enables the user 105 to communicate (e.g., make phone calls, send messages, etc.) with other users, such as ones in a contact list(s) of the user 105. The data processor aware skill component(s) 294 may access certain data (e.g., the contact list(s)) shared between the automotive assistant system and the other assistant system. In some embodiments, the shared data may be stored in a storage associated with the other assistant system, and a copy may be stored in a storage associated with the automotive assistant system, after permissions/authorizations are received from the user 105. The data processor aware skill components 294 may be configured to store processing data related to the automotive assistant system separately from processing data related to the other assistant system. In some embodiments, invocation of the data processor aware skill component 294 may include sending of an encrypted token, which only the data processor aware skill component 294 is able to decrypt, and based on the decryption, is then able to process with respect to the user input routed to it. In some embodiments, the data processor aware skill component 294 may send a request to the account ID manager 180 to convert from one account ID to another account ID for the user 105 to be able to access data needed to respond to the user input. Example data processor aware skill component 294, such as a communications skill component, may perform certain operations that may require access to data related to different assistant systems. Such data processor aware skill component 294 may be enabled/authorized to access the account ID manager 180, in a similar manner as the inbound gateway component 170 and the orchestrator component 130.

The custom assistant skill component(s) 296 may be skill components provided (e.g., developed, configured, maintained, etc.) by the automotive assistant system, and may perform functionalities specific for the automotive assistant. An example of the custom assistant skill component 296 is a vehicle service appointment scheduling component.

The configuration for whether a skill component authorized for the automotive assistant system, the other assistant system, etc. may be stored in the assistant metadata component 155. In some embodiments, the post-NLU router 165 may communicate with the assistant metadata component 155 to determine a skill configuration and other rules, data, etc. to determine whether a skill component 190 can be used to respond to a user input and thus include it (or exclude it) from the plan data accordingly. In some example embodiments, the post-NLU router 165, in conjunction with the assistant metadata component 155, may enforce the following example rules. One example rule is that the custom assistant skill components 296 can only be invoked for a user input directed to the automotive assistant system, and processing data (e.g., utterance data, run-time operational data, etc.) that is used by the custom assistant skill components 296 is to be stored in a storage associated with the automotive assistant system. Another example rule is that assistant unauthorized skill components 292 can only be invoked for a user input directed to the other assistant system, and processing data (e.g., utterance data, run-time operational data, etc.) that is used by the assistant unauthorized skill components 292 is to be stored in a storage associated with the other assistant system. Yet another example rule may be that the assistant authorized skill components 290 may be invoked by either assistant depending on the specific wakeword (and/or gesture) included with the user input. To handle appropriate storage of processing data by the assistant authorized skill components 290, the processing data may be stored in the post-processing storage 195 along with the corresponding account ID.

Based on the rules and skill component configurations, the post-NLU router 165 may determine the plan data to include a combination of appropriate skill components. For example, for a user input directed to the automotive assistant system, the post-NLU router 165 may include, in the plan data, a combination of the assistant authorized skill component(s) 290, custom assistant skill component(s) 296 and/or data processor aware skill component(s) 294. As another example, for a user input directed to the other assistant system, the post-NLU router 165 may include, in the plan data, a combination of the assistant authorized skill component(s) 290, assistant unauthorized skill component(s) 292, custom assistant skill component(s) 296 and/or data processor aware skill component(s) 294.

As shown in FIG. 2A, the system component(s) 120 may include (or may be in communication with) a data storage 249 for storing personal/user data corresponding to different assistants. In some embodiments, first portions of the data in the data storage 249 corresponding to the automotive (first) assistant system may be associated with the first account ID, and other second portions of the data in the data storage 249 corresponding to the other (second) assistant system may be associated with the second account ID. In some embodiments, the data storage 249 may include separate data storages for the different account IDs/assistant systems, for example, a first account ID data storage 250 and a second account ID data storage 260.

The first account ID data storage 250/the first portion of the data in the data storage 249, associated with the automotive assistant system, may store personal/user data corresponding to the use of the automotive assistant. For example, the first account ID storage 250/the first portion of the data may include data relating to vehicle sensors, tunable radio stations, vehicle settings, enabled catalogs, preferred skill components for use in the vehicle, account subscriptions for the vehicle, etc. The first account ID data storage 250/the first portion of the data may be accessible by the system components of the system component(s) 120 when a user input (e.g., "Car, open windows" or "Car, set temperature to 70") directed to the automotive assistant system is being processed.

The second account ID data storage 260/the second portion of the data in the data storage 249, associated with the other assistant system, may store personal/user data corresponding to the use of the other assistant. For example, the second account ID storage 250/the second portion of the data in the data storage 249 may include data relating to enabled media catalogs, preferred skill components, account subscriptions, smart home devices, shopping lists, etc. The second account ID data storage 260/the second portion of the data in the data storage 249 may be accessible by the system components of the system component(s) 120 when a user input (e.g., "Alexa, play Jazz music" or "Alexa, shop for windshield wipers") directed to the other assistant system is being processed.

FIG. 2C illustrates example data that may be stored in the data storage 249 for different assistants. As shown and described herein, a first portion of data 252 may be associated with a first account ID for a user, which may relate to a first assistant system, for example, the automotive assistant system. A second portion of data 254 may be associated with a second ID for the same user, which may relate to a second assistant system, for example, the other assistant system. As shown the first portion 252 and the second portion 254 may include the same user ID as the data relates to the same user 105, and may also include the same device ID (e.g., for the user device 110). As shown, the first portion 252 may include data related to the automotive assistant, such as, vehicle sensors data, vehicle settings data, tunable stations data, etc., and the second portion 254 may include data related to the other assistant system, such as, smart home devices data, media providers data, account preferences data, etc.

The system component(s) 120 may include speech processing components including components for ASR, NLU, TTS, etc. as further detailed below with reference to FIG. 2B. The system component(s) 120 additionally includes components configured to process commands received in a multi-assistant environment. In particular, the system component(s) 120 may include an assistant metadata component 155 to store data relating to specific assistants.

Figure 2B:
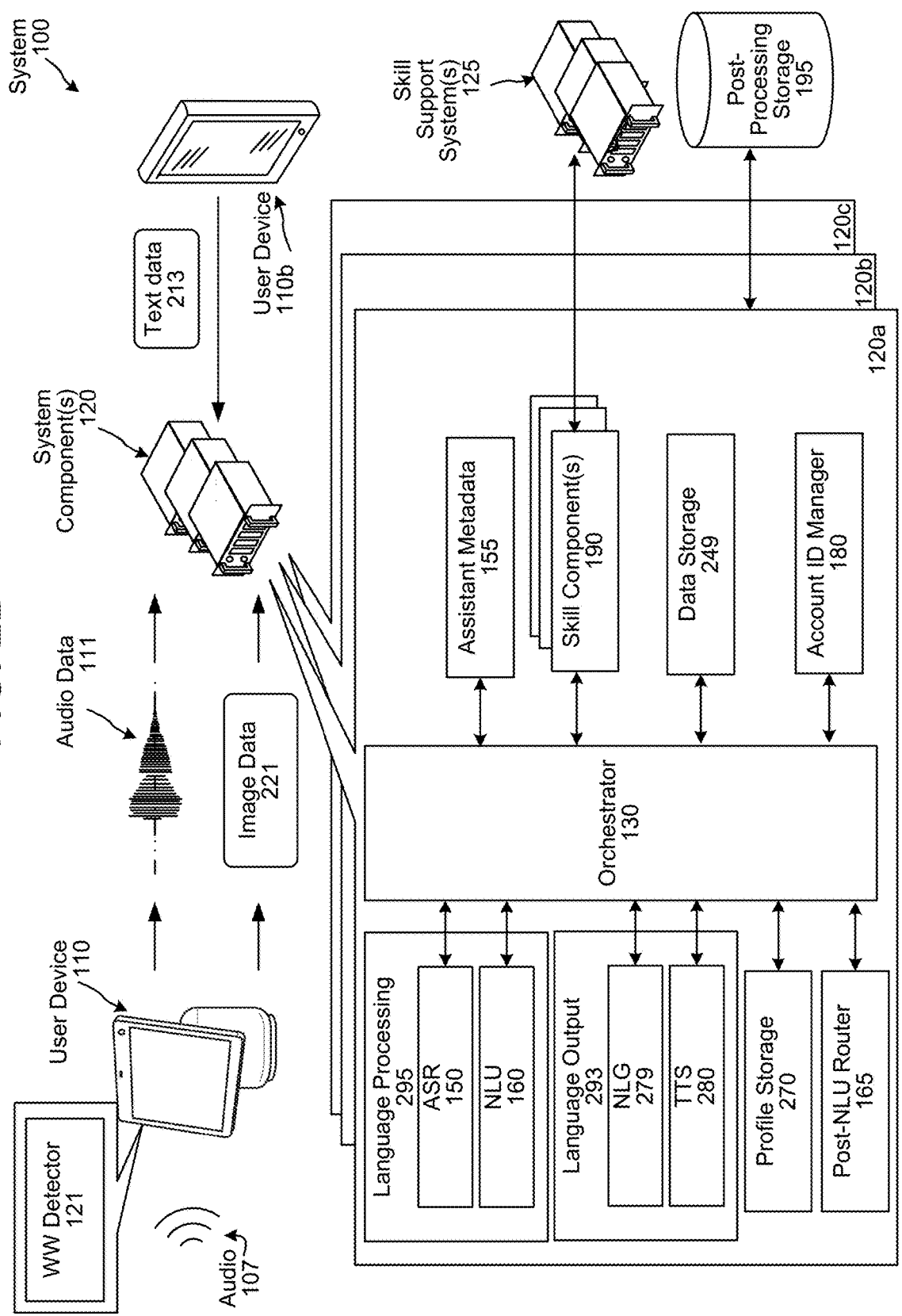
FIG. 2B is a conceptual diagram illustrating components of the multiple assistant systems, according to embodiments of the present disclosure.

The system 100 may operate using various components shown in FIG. 2B. FIG. 2B illustrates various components of the system component(s) 120 described with references to FIGS. 1A and 2A as well as additional components. The various components may be located on same or different physical devices. For example, in some implementations, components of the system component(s) 120 may reside in the user device 110 or be shared between the user device 110 and the system component(s) 120 as described below with reference to FIG. 2D2C. Communication between various components may occur directly or across a network(s) 199 connecting one or more of the devices 110, system component(s) 120, and/or skill support systems 125. The user device 110 may include audio capture component(s), such as a microphone or array of microphones of a device 110, captures audio 107 and creates corresponding audio data. Once speech is detected in audio data 111 representing the audio 107, the user device 110 may determine if the speech is directed at the user device 110/system component(s) 120. In at least some embodiments, such determination may be made using a wakeword detection component 121. The wakeword detection component 121 may be configured to detect various wakewords. In at least some examples, each wakeword may correspond to a different digital assistant. An example wakeword is "Alexa," which may be used to invoke the other/data processor assistant system. Another example wakeword is "Car," which may be used to invoke the automotive assistant system. In another example, input to the system may be in form of text data 213, for example as a result of a user typing an input into a user interface of device 110. Other input forms may include indication that the user has pressed a physical or virtual button on device 110, the user has made a gesture, etc. The user device 110 may also capture images using camera(s) 1018 of the user device 110 and may send image data 221 representing those image(s) to the system component(s) 120. The image data 221 may include raw image data or image data processed by the user device 110 before sending to the system component(s) 120.

The wakeword detector 121 of the user device 110 may process the audio data, representing the audio 107, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 107, is analyzed to determine if specific characteristics of the audio data match preconfigured acoustic waveforms, audio signatures, or other data corresponding to a wakeword.

Thus, the wakeword detector component 121 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detector component 121 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 121 and/or input is detected by an input detector, the user device 110 may "wake" and begin transmitting audio data 111, representing the audio 107, to the system component(s) 120. The audio data 111 may include data corresponding to the wakeword; in other embodiments, the portion of the audio corresponding to the wakeword is removed by the user device 110 prior to sending the audio data 111 to the system component(s) 120. In the case of touch input detection or gesture based input detection, the audio data may not include a wakeword.

The input detector 122 of the user device 110 may detect user input such as a gesture (e.g., a button press or touchscreen touch). An example button is a "Push to Talk" button. The user device 110 may send the audio data 111 captured after gesture detection to the system component(s) 120. The button and/or the input detector 122 may be capable of differentiating gestures such as tap-to-talk, push-and-hold, double-click, etc. In any event, the user device 110 sends the audio data 111 or data representing the received audio 107 and/or commands conveyed therein to the system component(s) 120.

In some implementations, the system 100 may include more than one system component(s) 120. The system components 120 may respond to different wakewords and/or gestures, and/or perform different categories of tasks. Each system component(s) 120 may be associated with its own wakeword such that speaking a certain wakeword results in audio data be sent to and processed by a particular system. For example, detection of the wakeword "Alexa" by the wakeword detector 121 may result in sending audio data to system component(s) 120a for processing while detection of the wakeword "Car" by the wakeword detector 121 may result in sending audio data to system component(s) 120b for processing.

Upon receipt by the system component(s) 120, the audio data 111 may be sent to an orchestrator component 130. The orchestrator component 130 may include memory and logic that enables the orchestrator component 130 to transmit various pieces and forms of data to various components of the system, as well as perform other operations as described herein.

The orchestrator component 130 may send the audio data 111 to a language processing component 295. The language processing component 295 (sometimes also referred to as a spoken language understanding (SLU) component) includes an automatic speech recognition (ASR) component 150 and a natural language understanding (NLU) component 160. The ASR component 150 may transcribe the audio data 111 into text data. The text data output by the ASR component 150 represents one or more than one (e.g., in the form of an N-best list) ASR hypotheses representing speech represented in the audio data 111. The ASR component 150 interprets the speech in the audio data 111 based on a similarity between the audio data 111 and pre-established language models. For example, the ASR component 150 may compare the audio data 111 with models for sounds (e.g., acoustic units such as phonemes, senons, phones, etc.) and sequences of sounds to identify words that match the sequence of sounds of the speech represented in the audio data 111. The ASR component 150 sends the text data generated thereby to an NLU component 160, via, in some embodiments, the orchestrator component 130. The text data sent from the ASR component 150 to the NLU component 160 may include a single top-scoring ASR hypothesis or may include an N-best list including multiple top-scoring ASR hypotheses. An N-best list may additionally include a respective score associated with each ASR hypothesis represented therein. The ASR component 150 is described in greater detail below with regard to FIG. 4.

The language processing system 295 may further include a NLU component 160. The NLU component 160 may receive the text data from the ASR component. The NLU component 160 may attempts to make a semantic interpretation of the phrase(s) or statement(s) represented in the text data input therein by determining one or more meanings associated with the phrase(s) or statement(s) represented in the text data. The NLU component 160 may determine an intent representing an action that a user desires be performed and may determine information that allows a device (e.g., the device 110, the system component(s) 120, a skill component 190, a skill support system(s) 125, etc.) to execute the intent. For example, if the text data corresponds to "play the 5$^{th}$ Symphony by Beethoven," the NLU component 160 may determine an intent that the system output music and may identify "Beethoven" as an artist/composer and "5th Symphony" as the piece of music to be played. For further example, if the text data corresponds to "what is the weather," the NLU component 160 may determine an intent that the system output weather information associated with a geographic location of the device 110. In another example, if the text data corresponds to "turn off the lights," the NLU component 160 may determine an intent that the system turn off lights associated with the user device 110 or the user 105. However, if the NLU component 160 is unable to resolve the entity—for example, because the entity is referred to by anaphora such as "this song" or "my next appointment"— the language processing system 295 can send a decode request to another language processing system 295 for information regarding the entity mention and/or other context related to the utterance. The language processing system 295 may augment, correct, or base results data upon the audio data 111 as well as any data received from the other language processing system 295.

In some implementations, the NLU component 160 and/or the ASR component 150 may leverage models, grammars, lexicons, and/or other libraries of data for use in processing natural language inputs. Performance of the system 100 may be improved through use of libraries specific to the assistants available via the system or currently enabled for a particular user/user device 110 providing the natural language input. Upon receiving input data related to a natural language input, the system component(s) 120 may retrieve data associated with the account ID (received from the orchestrator component), for example, from the profile storage 270 and/or the assistant metadata component 155, and process the natural language input based on libraries associated with the assistant that the user input is directed to.

The NLU component 160 may return NLU results data 685/625 (which may include tagged text data, indicators of intent, etc.) back to the orchestrator 130. The orchestrator 130 may forward the NLU results data to a skill component(s) 190. If the NLU results data includes a single NLU hypothesis representing a skill corresponding to the assistant invoked by the user command, the NLU component 160 and the orchestrator component 130 may direct the NLU results data to the skill component(s) 290 associated with the NLU hypothesis. If the NLU results data 685/625 includes an N-best list of NLU hypotheses, the NLU component 160 and the orchestrator component 130 may direct the top scoring NLU hypothesis to a skill component(s) 190 associated with the top scoring NLU hypothesis. The system may also include a post-NLU router 165 which may perform various operations to assist with processing the input audio, including determining a plan for processing as described herein. As described below, the post-NLU router 165 may include a post-NLU ranker 265 which may incorporate other information to rank potential interpretations determined by the NLU component 160 and/or other components. The local user device 110 may also include its own post-NLU router 265. The NLU component 160, post-NLU ranker 265 and other components are described in greater detail below with regard to FIGS. 5-7.

A skill component may be software running on the system component(s) 120 that is akin to a software application. That is, a skill component 190 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 190. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 190 may operate in conjunction between the system component(s) 120 and other devices, such as the device 110, in order to complete certain functions. Inputs to a skill component 190 may come from speech processing interactions or through other interactions or input sources. A skill component 190 may include hardware, software, firmware, or the like that may be dedicated to a particular skill component 190 or shared among different skill components 190.

A skill support system(s) 125 may communicate with a skill component(s) 190 within the system component(s) 120 and/or directly with the orchestrator component 130 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system component(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 190 dedicated to interacting with the skill support system(s) 125. Unless expressly stated otherwise, reference to a skill, skill device, or skill component may include a skill component 190 operated by the system component(s) 120 and/or skill operated by the skill support system(s) 125. Moreover, the functionality described herein as a skill or skill may be referred to using many different terms, such as an action, bot, app, or the like. The skill 190 and or skill support system(s) 125 may return output data to the orchestrator 130.

The system component(s) 120 includes a language output component 293. The language output component 293 includes a natural language generation (NLG) component 279 and a text-to-speech (TTS) component 280. The NLG component 279 can generate text for purposes of TTS output to a user. For example the NLG component 279 may generate text corresponding to instructions corresponding to a particular action for the user to perform. The NLG component 279 may generate appropriate text for various outputs as described herein. The NLG component 279 may include one or more trained models configured to output text appropriate for a particular input. The text output by the NLG component 279 may become input for the TTS component 280 (e.g., output text data). Alternatively or in addition, the TTS component 280 may receive text data from a skill component 190 or other system component for output.

The NLG component 279 may include a trained model. The NLG component 279 generates text data from dialog data, such that the output text data has a natural feel and, in some embodiments, includes words and/or phrases specifically formatted for a requesting individual. The NLG component 279 may use templates to formulate responses. And/or the NLG component 279 may include models trained from the various templates for forming the output text data. For example, the NLG component 279 may analyze transcripts of local news programs, television shows, sporting events, or any other media program to obtain common components of a relevant language and/or region. As one illustrative example, the NLG component 279 may analyze a transcription of a regional sports program to determine commonly used words or phrases for describing scores or other sporting news for a particular region. The NLG component 279 may further receive, as inputs, a dialog history, an indicator of a level of formality, and/or a command history or other user history such as the dialog history.

The NLG component 279 may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG component 279 may determine which response is the most appropriate response to be selected. The selection may, therefore, be based on past responses, past questions, a level of formality, and/or any other feature, or any other combination thereof. Responsive audio data representing the response generated by the NLG component 279 may then be generated using the text-to-speech component 280.

The TTS component 280 may generate audio data (e.g., synthesized speech) from text data using one or more different methods. Text data input to the TTS component 280 may come from a skill component 190, the orchestrator component 130, or another component of the system. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

In some cases, the system 100 may provide access to multiple assistants via the user device 110 and/or the system component(s) 120. Each assistant may have its own personality as reflected in particular speech style. The language output component 293 may therefore provide different synthesized speech depending on the corresponding assistant. The language output component 293 may receive assistant metadata from the orchestrator 130, skill 190, and/or the assistant metadata component 155, etc. The language output component 293 may retrieve speech style data for the assistant corresponding to the account ID (received from the orchestrator component 130) from the assistant metadata component 155. The language output component 293 may use the speech style data to generate synthesized speech matching the personality of the requested assistant.

The system 100 (either on device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier/user profile identifier. Each user profile may include various user identifying data. Each user profile may also include data corresponding to preferences of the user. For example, each user profile may include a list of assistants enabled for the user with respect to a given device. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skill components that the user has enabled. When a user enables a skill component, the user is providing the system component(s) 120 with permission to allow the skill component to execute with respect to the user's natural language user inputs. If a user does not enable a skill component, the system component(s) 120 may not invoke the skill component to execute with respect to the user's natural language user inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The assistant metadata component 155 may be a memory or storage configured to store information related to assistants provided by the system component(s) 120. The assistant metadata component 155 can store information about which assistant(s) is/are available for a given user 105, user device 110, location, etc. The assistant metadata component 155 may store settings for the individual assistants. The assistant metadata component 155 may store wakeword and/or gesture information associated with the respective assistants for a given user 105 and/or user device 110. In some embodiments, the assistant metadata component 155 may mirror the information stored in the local settings component 132. The assistant metadata component 155 may store ASR, NLU, and/or entity libraries associated with each assistant for use by the system component(s) 120 during language processing. The assistant metadata component 155 may also store speech style information for the respective assistant for use by a TTS component 280 of the system component(s) 120 for providing verbal output in a style recognizable by a user as a personality indicating the identity of the assistant. The assistant metadata component 155 may store information regarding non-verbal indications, such as colors, earcons, voice chromes, etc. indicative of the identity of an assistant. The assistant metadata component 155 may also store information related to the capabilities of each particular assistant, such as what skill components/ intents may be executed using the particular assistant.

Figure 2D:
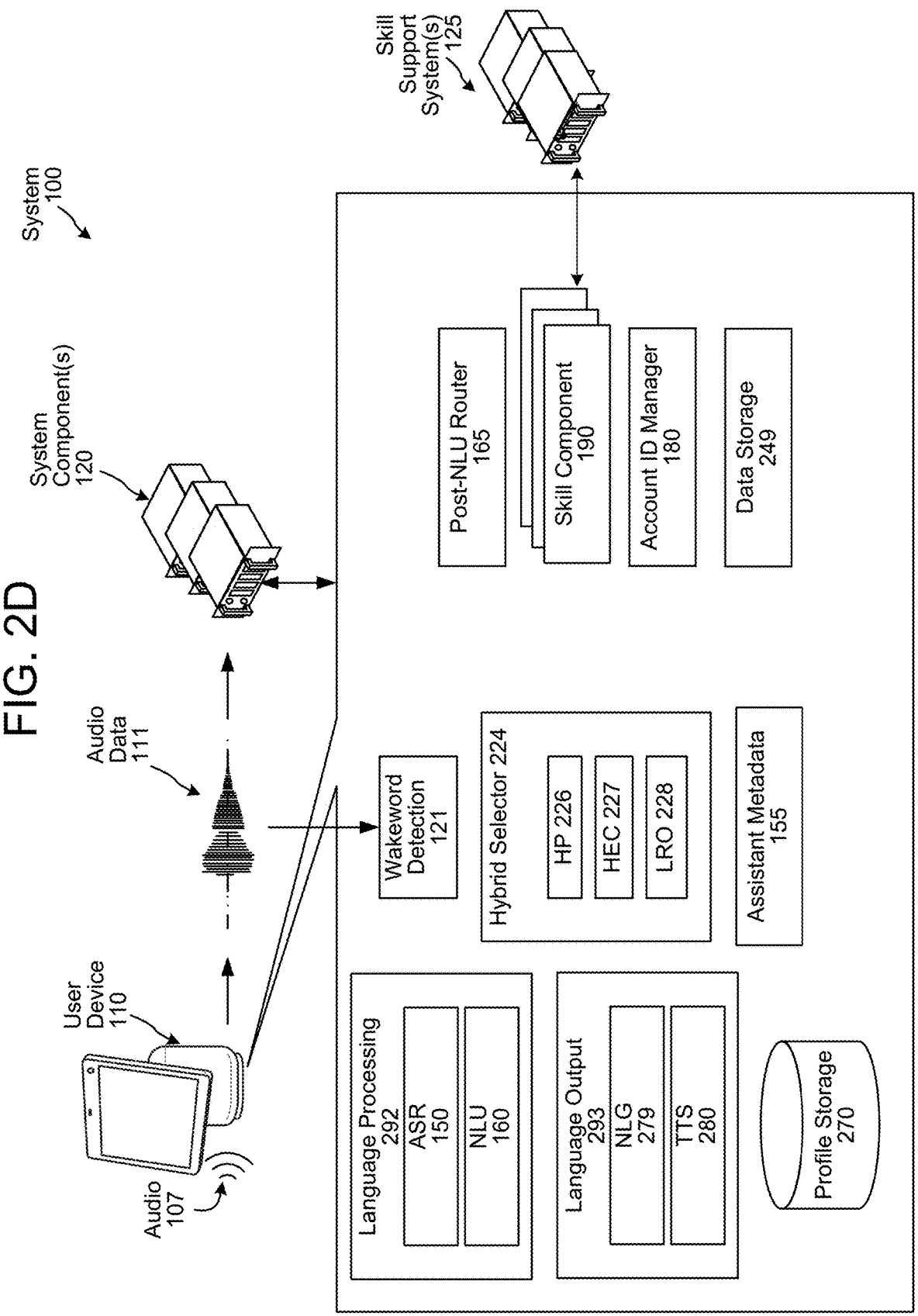
FIG. 2D is a conceptual diagram illustrating components that may be included in a device of the multiple assistant systems, according to embodiments of the present disclosure.

Although the components of FIG. 2B may be illustrated as part of system component(s) 120, device 110, or otherwise, the components may be arranged in other device(s) (such as in user device 110 if illustrated in system component(s) 120 or vice-versa, or in other device(s) altogether) without departing from the disclosure. FIG. 2D illustrates such a configured device 110.

In at least some embodiments, the system component(s) 120 may receive the audio data 111 from the device 110, to recognize speech corresponding to a spoken input in the received audio data 111, and to perform functions in response to the recognized speech. In at least some embodiments, these functions involve sending directives (e.g., commands), from the system component(s) 120 to the user device 110 (and/or other devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the user device 110 to output an audible response (e.g., using TTS processing performed by an on-device TTS component 280) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

As noted with respect to FIG. 2B, the user device 110 may include a wakeword detection component 121 configured to compare the audio data 111 to stored models used to detect a wakeword (e.g., "Alexa") that indicates to the user device 110 that the audio data 111 is to be processed for determining NLU output data (e.g., slot data that corresponds to a named entity, label data, and/or intent data, etc.). In at least some embodiments, a hybrid selector 224, of the device 110, may send the audio data 111 to the wakeword detection component 121. If the wakeword detection component 121 detects a wakeword in the audio data 111, the wakeword detection component 121 may send an indication of such detection to the hybrid selector 224. In response to receiving the indication, the hybrid selector 224 may send the audio data 111 to the system component(s) 120 and/or the ASR component 150. The wakeword detection component 121 may also send an indication, to the hybrid selector 224, representing a wakeword was not detected. In response to receiving such an indication, the hybrid selector 224 may refrain from sending the audio data 111 to the system component(s) 120, and may prevent the ASR component 150 from further processing the audio data 111. In this situation, the audio data 111 can be discarded.

The user device 110 may conduct its own speech processing using on-device language processing components, such as an SLU/language processing component 295 (which may include an ASR component 150 and an NLU 160), similar to the manner discussed herein with respect to the SLU component 295 (or ASR component 150 and the NLU component 160) of the system component(s) 120. The user device 110 may also internally include, or otherwise have access to, other components such as one or more skill components 190 capable of executing commands based on NLU output data or other results determined by the user device 110/system component(s) 120 (which may operate similarly to skill components 190), profile storage 270 (configured to store similar profile data to that discussed herein with respect to the profile storage 270 of the system component(s) 120), or other components. In at least some embodiments, the profile storage 270 may only store profile data for a user or group of users specifically associated with the device 110. The user device 110 may also have its own language output component 293 which may include NLG component 279 and TTS component 280.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s) 120.

The hybrid selector 224, of the device 110, may include a hybrid proxy (HP) 226 configured to proxy traffic to/from the system component(s) 120. For example, the HP 226 may be configured to send messages to/from a hybrid execution controller (HEC) 227 of the hybrid selector 224. For example, command/directive data received from the system component(s) 120 can be sent to the HEC 227 using the HP 226. The HP 226 may also be configured to allow the audio data 111 to pass to the system component(s) 120 while also receiving (e.g., intercepting) this audio data 111 and sending the audio data 111 to the HEC 227.

In at least some embodiments, the hybrid selector 224 may further include a local request orchestrator (LRO) 228 configured to notify the ASR component 150 about the availability of new audio data 111 that represents user speech, and to otherwise initiate the operations of local language processing when new audio data 111 becomes available. In general, the hybrid selector 224 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) 120 and chooses to use that remotely-determined directive data.

Thus, when the audio data 111 is received, the HP 226 may allow the audio data 111 to pass through to the system component(s) 120 and the HP 226 may also input the audio data 111 to the on-device ASR component 150 by routing the audio data 111 through the HEC 227 of the hybrid selector 224, whereby the LRO 228 notifies the ASR component 150 of the audio data 111. At this point, the hybrid selector 224 may wait for response data from either or both of the system component(s) 120 or the local language processing components. However, the disclosure is not limited thereto, and in some examples the hybrid selector 224 may send the audio data 111 only to the local ASR component 150 without departing from the disclosure. For example, the user device 110 may process the audio data 111 locally without sending the audio data 111 to the system component(s) 120.

The local ASR component 150 is configured to receive the audio data 111 from the hybrid selector 224, and to recognize speech in the audio data 111, and the local NLU component 160 is configured to determine a user intent from the recognized speech, and to determine how to act on the user intent by generating NLU output data which may include directive data (e.g., instructing a component to perform an action). Such NLU output data may take a form similar to that as determined by the NLU component 160 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 160) may be selected as usable to respond to a natural language user input, and local response data may be sent (e.g., local NLU output data, local knowledge base information, internet search results, and/or local directive data) to the hybrid selector 224, such as a "ReadyToExecute" response. The hybrid selector 224 may then determine whether to use directive data from the on-device components to respond to the natural language user input, to use directive data received from the system component(s) 120, assuming a remote response is even received (e.g., when the user device 110 is able to access the system component(s) 120 over the network(s) 199), or to determine output audio requesting additional information from the user 105.

The user device 110 and/or the system component(s) 120 may associate a unique identifier with each natural language user input. The user device 110 may include the unique identifier when sending the audio data 111 to the system component(s) 120, and the response data from the system component(s) 120 may include the unique identifier to identify which natural language user input the response data corresponds.

In at least some embodiments, the user device 110 may include, or be configured to use, one or more skill components 190 that may work similarly to the skill component(s) 190 implemented by the system component(s) 120. The skill component(s) 190 may correspond to one or more domains that are used in order to determine how to act on a spoken input in a particular way, such as by outputting a directive that corresponds to the determined intent, and which can be processed to implement the desired operation. The skill component(s) 190 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill support systems 125. For example, a skill support system 125 may be located in a remote environment (e.g., separate location) such that the user device 110 may only communicate with the skill system 125 via the network(s) 199. However, the disclosure is not limited thereto. For example, in at least some embodiments, a skill support system 125 may be configured in a local environment (e.g., home server and/or the like) such that the user device 110 may communicate with the skill support system(s) 125 via a private network, such as a local area network (LAN).

As used herein, a "skill" may refer to a skill component 190, a skill support system(s) 125, or a combination of a skill component 190 and a corresponding skill support system(s) 125. Similar to the manner discussed with regard to FIG. 2B, the local user device 110 may be configured to recognize multiple different wakewords and/or perform different categories of tasks depending on the wakeword. Such different wakewords may invoke different processing components of local user device 110 (not illustrated in FIG. 2D). For example, detection of the wakeword "Alexa" by the wakeword detector 121 may result in sending audio data to certain language processing components 295/skill components 190 for processing while detection of the wakeword "Computer" by the wakeword detector 121 may result in sending different audio data by the language processing components 295/skill components 190 for processing.

FIG. 3 illustrates a vehicle-based user interface according to embodiments of the present disclosure. FIG. 3 illustrates an interior of the vehicle 110a. The vehicle 110a may include, on a dashboard, steering wheel, heads-up display, or other interior surface or feature, such as a display 302, which may be a touchscreen display. The vehicle 110a may further include one or more microphones 112, which may be used to receive audio that includes an utterance and generate corresponding input audio data. One or more loudspeakers 114 may be used to output audio corresponding to output audio data, which may be received from the system component(s) 120. One or more lights 308 may be used to display information; in some embodiments, the lights 308 are used to identify a speech processing system being used to provide output audio and/or perform a task. For example, one light 308 may be illuminated when a first assistant system is being used to output audio and/or perform an action, and a second light 308 may be illuminated when a second assistant system is being used. In another example, a light 308 is illuminated using a first color (e.g., blue) when a first assistant system is being used, and same light 308 is illuminated using a second color (e.g., green) when a second assistant system is being used. The vehicle 110a may further include one or more buttons 113, dials, switches, triggers, or other such user-input devices. In some embodiments, when the vehicle 110a detects activation of a button 113 and/or touching of the display 302, the microphone 112 captures audio, and the vehicle 110 sends corresponding audio data to the system component(s) 120. The vehicle 110a may invoke different assistants depending on the manner of button activation; for example, a tap-to-talk may invoke a first assistant (e.g., the automotive assistant) and a press-and-hold may invoke a second assistant (e.g., the other assistant). In other embodiments, the vehicle 110a continually receives audio data captured by the microphone 112 and sends corresponding audio data to the system component(s) 120 when the vehicle 110a detects a wakeword in the audio data (as described in greater detail herein).

Figure 4:
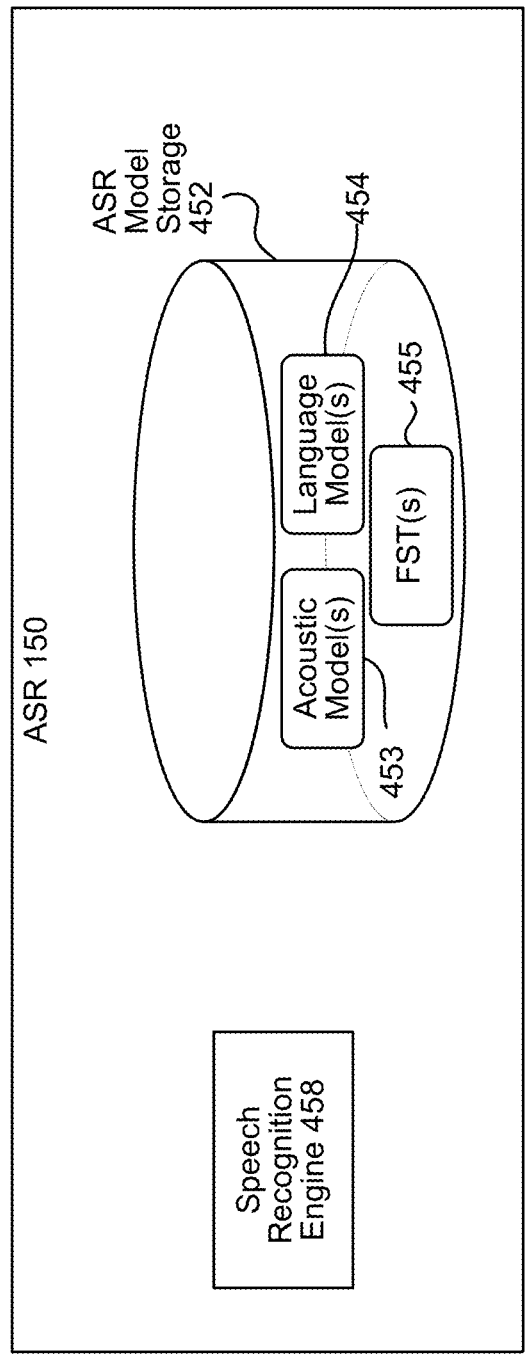
FIG. 4 is a conceptual diagram of an automatic speech recognition component, according to embodiments of the present disclosure.

FIG. 4 is a conceptual diagram of an ASR component 150, according to embodiments of the present disclosure. The ASR component 150 may interpret a spoken natural language input based on the similarity between the spoken natural language input and pre-established language models 454 stored in an ASR model storage 452. For example, the ASR component 150 may compare the audio data with models for sounds (e.g., subword units or phonemes) and sequences of sounds to identify words that match the sequence of sounds spoken in the natural language input. Alternatively, the ASR component 150 may use a finite state transducer (FST) 455 to implement the language model functions.

When the ASR component 150 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 453 stored in the ASR model storage 452), and the likelihood that a particular word, which matches the sounds, would be included in the sentence at the specific location (e.g., using a language or grammar model 454). Based on the considered factors and the assigned confidence score, the ASR component 150 may output an ASR hypothesis that most likely matches the spoken natural language input, or may output multiple ASR hypotheses in the form of a lattice or an N-best list, with each ASR hypothesis corresponding to a respective score.

The ASR component 150 may include a speech recognition engine 458. The ASR component 150 receives audio data 111 (for example, received from a local user device 110 having processed audio detected by a microphone by an acoustic front end (AFE) or other component). The speech recognition engine 458 compares the audio data 111 with acoustic models 453, language models 454, FST(s) 455, and/or other data models and information for recognizing the speech conveyed in the audio data. The audio data 111 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 458 may process the audio data 111 with reference to information stored in the ASR model storage 42. Feature vectors of the audio data 111 may arrive at the system component(s) 120 encoded, in which case they may be decoded prior to processing by the speech recognition engine 458.

The speech recognition engine 458 attempts to match received feature vectors to language acoustic units (e.g., phonemes) and words as known in the stored acoustic models 453, language models 2B54, and FST(s) 455. For example, audio data 111 may be processed by one or more acoustic model(s) 453 to determine acoustic unit data. The acoustic unit data may include indicators of acoustic units detected in the audio data 111 by the ASR component 150. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 454 (and/or using FST 455) to determine ASR data 610. The ASR data 610 can include one or more hypotheses. One or more of the hypotheses represented in the ASR data 610 may then be sent to further components (such as the NLU component 160) for further processing as discussed herein. The ASR data 610 may include representations of text of an utterance, such as words, subword units, or the like.

The speech recognition engine 458 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 150 will output ASR hypotheses that make sense grammatically. The specific models used may be general models or may be models corresponding to a particular domain, such as music, banking, etc.

The speech recognition engine 458 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 458 may use the acoustic model(s) 453 to attempt to match received audio feature vectors to words or subword acoustic units. An acoustic unit may be a senone, phoneme, phoneme in context, syllable, part of a syllable, syllable in context, or any other such portion of a word. The speech recognition engine 458 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 150 outputs ASR hypotheses that make sense grammatically.

The speech recognition engine 458 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 458, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 458 may also compute scores of branches of the paths based on language models or grammars. Language modeling involves determining scores for what words are likely to be used together to form coherent words and sentences. Application of a language model may improve the likelihood that the ASR component 150 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

In some implementations, the ASR component 150 may load different and/or additional acoustic models 453, FSTs 455, and/or language models 454 depending on a context associated with the received audio data 111. For example, the ASR component 150 may load different models depending on a user, device, device type, etc., associated with the audio data 111. In some implementations, the ASR component 150 may load models associated with assistants eligible and/or available for handling commands received from the device 110. Leveraging assistant-specific models may improve the quality of ASR result data and/or reduce the computational load of ASR processing.

Figure 5:
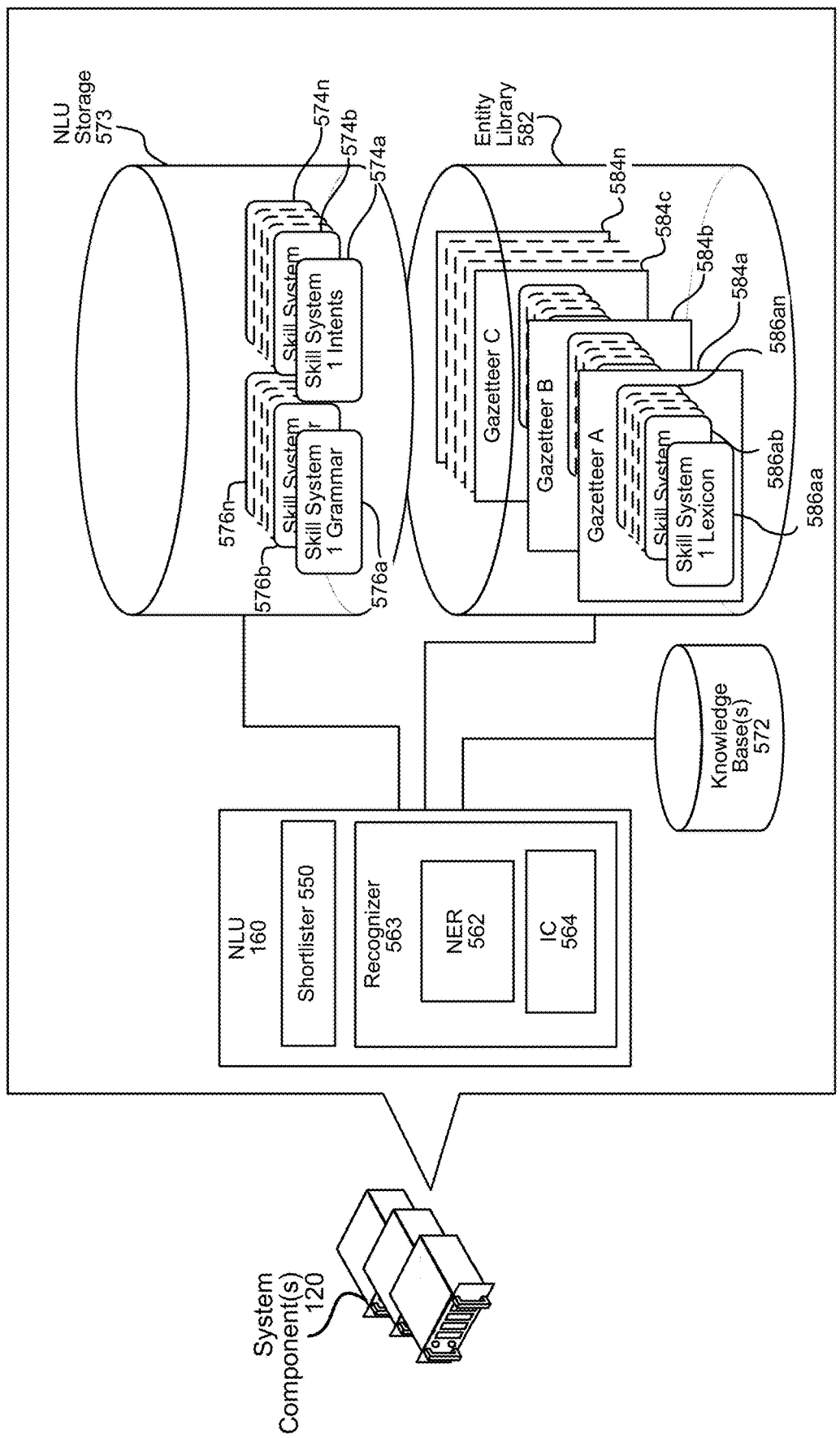
FIG. 5 is a conceptual diagram of how natural language processing is performed, according to embodiments of the present disclosure.
Figure 6:
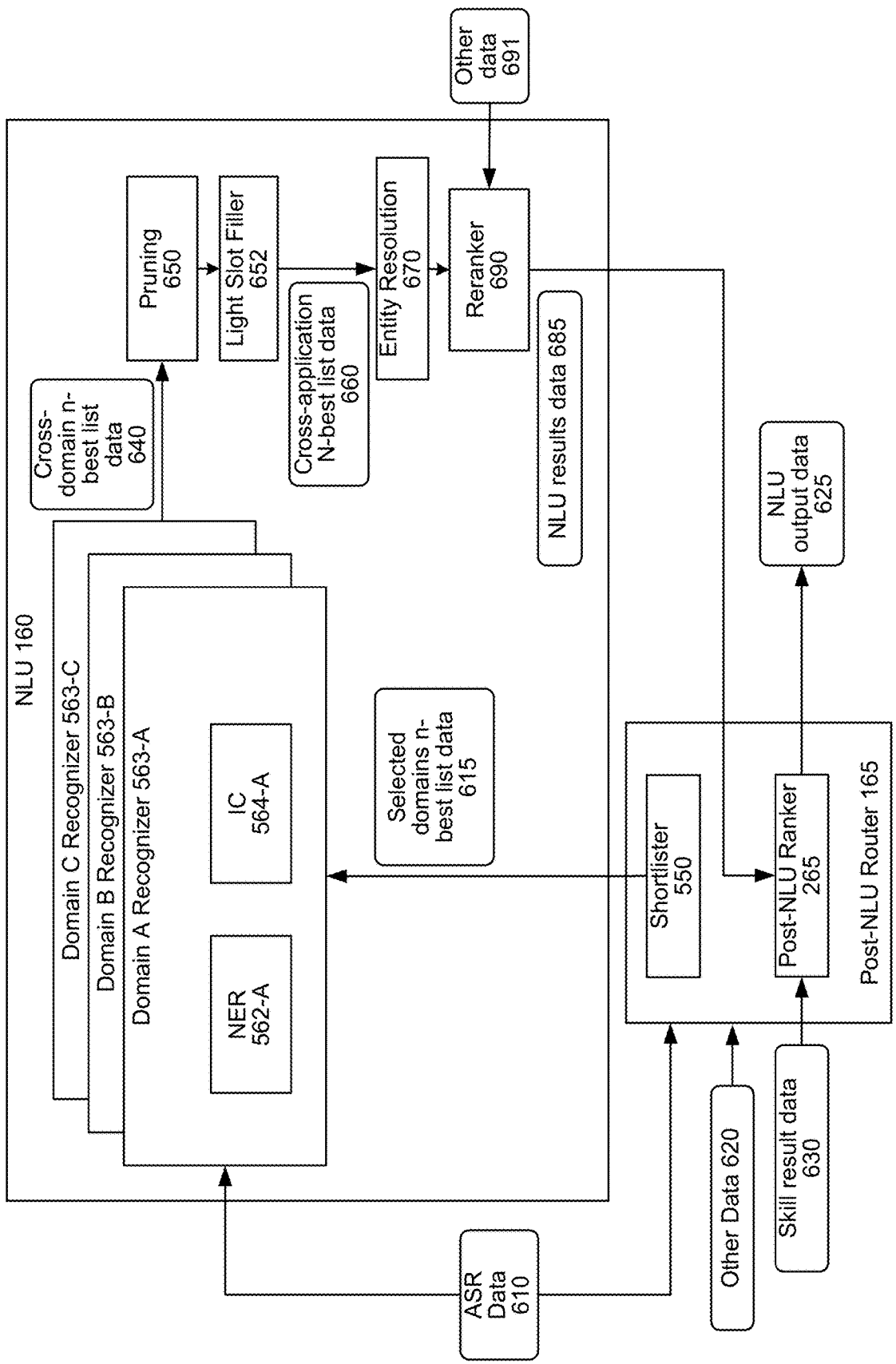
FIG. 6 is a conceptual diagram of how natural language processing is performed, according to embodiments of the present disclosure.

FIGS. 5 and 6 illustrates how the NLU component 160 may perform NLU processing. FIG. 5 is a conceptual diagram of how natural language processing is performed, according to embodiments of the present disclosure. And FIG. 6 is a conceptual diagram of how natural language processing is performed, according to embodiments of the present disclosure.

FIG. 5 illustrates how NLU processing is performed on text data. The NLU component 160 may process text data including several ASR hypotheses of a single user input. For example, if the ASR component 150 outputs text data including an n-best list of ASR hypotheses, the NLU component 160 may process the text data with respect to all (or a portion of) the ASR hypotheses represented therein.

The NLU component 160 may annotate text data by parsing and/or tagging the text data. For example, for the text data "tell me the weather for Seattle," the NLU component 160 may tag "tell me the weather for Seattle" as an <OutputWeather> intent as well as separately tag "Seattle" as a location for the weather information.

The NLU component 160 may leverage libraries of data related to intents, slot data, and/or entities. For example, the NLU component 160 may reference NLU storage 573 and entity library 582. The NLU storage 573 may contain skill system grammars 576 and skill system intents 574. The entity library 582 may include gazetteers 584, each associated skill system lexicons 586. The NLU component 160 may process ASR hypotheses based on the information in these various data. In some implementations, the NLU component 160 may add or remove portions of this various data depending on a list of assistants eligible and/or available for handling a given input. For example, different skill systems and/or intents may be relevant depending on which assistants are enabled for use with the device 110. Additionally or alternatively, a reranker or a post-NLU ranker (e.g., the reranker 690 and/or post-NLU ranker 265 discussed below) may take into account assistant information when ranking NLU hypotheses. The post-NLU ranker 265 may be included in another component such as a post-NLU router 165.

The NLU component 160 and/or post-NLU router 165 may include a shortlister component 550. The shortlister component 550 selects skill components that may execute with respect to ASR output data 610 input to the NLU component 160 (e.g., applications that may execute with respect to the user input). The ASR output data 610 (which may also be referred to as ASR data 610) may include representations of text of an utterance, such as words, subword units, or the like. The shortlister component 550 thus limits downstream, more resource intensive NLU processes to being performed with respect to skill components that may execute with respect to the user input.

Without a shortlister component 550, the NLU component 160 may process ASR output data 610 input thereto with respect to every skill of the system, either in parallel, in series, or using some combination thereof. By implementing a shortlister component 550, the NLU component 160 may process ASR output data 610 with respect to only the skill components that may execute with respect to the user input. This reduces total compute power and latency attributed to NLU processing.

The shortlister component 550 may include one or more trained models. The model(s) may be trained to recognize various forms of user inputs that may be received by the system component(s) 120. For example, during a training period skill system(s) 125 associated with a skill may provide the system component(s) 120 with training text data representing sample user inputs that may be provided by a user to invoke the skill component. For example, for a ride sharing skill component, a skill system(s) 125 associated with the ride sharing skill component may provide the system component(s) 120 with training text data including text corresponding to "get me a cab to [location]," "get me a ride to [location]," "book me a cab to [location]," "book me a ride to [location]," etc. The one or more trained models that will be used by the shortlister component 550 may be trained, using the training text data representing sample user inputs, to determine other potentially related user input structures that users may try to use to invoke the particular skill. During training, the system component(s) 120 may solicit the skill system(s) 125 associated with the skill regarding whether the determined other user input structures are permissible, from the perspective of the skill system(s) 125, to be used to invoke the skill component. The alternate user input structures may be derived by one or more trained models during model training and/or may be based on user input structures provided by different skill components. The skill system(s) 125 associated with a particular skill component may also provide the system component(s) 120 with training text data indicating grammar and annotations. The system component(s) 120 may use the training text data representing the sample user inputs, the determined related user input(s), the grammar, and the annotations to train a model(s) that indicates when a user input is likely to be directed to/handled by a skill component, based at least in part on the structure of the user input. Each trained model of the shortlister component 550 may be trained with respect to a different skill. Alternatively, the shortlister component 550 may use one trained model per domain, such as one trained model for skill components associated with a weather domain, one trained model for skills associated with a ride sharing domain, etc.

The system component(s) 120 may use the sample user inputs provided by a skill system(s) 125, and related sample user inputs potentially determined during training, as binary examples to train a model associated with a skill component associated with the skill system(s) 125. The model associated with the particular skill component may then be operated at runtime by the shortlister component 550. For example, some sample user inputs may be positive examples (e.g., user inputs that may be used to invoke the skill component). Other sample user inputs may be negative examples (e.g., user inputs that may not be used to invoke the skill component).

As described above, the shortlister component 550 may include a different trained model for each skill component of the system, a different trained model for each domain, or some other combination of trained model(s). For example, the shortlister component 550 may alternatively include a single model. The single model may include a portion trained with respect to characteristics (e.g., semantic characteristics) shared by all skill components of the system. The single model may also include skill-specific portions, with each skill-specific portion being trained with respect to a specific skill component of the system. Implementing a single model with skill-specific portions may result in less latency than implementing a different trained model for each skill component because the single model with skill-specific portions limits the number of characteristics processed on a per skill component level.

The portion trained with respect to characteristics shared by more than one skill component may be clustered based on domain. For example, a first portion of the portion trained with respect to multiple skill components may be trained with respect to weather domain skills, a second portion of the portion trained with respect to multiple skill components may be trained with respect to music domain skills, a third portion of the portion trained with respect to multiple skill components may be trained with respect to travel domain skill components, etc.

Clustering may not be beneficial in every instance because it may cause the shortlister component 550 to output indications of only a portion of the skill components that the ASR output data 610 may relate to. For example, a user input may correspond to "tell me about Tom Collins." If the model is clustered based on domain, the shortlister component 550 may determine the user input corresponds to a recipe skill component (e.g., a drink recipe) even though the user input may also correspond to an information skill component (e.g., including information about a person named Tom Collins).

The NLU component 160 may include one or more recognizers 563. In at least some embodiments, a recognizer 563 may be associated with a skill support system(s) 125 (e.g., the recognizer may be configured to interpret text data to correspond to the skill support system 125). In at least some other examples, a recognizer 563 may be associated with a domain such as smart home, video, music, weather, custom, etc. (e.g., the recognizer may be configured to interpret text data to correspond to the domain).

If the shortlister component 550 determines ASR output data 610 is potentially associated with multiple domains, the recognizers 563 associated with the domains may process the ASR output data 610, while recognizers 563 not indicated in the shortlister component 550's output may not process the ASR output data 610. The "shortlisted" recognizers 563 may process the ASR output data 610 in parallel, in series, partially in parallel, etc. For example, if ASR output data 610 potentially relates to both a communications domain and a music domain, a recognizer associated with the communications domain may process the ASR output data 610 in parallel, or partially in parallel, with a recognizer associated with the music domain processing the ASR output data 610.

Each recognizer 563 may include a named entity recognition (NER) component 562. The NER component 562 attempts to identify grammars and lexical information that may be used to construe meaning with respect to text data input therein. The NER component 562 identifies portions of text data that correspond to a named entity associated with a domain, associated with the recognizer 563 implementing the NER component 562. The NER component 562 (or other component of the NLU component 160) may also determine whether a word refers to an entity whose identity is not explicitly mentioned in the text data, for example "him," "her," "it" or other anaphora, exophora, or the like.

Each recognizer 563, and more specifically each NER component 562, may be associated with a particular grammar database 576, a particular set of intents/actions 574, and a particular personalized lexicon 586. Each gazetteer 584 may include domain/skill-indexed lexical information associated with a particular user and/or device 110. For example, a Gazetteer A (584a) includes skill-indexed lexical information 586aa to 586an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 562 applies grammar information 576 and lexical information 586 associated with a domain (associated with the recognizer 563 implementing the NER component 562) to determine a mention of one or more entities in text data. In this manner, the NER component 562 identifies "slots" (each corresponding to one or more particular words in text data) that may be useful for later processing. The NER component 562 may also label each slot with a type (e.g., noun, place, city, artist name, song name, etc.).

Each grammar database 576 includes the names of entities (i.e., nouns) commonly found in speech about the particular domain to which the grammar database 576 relates, whereas the lexical information 586 is personalized to the user and/or the user device 110 from which the user input originated. For example, a grammar database 576 associated with a shopping domain may include a database of words commonly used when people discuss shopping.

A downstream process called entity resolution (discussed in detail elsewhere herein) links a slot of text data to a specific entity known to the system. To perform entity resolution, the NLU component 160 may utilize gazetteer information (584a-584n) stored in an entity library storage 582. The gazetteer information 584 may be used to match text data (representing a portion of the user input) with text data representing known entities, such as song titles, contact names, etc. Gazetteers 584 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 563 may also include an intent classification (IC) component 564. An IC component 564 parses text data to determine an intent(s) (associated with the domain associated with the recognizer 563 implementing the IC component 564) that potentially represents the user input. An intent represents to an action a user desires be performed. An IC component 564 may communicate with a database 574 of words linked to intents. For example, a music intent database may link words and phrases such as "quiet," "volume off," and "mute" to a <Mute> intent. An IC component 564 identifies potential intents by comparing words and phrases in text data (representing at least a portion of the user input) to the words and phrases in an intents database 574 (associated with the domain that is associated with the recognizer 563 implementing the IC component 564).

The intents identifiable by a specific IC component 564 are linked to domain-specific (i.e., the domain associated with the recognizer 563 implementing the IC component 564) grammar frameworks 576 with "slots" to be filled. Each slot of a grammar framework 576 corresponds to a portion of text data that the system believes corresponds to an entity. For example, a grammar framework 576 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 576 may not be structured as sentences, but rather based on associating slots with grammatical tags.

For example, an NER component 562 may parse text data to identify words as subject, object, verb, preposition, etc. based on grammar rules and/or models prior to recognizing named entities in the text data. An IC component 564 (implemented by the same recognizer 563 as the NER component 562) may use the identified verb to identify an intent. The NER component 562 may then determine a grammar model 576 associated with the identified intent. For example, a grammar model 576 for an intent corresponding to <PlayMusic> may specify a list of slots applicable to play the identified "object" and any object modifier (e.g., a prepositional phrase), such as {Artist Name}, {Album Name}, {Song name}, etc. The NER component 562 may then search corresponding fields in a lexicon 586 (associated with the domain associated with the recognizer 563 implementing the NER component 562), attempting to match words and phrases in text data the NER component 562 previously tagged as a grammatical object or object modifier with those identified in the lexicon 586.

An NER component 562 may perform semantic tagging, which is the labeling of a word or combination of words according to their type/semantic meaning. An NER component 562 may parse text data using heuristic grammar rules, or a model may be constructed using techniques such as Hidden Markov Models, maximum entropy models, log linear models, conditional random fields (CRF), and the like. For example, an NER component 562 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 562 identifies "Play" as a verb based on a word database associated with the music domain, which an IC component 564 (also implemented by the music domain recognizer) may determine corresponds to a <PlayMusic> intent. At this stage, no determination has been made as to the meaning of "mother's little helper" or "the rolling stones," but based on grammar rules and models, the NER component 562 has determined the text of these phrases relates to the grammatical object (i.e., entity) of the user input represented in the text data.

An NER component 562 may tag text data to attribute meaning thereto. For example, an NER component 562 may tag "play mother's little helper by the rolling stones" as: {domain} Music, {intent}<PlayMusic>, {artist name} rolling stones, {media type} SONG, and {song title} mother's little helper. For further example, the NER component 562 may tag "play songs by the rolling stones" as: {domain} Music, {intent}<PlayMusic>, {artist name} rolling stones, and {media type} SONG.

The shortlister component 550 may receive ASR output data 610 output from the ASR component 150 or output from the device 110b (as illustrated in FIG. 6). The ASR component 150 may embed the ASR output data 610 into a form processable by a trained model(s) using sentence embedding techniques as known in the art. Sentence embedding results in the ASR output data 610 including text in a structure that enables the trained models of the shortlister component 650 to operate on the ASR output data 610. For example, an embedding of the ASR output data 610 may be a vector representation of the ASR output data 610.

The shortlister component 550 may make binary determinations (e.g., yes or no) regarding which domains relate to the ASR output data 610. The shortlister component 550 may make such determinations using the one or more trained models described herein above. If the shortlister component 550 implements a single trained model for each domain, the shortlister component 550 may simply run the models that are associated with enabled domains as indicated in a user profile associated with the user device 110 and/or user that originated the user input.

The shortlister component 550 may generate n-best list data 615 representing domains that may execute with respect to the user input represented in the ASR output data 610. The size of the n-best list represented in the n-best list data 615 is configurable. In an example, the n-best list data 615 may indicate every domain of the system as well as contain an indication, for each domain, regarding whether the domain is likely capable to execute the user input represented in the ASR output data 610. In another example, instead of indicating every domain of the system, the n-best list data 615 may only indicate the domains that are likely to be able to execute the user input represented in the ASR output data 610. In yet another example, the shortlister component 550 may implement thresholding such that the n-best list data 615 may indicate no more than a maximum number of domains that may execute the user input represented in the ASR output data 610. In an example, the threshold number of domains that may be represented in the n-best list data 615 is ten. In another example, the domains included in the n-best list data 615 may be limited by a threshold a score, where only domains indicating a likelihood to handle the user input is above a certain score (as determined by processing the ASR output data 610 by the shortlister component 550 relative to such domains) are included in the n-best list data 615.

The ASR output data 610 may correspond to more than one ASR hypothesis. When this occurs, the shortlister component 550 may output a different n-best list (represented in the n-best list data 615) for each ASR hypothesis. Alternatively, the shortlister component 550 may output a single n-best list representing the domains that are related to the multiple ASR hypotheses represented in the ASR output data 610.

As indicated above, the shortlister component 550 may implement thresholding such that an n-best list output therefrom may include no more than a threshold number of entries. If the ASR output data 610 includes more than one ASR hypothesis, the n-best list output by the shortlister component 550 may include no more than a threshold number of entries irrespective of the number of ASR hypotheses output by the ASR component 150. Alternatively or in addition, the n-best list output by the shortlister component 550 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 610, the shortlister component 550 may generate confidence scores representing likelihoods that domains relate to the ASR output data 610. If the shortlister component 550 implements a different trained model for each domain, the shortlister component 550 may generate a different confidence score for each individual domain trained model that is run. If the shortlister component 550 runs the models of every domain when ASR output data 610 is received, the shortlister component 550 may generate a different confidence score for each domain of the system. If the shortlister component 550 runs the models of only the domains that are associated with skill components indicated as enabled in a user profile associated with the user device 110 and/or user that originated the user input, the shortlister component 550 may only generate a different confidence score for each domain associated with at least one enabled skill component. If the shortlister component 550 implements a single trained model with domain specifically trained portions, the shortlister component 550 may generate a different confidence score for each domain who's specifically trained portion is run. The shortlister component 550 may perform matrix vector modification to obtain confidence scores for all domains of the system in a single instance of processing of the ASR output data 610.

N-best list data 615 including confidence scores that may be output by the shortlister component 550 may be represented as, for example:

Search domain, 0.67
Recipe domain, 0.62
Information domain, 0.57
Shopping domain, 0.42

As indicated, the confidence scores output by the shortlister component 550 may be numeric values. The confidence scores output by the shortlister component 550 may alternatively be binned values (e.g., high, medium, low).

The n-best list may only include entries for domains having a confidence score satisfying (e.g., equaling or exceeding) a minimum threshold confidence score. Alternatively, the shortlister component 550 may include entries for all domains associated with user enabled skill components, even if one or more of the domains are associated with confidence scores that do not satisfy the minimum threshold confidence score.

The shortlister component 550 may consider other data 620 when determining which domains may relate to the user input represented in the ASR output data 610 as well as respective confidence scores. The other data 620 may include usage history data associated with the user device 110 and/or user that originated the user input. For example, a confidence score of a domain may be increased if user inputs originated by the user device 110 and/or user routinely invoke the domain. Conversely, a confidence score of a domain may be decreased if user inputs originated by the user device 110 and/or user rarely invoke the domain. Thus, the other data 620 may include an indicator of the user associated with the ASR output data 610, for example as determined by a user recognition component (not shown).

The other data 620 may be character embedded prior to being input to the shortlister component 550. The other data 620 may alternatively be embedded using other techniques known in the art prior to being input to the shortlister component 550.

The other data 620 may also include data indicating the domains associated with skill components that are enabled with respect to the user device 110 and/or user that originated the user input. The shortlister component 550 may use such data to determine which domain-specific trained models to run. That is, the shortlister component 550 may determine to only run the trained models associated with domains that are associated with user-enabled skill components. The shortlister component 550 may alternatively use such data to alter confidence scores of domains.

The other data 620 may include an account ID, for the user 105, provided by the orchestrator component 130. For example, as described herein, the orchestrator component 130 may send a first account ID for the user 105 associated with the automotive assistant system when the user input is directed to the automotive assistant. As another example, the orchestrator component 130 may send a second account ID for the user 105 associated with the other assistant system when the user input is directed to the other assistant.

As an example, considering two domains, a first domain associated with at least one enabled skill component and a second domain not associated with any user-enabled skill components of the user that originated the user input, the shortlister component 550 may run a first model specific to the first domain as well as a second model specific to the second domain. Alternatively, the shortlister component 550 may run a model configured to determine a score for each of the first and second domains. The shortlister component 550 may determine a same confidence score for each of the first and second domains in the first instance. The shortlister component 550 may then alter those confidence scores based on which domains is associated with at least one skill component enabled by the present user. For example, the shortlister component 550 may increase the confidence score associated with the domain associated with at least one enabled skill component while leaving the confidence score associated with the other domain the same. Alternatively, the shortlister component 550 may leave the confidence score associated with the domain associated with at least one enabled skill component the same while decreasing the confidence score associated with the other domain. Moreover, the shortlister component 550 may increase the confidence score associated with the domain associated with at least one enabled skill component as well as decrease the confidence score associated with the other domain.

As indicated, a user profile may indicate which skill components a corresponding user has enabled (e.g., authorized to execute using data associated with the user). Such indications may be stored in the profile storage 270. When the shortlister component 550 receives the ASR output data 610, the shortlister component 550 may determine whether profile data associated with the user and/or user device 110 that originated the command includes an indication of enabled skill components.

The other data 620 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 550 may use such data to determine which domain-specific trained models to run. For example, if the user device 110 corresponds to a displayless type device, the shortlister component 550 may determine not to run trained models specific to domains that output video data. The shortlister component 550 may alternatively use such data to alter confidence scores of domains.

As an example, considering two domains, one that outputs audio data and another that outputs video data, the shortlister component 550 may run a first model specific to the domain that generates audio data as well as a second model specific to the domain that generates video data. Alternatively the shortlister component 550 may run a model configured to determine a score for each domain. The shortlister component 550 may determine a same confidence score for each of the domains in the first instance. The shortlister component 550 may then alter the original confidence scores based on the type of the user device 110 that originated the user input corresponding to the ASR output data 610. For example, if the user device 110 is a displayless device, the shortlister component 550 may increase the confidence score associated with the domain that generates audio data while leaving the confidence score associated with the domain that generates video data the same. Alternatively, if the user device 110 is a displayless device, the shortlister component 550 may leave the confidence score associated with the domain that generates audio data the same while decreasing the confidence score associated with the domain that generates video data. Moreover, if the user device 110 is a displayless device, the shortlister component 550 may increase the confidence score associated with the domain that generates audio data as well as decrease the confidence score associated with the domain that generates video data.

The type of device information represented in the other data 620 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 620 may represent the smart TV of other display device, and not the displayless device that captured the spoken user input.

The other data 620 may also include data indicating the user input originating device's speed, location, or other mobility information. For example, the device may correspond to a vehicle including a display. If the vehicle is moving, the shortlister component 550 may decrease the confidence score associated with a domain that generates video data as it may be undesirable to output video content to a user while the user is driving. The device may output data to the system component(s) 120 indicating when the device is moving.

The other data 620 may also include data indicating a currently invoked domain. For example, a user may speak a first (e.g., a previous) user input causing the system to invoke a music domain skill component to output music to the user. As the system is outputting music to the user, the system may receive a second (e.g., the current) user input. The shortlister component 550 may use such data to alter confidence scores of domains. For example, the shortlister component 550 may run a first model specific to a first domain as well as a second model specific to a second domain. Alternatively, the shortlister component 550 may run a model configured to determine a score for each domain. The shortlister component 550 may also determine a same confidence score for each of the domains in the first instance. The shortlister component 550 may then alter the original confidence scores based on the first domain being invoked to cause the system to output content while the current user input was received. Based on the first domain being invoked, the shortlister component 550 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 615 generated by the shortlister component 550 as well as the different types of other data 620 considered by the shortlister component 550 are configurable. For example, the shortlister component 550 may update confidence scores as more other data 620 is considered. For further example, the n-best list data 615 may exclude relevant domains if thresholding is implemented. Thus, for example, the shortlister component 550 may include an indication of a domain in the n-best list 615 unless the shortlister component 550 is one hundred percent confident that the domain may not execute the user input represented in the ASR output data 610 (e.g., the shortlister component 550 determines a confidence score of zero for the domain).

The shortlister component 550 may send the ASR output data 610 to recognizers 563 associated with domains represented in the n-best list data 615. Alternatively, the shortlister component 550 may send the n-best list data 615 or some other indicator of the selected subset of domains to another component (such as the orchestrator component 130) which may in turn send the ASR output data 610 to the recognizers 563 corresponding to the domains included in the n-best list data 615 or otherwise indicated in the indicator. If the shortlister component 550 generates an n-best list representing domains without any associated confidence scores, the shortlister component 550/orchestrator component 130 may send the ASR output data 610 to recognizers 563 associated with domains that the shortlister component 550 determines may execute the user input. If the shortlister component 550 generates an n-best list representing domains with associated confidence scores, the shortlister component 550/orchestrator component 130 may send the ASR output data 610 to recognizers 563 associated with domains associated with confidence scores satisfying (e.g., meeting or exceeding) a threshold minimum confidence score.

A recognizer 563 may output tagged text data generated by an NER component 562 and an IC component 564, as described herein above. The NLU component 160 may compile the output tagged text data of the recognizers 563 into a single cross-domain n-best list 640 and may send the cross-domain n-best list 640 to a pruning component 650. Each entry of tagged text (e.g., each NLU hypothesis) represented in the cross-domain n-best list data 640 may be associated with a respective score indicating a likelihood that the NLU hypothesis corresponds to the domain associated with the recognizer 563 from which the NLU hypothesis was output. For example, the cross-domain n-best list data 640 may be represented as (with each line corresponding to a different NLU hypothesis):

- [0.95] Intent: <PlayMusic> ArtistName: Beethoven SongName: Waldstein Sonata
- [0.70] Intent: <PlayVideo> ArtistName: Beethoven VideoName: Waldstein Sonata
- [0.01] Intent: <PlayMusic> ArtistName: Beethoven AlbumName: Waldstein Sonata
- [0.01] Intent: <PlayMusic> SongName: Waldstein Sonata The pruning component 650 may sort the NLU hypotheses represented in the cross-domain n-best list data 640 according to their respective scores. The pruning component 650 may perform score thresholding with respect to the cross-domain NLU hypotheses. For example, the pruning component 650 may select NLU hypotheses associated with scores satisfying (e.g., meeting and/or exceeding) a threshold score. The pruning component 650 may also or alternatively perform number of NLU hypothesis thresholding. For example, the pruning component 650 may select the top scoring NLU hypothesis(es). The pruning component 650 may output a portion of the NLU hypotheses input thereto. The purpose of the pruning component 650 is to create a reduced list of NLU hypotheses so that downstream, more resource intensive, processes may only operate on the NLU hypotheses that most likely represent the user's intent.

The NLU component 160 may include a light slot filler component 652. The light slot filler component 652 can take text from slots represented in the NLU hypotheses output by the pruning component 650 and alter them to make the text more easily processed by downstream components. The light slot filler component 652 may perform low latency operations that do not involve heavy operations such as reference to a knowledge base (e.g., 572. The purpose of the light slot filler component 652 is to replace words with other words or values that may be more easily understood by downstream components. For example, if a NLU hypothesis includes the word "tomorrow," the light slot filler component 652 may replace the word "tomorrow" with an actual date for purposes of downstream processing. Similarly, the light slot filler component 652 may replace the word "CD" with "album" or the words "compact disc." The replaced words are then included in the cross-domain n-best list data 660.

The cross-domain n-best list data 660 may be input to an entity resolution component 670. The entity resolution component 670 can apply rules or other instructions to standardize labels or tokens from previous stages into an intent/slot representation. The precise transformation may depend on the domain. For example, for a travel domain, the entity resolution component 670 may transform text corresponding to "Boston airport" to the standard BOS three-letter code referring to the airport. The entity resolution component 670 can refer to a knowledge base (e.g., 572) that is used to specifically identify the precise entity referred to in each slot of each NLU hypothesis represented in the cross-domain n-best list data 660. Specific intent/slot combinations may also be tied to a particular source, which may then be used to resolve the text. In the example "play songs by the stones," the entity resolution component 670 may reference a personal music catalog, Amazon Music account, a user profile, or the like. The entity resolution component 670 may output an altered n-best list that is based on the cross-domain n-best list 660 but that includes more detailed information (e.g., entity IDs) about the specific entities mentioned in the slots and/or more detailed slot data that can eventually be used by a skill. The NLU component 160 may include multiple entity resolution components 670 and each entity resolution component 670 may be specific to one or more domains.

The NLU component 160 may include a reranker 690. The reranker 690 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 670.

The reranker 690 may apply re-scoring, biasing, or other techniques. The reranker 690 may consider not only the data output by the entity resolution component 670, but may also consider other data 691. The other data 691 may include a variety of information. For example, the other data 691 may include skill rating or popularity data. For example, if one skill has a high rating, the reranker 690 may increase the score of a NLU hypothesis that may be processed by the skill component. The other data 691 may also include information about skill components that have been enabled by the user that originated the user input. For example, the reranker 690 may assign higher scores to NLU hypothesis that may be processed by enabled skill components than NLU hypothesis that may be processed by non-enabled skill components. The other data 691 may also include data indicating user usage history, such as if the user that originated the user input regularly uses a particular skill or does so at particular times of day. The other data 691 may additionally include data indicating date, time, location, weather, type of device 110, user identifier, context, as well as other information. For example, the reranker 690 may consider when any particular skill component is currently active (e.g., music being played, a game being played, etc.).

As illustrated and described, the entity resolution component 670 is implemented prior to the reranker 690. The entity resolution component 670 may alternatively be implemented after the reranker 690. Implementing the entity resolution component 670 after the reranker 690 limits the NLU hypotheses processed by the entity resolution component 670 to only those hypotheses that successfully pass through the reranker 690.

The reranker 690 may be a global reranker (e.g., one that is not specific to any particular domain). Alternatively, the NLU component 160 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 160 may perform NLU processing described above with respect to domains associated with skill components wholly implemented as part of the system component(s) 120 (e.g., designated 190 in FIG. 2B). The NLU component 160 may separately perform NLU processing described above with respect to domains associated with skill components that are at least partially implemented as part of the skill system(s) 125. In an example, the shortlister component 550 may only process with respect to these latter domains. Results of these two NLU processing paths may be merged into NLU results data 685, which may be sent to a post-NLU ranker 265, which may be implemented by the system component(s) 120.

The post-NLU ranker 265 may include a statistical component that produces a ranked list of intent/skill pairs with associated confidence scores. Each confidence score may indicate an adequacy of the skill component's execution of the intent with respect to NLU results data associated with the skill component. The post-NLU ranker 265 may operate one or more trained models configured to process the NLU results data 685, skill result data 630, and the other data 620 in order to output NLU output data 625. The NLU output data 625 may include an n-best list where the NLU hypotheses in the NLU results data 685 are reordered such that the n-best list in the NLU output data 625 represents a prioritized list of skill components to respond to a user input as determined by the post-NLU ranker 265. The NLU output data 625 may also include (either as part of an n-best list or otherwise) individual respective scores corresponding to skill components where each score indicates a probability that the skill component (and/or its respective result data) corresponds to the user input.

The system may be configured with thousands, tens of thousands, etc. skill components. The post-NLU ranker 265 enables the system to better determine the best skill to execute the user input. For example, first and second NLU hypotheses in the NLU results data 685 may substantially correspond to each other (e.g., their scores may be significantly similar), even though the first NLU hypothesis may be processed by a first skill component and the second NLU hypothesis may be processed by a second skill component. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 265 (or other scheduling component such as orchestrator component 130) may solicit the first skill component and the second skill component to provide potential result data 630 based on the first NLU hypothesis and the second NLU hypothesis, respectively. For example, the post-NLU ranker 265 may send the first NLU hypothesis to the first skill component 190a along with a request for the first skill component 190a to at least partially execute with respect to the first NLU hypothesis. The post-NLU ranker 265 may also send the second NLU hypothesis to the second skill component 190b along with a request for the second skill component 190b to at least partially execute with respect to the second NLU hypothesis. The post-NLU ranker 265 receives, from the first skill component 190a, first result data 630a generated from the first skill component 190a's execution with respect to the first NLU hypothesis. The post-NLU ranker 265 also receives, from the second skill component 190b, second results data 630b generated from the second skill component 190b's execution with respect to the second NLU hypothesis.

The skill result data 630 may include various portions. For example, the result data 630 may include content (e.g., audio data, text data, and/or video data) to be output to a user. The result data 630 may also include a unique identifier used by the system component(s) 120 and/or the skill system(s) 125 to locate the data to be output to a user. The result data 630 may also include an instruction. For example, if the user input corresponds to "turn on the light," the result data 630 may include an instruction causing the system to turn on a light associated with a profile of the device (110a/110b) and/or user.

The post-NLU ranker 265 may consider the first result data 630a and the second result data 630b to alter the first confidence score and the second confidence score of the first NLU hypothesis and the second NLU hypothesis, respectively. That is, the post-NLU ranker 265 may generate a third confidence score based on the first result data 630a and the first confidence score. The third confidence score may correspond to how likely the post-NLU ranker 265 determines the first skill component will correctly respond to the user input. The post-NLU ranker 265 may also generate a fourth confidence score based on the second result data 630b and the second confidence score. One skilled in the art will appreciate that a first difference between the third confidence score and the fourth confidence score may be greater than a second difference between the first confidence score and the second confidence score. The post-NLU ranker 265 may also consider the other data 620 to generate the third confidence score and the fourth confidence score. While it has been described that the post-NLU ranker 265 may alter the confidence scores associated with first and second NLU hypotheses, one skilled in the art will appreciate that the post-NLU ranker 265 may alter the confidence scores of more than two NLU hypotheses. The post-NLU ranker 265 may select the result data 630 associated with the skill component 190 with the highest altered confidence score to be the data output in response to the current user input. The post-NLU ranker 265 may also consider the ASR output data 610 to alter the NLU hypotheses confidence scores.

The orchestrator component 130 may, prior to sending the NLU results data 685 to the post-NLU ranker 265, associate intents in the NLU hypotheses with skill components 190. For example, if a NLU hypothesis includes a <PlayMusic> intent, the orchestrator component 130 may associate the NLU hypothesis with one or more skill components 190 that can execute the <PlayMusic> intent. Thus, the orchestrator component 130 may send the NLU results data 685, including NLU hypotheses paired with skill components 190, to the post-NLU ranker 265. In response to ASR output data 610 corresponding to "what should I do for dinner today," the orchestrator component 130 may generates pairs of skill components 190 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 265 queries each skill component 190, paired with a NLU hypothesis in the NLU results data 685, to provide result data 630 based on the NLU hypothesis with which it is associated. That is, with respect to each skill component, the post-NLU ranker 265 colloquially asks the each skill component "if given this NLU hypothesis, what would you do with it." According to the above example, the post-NLU ranker 265 may send skill components 190 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 265 may query each of the skill components 190 in parallel or substantially in parallel.

A skill component 190 may provide the post-NLU ranker 265 with various data and indications in response to the post-NLU ranker 265 soliciting the skill component 190 for result data 630. A skill 190 may simply provide the post-NLU ranker 265 with an indication of whether or not the skill can execute with respect to the NLU hypothesis it received. A skill component 190 may also or alternatively provide the post-NLU ranker 265 with output data generated based on the NLU hypothesis it received. In some situations, a skill 190 may need further information in addition to what is represented in the received NLU hypothesis to provide output data responsive to the user input. In these situations, the skill 190 may provide the post-NLU ranker 265 with result data 630 indicating slots of a framework that the skill 190 further needs filled or entities that the skill 190 further needs resolved prior to the skill 190 being able to provided result data 630 responsive to the user input. The skill 190 may also provide the post-NLU ranker 265 with an instruction and/or computer-generated speech indicating how the skill 190 recommends the system solicit further information needed by the skill 190. The skill 190 may further provide the post-NLU ranker 265 with an indication of whether the skill 190 will have all needed information after the user provides additional information a single time, or whether the skill 190 will need the user to provide various kinds of additional information prior to the skill 190 having all needed information. According to the above example, skills 190 may provide the post-NLU ranker 265 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 630 includes an indication provided by a skill 190 indicating whether or not the skill 190 can execute with respect to a NLU hypothesis; data generated by a skill 190 based on a NLU hypothesis; as well as an indication provided by a skill 190 indicating the skill 190 needs further information in addition to what is represented in the received NLU hypothesis.

The post-NLU ranker 265 uses the result data 630 provided by the skills 190 to alter the NLU processing confidence scores generated by the reranker 690. That is, the post-NLU ranker 265 uses the result data 630 provided by the queried skills 190 to create larger differences between the NLU processing confidence scores generated by the reranker 690. Without the post-NLU ranker 265, the system may not be confident enough to determine an output in response to a user input, for example when the NLU hypotheses associated with multiple skills are too close for the system to confidently determine a single skill 190 to invoke to respond to the user input. For example, if the system does not implement the post-NLU ranker 265, the system may not be able to determine whether to obtain output data from a general reference information skill or a medical information skill in response to a user input corresponding to "what is acne."

The post-NLU ranker 265 may prefer skills 190 that provide result data 630 responsive to NLU hypotheses over skills 190 that provide result data 630 corresponding to an indication that further information is needed, as well as skills 190 that provide result data 630 indicating they can provide multiple responses to received NLU hypotheses. For example, the post-NLU ranker 265 may generate a first score for a first skill 190a that is greater than the first skill's NLU confidence score based on the first skill 190a providing result data 630a including a response to a NLU hypothesis. For further example, the post-NLU ranker 265 may generate a second score for a second skill 190b that is less than the second skill's NLU confidence score based on the second skill 190b providing result data 630b indicating further information is needed for the second skill 190b to provide a response to a NLU hypothesis. Yet further, for example, the post-NLU ranker 265 may generate a third score for a third skill 190c that is less than the third skill's NLU confidence score based on the third skill 190c providing result data 630c indicating the third skill 190c can provide multiple responses to a NLU hypothesis.

The post-NLU ranker 265 may consider other data 620 in determining scores. The other data 620 may include rankings associated with the queried skills 190. A ranking may be a system ranking or a user-specific ranking. A ranking may indicate a veracity of a skill from the perspective of one or more users of the system. For example, the post-NLU ranker 265 may generate a first score for a first skill 190a that is greater than the first skill's NLU processing confidence score based on the first skill 190a being associated with a high ranking. For further example, the post-NLU ranker 265 may generate a second score for a second skill 190b that is less than the second skill's NLU processing confidence score based on the second skill 190b being associated with a low ranking.

The other data 620 may include information indicating whether or not the user that originated the user input has enabled one or more of the queried skills 190. For example, the post-NLU ranker 265 may generate a first score for a first skill 190a that is greater than the first skill's NLU processing confidence score based on the first skill 190a being enabled by the user that originated the user input. For further example, the post-NLU ranker 265 may generate a second score for a second skill 190b that is less than the second skill's NLU processing confidence score based on the second skill 190b not being enabled by the user that originated the user input. When the post-NLU ranker 265 receives the NLU results data 685, the post-NLU ranker 265 may determine whether profile data, associated with the user and/or device that originated the user input, includes indications of enabled skills.

The other data 620 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 265 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 265 may increase the NLU processing confidence score associated with a first skill configured to output visual data and/or decrease the NLU processing confidence score associated with a second skill configured to output audio data.

The other data 620 may include information indicating the veracity of the result data 630 provided by a skill 190. For example, if a user says "tell me a recipe for pasta sauce," a first skill 190a may provide the post-NLU ranker 265 with first result data 630a corresponding to a first recipe associated with a five star rating and a second skill 190b may provide the post-NLU ranker 265 with second result data 630b corresponding to a second recipe associated with a one star rating. In this situation, the post-NLU ranker 265 may increase the NLU processing confidence score associated with the first skill 190a based on the first skill 190a providing the first result data 630a associated with the five star rating and/or decrease the NLU processing confidence score associated with the second skill 190b based on the second skill 190b providing the second result data 630b associated with the one star rating.

The other data 620 may include information indicating the type of device that originated the user input. For example, the device may correspond to a "hotel room" type if the device is located in a hotel room. If a user inputs a command corresponding to "order me food" to the device located in the hotel room, the post-NLU ranker 265 may increase the NLU processing confidence score associated with a first skill 190a corresponding to a room service skill associated with the hotel and/or decrease the NLU processing confidence score associated with a second skill 190b corresponding to a food skill not associated with the hotel.

The other data 620 may include information indicating a location of the device and/or user that originated the user input. The system may be configured with skills 190 that may only operate with respect to certain geographic locations. For example, a user may provide a user input corresponding to "when is the next train to Portland." A first skill 190*a* may operate with respect to trains that arrive at, depart from, and pass through Portland, Oregon. A second skill 190*b* may operate with respect to trains that arrive at, depart from, and pass through Portland, Maine. If the device and/or user that originated the user input is located in Seattle, Washington, the post-NLU ranker 265 may increase the NLU processing confidence score associated with the first skill 190*a* and/or decrease the NLU processing confidence score associated with the second skill 190*b*. Likewise, if the device and/or user that originated the user input is located in Boston, Massachusetts, the post-NLU ranker 265 may increase the NLU processing confidence score associated with the second skill 190*b* and/or decrease the NLU processing confidence score associated with the first skill 190*a*.

The other data 620 may include information indicating a time of day. The system may be configured with skills 190 that operate with respect to certain times of day. For example, a user may provide a user input corresponding to "order me food." A first skill 190*a* may generate first result data 630*a* corresponding to breakfast. A second skill 190*b* may generate second result data 630*b* corresponding to dinner. If the system component(s) 120 receives the user input in the morning, the post-NLU ranker 265 may increase the NLU processing confidence score associated with the first skill 190*a* and/or decrease the NLU processing score associated with the second skill 190*b*. If the system component(s) 120 receives the user input in the afternoon or evening, the post-NLU ranker 265 may increase the NLU processing confidence score associated with the second skill 190*b* and/or decrease the NLU processing confidence score associated with the first skill 190*a*.

The other data 620 may include information indicating user preferences. The system may include multiple skills 190 configured to execute in substantially the same manner. For example, a first skill 190*a* and a second skill 190*b* may both be configured to order food from respective restaurants. The system may store a user preference (e.g., in the profile storage 270) that is associated with the user that provided the user input to the system component(s) 120 as well as indicates the user prefers the first skill 190*a* over the second skill 190*b*. Thus, when the user provides a user input that may be executed by both the first skill 190*a* and the second skill 190*b*, the post-NLU ranker 265 may increase the NLU processing confidence score associated with the first skill 190*a* and/or decrease the NLU processing confidence score associated with the second skill 190*b*.

The other data 620 may include information indicating system usage history associated with the user that originated the user input. For example, the system usage history may indicate the user originates user inputs that invoke a first skill 190*a* more often than the user originates user inputs that invoke a second skill 190*b*. Based on this, if the present user input may be executed by both the first skill 190*a* and the second skill 190*b*, the post-NLU ranker 265 may increase the NLU processing confidence score associated with the first skill 190*a* and/or decrease the NLU processing confidence score associated with the second skill 190*b*.

The other data 620 may include information indicating a speed at which the user device 110 that originated the user input is traveling. For example, the user device 110 may be located in a moving vehicle, or may be a moving vehicle. When a user device 110 is in motion, the system may prefer audio outputs rather than visual outputs to decrease the likelihood of distracting the user (e.g., a driver of a vehicle). Thus, for example, if the user device 110 that originated the user input is moving at or above a threshold speed (e.g., a speed above an average user's walking speed), the post-NLU ranker 265 may increase the NLU processing confidence score associated with a first skill 190*a* that generates audio data. The post-NLU ranker 265 may also or alternatively decrease the NLU processing confidence score associated with a second skill 190*b* that generates image data or video data.

The other data 620 may include information indicating how long it took a skill 190 to provide result data 630 to the post-NLU ranker 265. When the post-NLU ranker 265 multiple skills 190 for result data 630, the skills 190 may respond to the queries at different speeds. The post-NLU ranker 265 may implement a latency budget. For example, if the post-NLU ranker 265 determines a skill 190 responds to the post-NLU ranker 265 within a threshold amount of time from receiving a query from the post-NLU ranker 265, the post-NLU ranker 265 may increase the NLU processing confidence score associated with the skill 190. Conversely, if the post-NLU ranker 265 determines a skill 190 does not respond to the post-NLU ranker 265 within a threshold amount of time from receiving a query from the post-NLU ranker 265, the post-NLU ranker 265 may decrease the NLU processing confidence score associated with the skill 190.

It has been described that the post-NLU ranker 265 uses the other data 620 to increase and decrease NLU processing confidence scores associated with various skills 190 that the post-NLU ranker 265 has already requested result data from. Alternatively, the post-NLU ranker 265 may use the other data 620 to determine which skills 190 to request result data from. For example, the post-NLU ranker 265 may use the other data 620 to increase and/or decrease NLU processing confidence scores associated with skills 190 associated with the NLU results data 685 output by the NLU component 160. The post-NLU ranker 265 may select n-number of top scoring altered NLU processing confidence scores. The post-NLU ranker 265 may then request result data 630 from only the skills 190 associated with the selected n-number of NLU processing confidence scores.

As described, the post-NLU ranker 265 may request result data 630 from all skills 190 associated with the NLU results data 685 output by the NLU component 160. Alternatively, the system component(s) 120 may prefer result data 630 from skills implemented entirely by the system component(s) 120 rather than skills at least partially implemented by the skill system(s) 125. Therefore, in the first instance, the post-NLU ranker 265 may request result data 630 from only skills associated with the NLU results data 685 and entirely implemented by the system component(s) 120. The post-NLU ranker 265 may only request result data 630 from skills associated with the NLU results data 685, and at least partially implemented by the skill system(s) 125, if none of the skills, wholly implemented by the system component(s) 120, provide the post-NLU ranker 265 with result data 630 indicating either data response to the NLU results data 685, an indication that the skill can execute the user input, or an indication that further information is needed.

As indicated above, the post-NLU ranker 265 may request result data 630 from multiple skills 190. If one of the skills 190 provides result data 630 indicating a response to a NLU hypothesis and the other skills provide result data 630 indicating either they cannot execute or they need further information, the post-NLU ranker 265 may select the result data 630 including the response to the NLU hypothesis as the data to be output to the user. If more than one of the skills 190 provides result data 630 indicating responses to NLU hypotheses, the post-NLU ranker 265 may consider the other data 620 to generate altered NLU processing confidence scores, and select the result data 630 of the skill associated with the greatest score as the data to be output to the user.

A system that does not implement the post-NLU ranker 265 may select the highest scored NLU hypothesis in the NLU results data 685. The system may send the NLU hypothesis to a skill 190 associated therewith along with a request for output data. In some situations, the skill 190 may not be able to provide the system with output data. This results in the system indicating to the user that the user input could not be processed even though another skill associated with lower ranked NLU hypothesis could have provided output data responsive to the user input.

The post-NLU ranker 265 reduces instances of the aforementioned situation. As described, the post-NLU ranker 265 queries multiple skills associated with the NLU results data 685 to provide result data 630 to the post-NLU ranker 265 prior to the post-NLU ranker 265 ultimately determining the skill 190 to be invoked to respond to the user input. Some of the skills 190 may provide result data 630 indicating responses to NLU hypotheses while other skills 190 may providing result data 630 indicating the skills cannot provide responsive data. Whereas a system not implementing the post-NLU ranker 265 may select one of the skills 190 that could not provide a response, the post-NLU ranker 265 only selects a skill 190 that provides the post-NLU ranker 265 with result data corresponding to a response, indicating further information is needed, or indicating multiple responses can be generated.

The post-NLU ranker 265 may select result data 630, associated with the skill 190 associated with the highest score, for output to the user. Alternatively, the post-NLU ranker 265 may output NLU output data 625 indicating skills 190 and their respective post-NLU ranker rankings. Since the post-NLU ranker 265 receives result data 630, potentially corresponding to a response to the user input, from the skills 190 prior to post-NLU ranker 265 selecting one of the skills or outputting the NLU output data 625, little to no latency occurs from the time skills provide result data 630 and the time the system outputs responds to the user.

If the post-NLU ranker 265 selects result audio data to be output to a user and the system determines content should be output audibly, the post-NLU ranker 265 (or another component of the system component(s) 120) may cause the device 110a and/or the device 110b to output audio corresponding to the result audio data. If the post-NLU ranker 265 selects result text data to output to a user and the system determines content should be output visually, the post-NLU ranker 265 (or another component of the system component(s) 120) may cause the device 110b to display text corresponding to the result text data. If the post-NLU ranker 265 selects result audio data to output to a user and the system determines content should be output visually, the post-NLU ranker 265 (or another component of the system component(s) 120) may send the result audio data to the ASR component 150. The ASR component 150 may generate output text data corresponding to the result audio data. The system component(s) 120 may then cause the device 110b to display text corresponding to the output text data. If the post-NLU ranker 265 selects result text data to output to a user and the system determines content should be output audibly, the post-NLU ranker 265 (or another component of the system component(s) 120) may send the result text data to the TTS component 280. The TTS component 280 may generate output audio data (corresponding to computer-generated speech) based on the result text data. The system component(s) 120 may then cause the device 110a and/or the device 110b to output audio corresponding to the output audio data.

As described, a skill 190 may provide result data 630 either indicating a response to the user input, indicating more information is needed for the skill 190 to provide a response to the user input, or indicating the skill 190 cannot provide a response to the user input. If the skill 190 associated with the highest post-NLU ranker score provides the post-NLU ranker 265 with result data 630 indicating a response to the user input, the post-NLU ranker 265 (or another component of the system component(s) 120, such as the orchestrator component 130) may simply cause content corresponding to the result data 630 to be output to the user. For example, the post-NLU ranker 265 may send the result data 630 to the orchestrator component 130. The orchestrator component 130 may cause the result data 630 to be sent to the device (110a/110b), which may output audio and/or display text corresponding to the result data 630. The orchestrator component 130 may send the result data 630 to the ASR component 150 to generate output text data and/or may send the result data 630 to the TTS component 280 to generate output audio data, depending on the situation.

The skill 190 associated with the highest post-NLU ranker score may provide the post-NLU ranker 265 with result data 630 indicating more information is needed as well as instruction data. The instruction data may indicate how the skill 190 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 265 may simply cause the received instruction data be output by the device (110a/110b). Alternatively, the instruction data may be in a format that is not capable of being output by the device (110a/110b). When this occurs, the post-NLU ranker 265 may cause the ASR component 150 or the TTS component 280 to process the instruction data, depending on the situation, to generate instruction data that may be output by the device (110a/110b). Once the user provides the system with all further information needed by the skill 190, the skill 190 may provide the system with result data 630 indicating a response to the user input, which may be output by the system as detailed above.

The system may include "informational" skills 190 that simply provide the system with information, which the system outputs to the user. The system may also include "transactional" skills 190 that require a system instruction to execute the user input. Transactional skills 190 include ride sharing skills, flight booking skills, etc. A transactional skill 190 may simply provide the post-NLU ranker 265 with result data 630 indicating the transactional skill 190 can execute the user input. The post-NLU ranker 265 may then cause the system to solicit the user for an indication that the system is permitted to cause the transactional skill 190 to execute the user input. The user-provided indication may be an audible indication or a tactile indication (e.g., activation of a virtual button or input of text via a virtual keyboard). In response to receiving the user-provided indication, the system may provide the transactional skill 190 with data corresponding to the indication. In response, the transactional skill 190 may execute the command (e.g., book a flight, book a train ticket, etc.). Thus, while the system may not further engage an informational skill 190 after the informational skill 190 provides the post-NLU ranker 265 with result data 630, the system may further engage a transactional skill 190 after the transactional skill 190 provides the post-NLU ranker 265 with result data 630 indicating the transactional skill 190 may execute the user input.

In some instances, the post-NLU ranker 265 may generate respective scores for first and second skills that are too close (e.g., are not different by at least a threshold difference) for the post-NLU ranker 265 to make a confident determination regarding which skill should execute the user input. When this occurs, the system may request the user indicate which skill the user prefers to execute the user input. The system may output TTS-generated speech to the user to solicit which skill the user wants to execute the user input.

Figure 7:
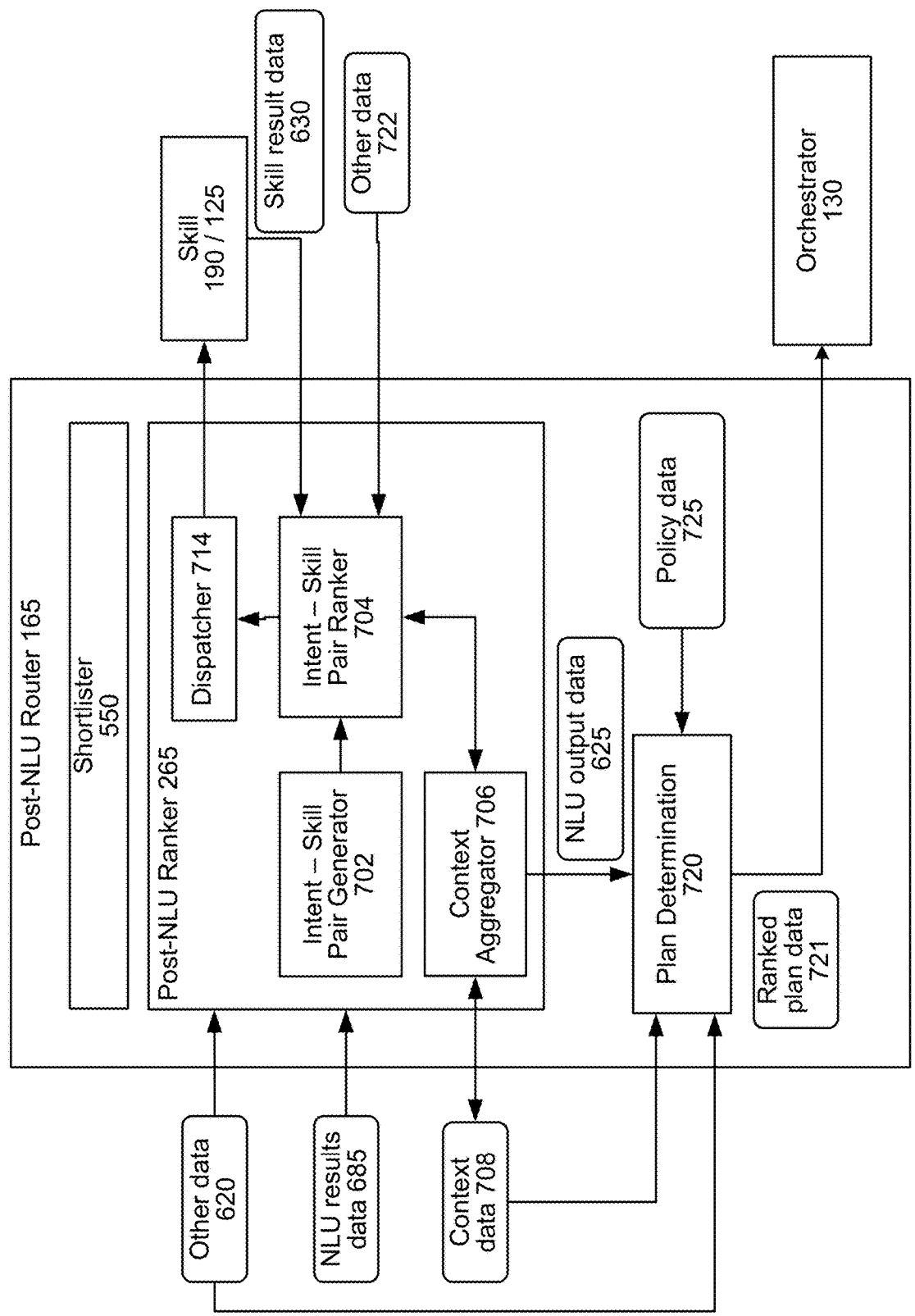
FIG. 7 is a conceptual diagram illustrating components that perform post-natural language understanding processing, according to embodiments of the present disclosure.

FIG. 7 illustrates other configurations and operations of components of the post-NLU router 165 including the post-NLU ranker 265 and plan determination component 720. When the post-NLU ranker 265 receives NLU results data 685, the NLU results data 685 may be sent to an intent-skill pair generator 702. The intent-skill pair generator 702 may include information about what skills are capable of handling what intents. Such information may be context agnostic, and may thus indicate what skills are capable of handling what intents generally, without regard to the context associated with the user input. The intent-skill pair generator 702 thus receives the NLU results data 685 and identifies what particular candidate skills may handle the intent for NLU hypothesis. For example, if a NLU hypothesis includes a particular intent, the intent-skill pair generator 702 identifies each skill that may execute with respect to the intent. For further example, if the NLU results data 685 include multiple NLU hypotheses including multiple intents, the intent-skill pair generator 702 associates each different NLU hypothesis with each skill that may execute with respect to the NLU hypothesis. As illustrated, the intent-skill pair generator 702 may be implemented at part of the post-NLU ranker 265. However, one skill in the art will appreciate that the intent-skill pair generator 702 may be implemented as part of the NLU component 160 or in another component without departing from the present disclosure. In such a case, the NLU results data 685 may include intent-skill pairs.

The post-NLU ranker 265 may also include an intent-skill pair ranker 704. The intent-skill pair ranker 704 ranks the intent-skill pairs generated by the intent-skill pair generator 702 based on, for example, the number of filled slots of a NLU hypothesis, an NLU confidence score associated with a NLU hypothesis, context information output by a context aggregator 706, and/or other data.

The post-NLU ranker 265 may include the context aggregator 706. The context aggregator 706 receives context data 708 from various contextual sources. The context data 708 may include time data, which represents a time of receipt of the user input by the device 110, a time or receipt of the user input by the system component(s) 120, a user identifier associated with the user input, a device identifier of the device 110, the wakeword spoken by the user, whether other devices are linked to the device 110, and/or other information. The context aggregator 706 may aggregate the context data 708 and put the context data 708 in a form that can be processed by the intent-skill pair ranker 704. Context data 708 may include data obtained from the user device 110 or from other services connected to the system component(s) 120.

The context data 708 may include skill availability data. Such information may indicate what skills are available and authorized to process the user input. For example, if the user has only enabled certain skills, the enabled skills may be noted in the skill availability data.

The context data 708 may also include dialogue data. A "dialogue" or "dialogue session" as used herein may refer to data transmissions (such as relating to multiple user inputs and system component(s) 120 outputs) between the system component(s) 120 and a local device (e.g., the device 110) that all relate to a single originating user input. Thus, the data transmissions of a dialogue session may share a dialogue identifier or other unique identifier that may be used by the orchestrator component 130, skill(s) 190, skill server(s) 125, etc. to track information across the dialogue session. For example, the user device 110 may send the system component(s) 120 data corresponding to "Alexa, play jeopardy." The system component(s) 120 may output data corresponding to a jeopardy statement to the user device 110 for output to a user(s). A user may then respond to the statement, which the user device 110 sends as data to the system component(s) 120. The sending of data from the user device 110 to the system component(s) 120 and the sending of data from the system component(s) 120 to the user device 110 may all correspond to a single dialogue session related to the originating user input "play jeopardy." In some examples, a dialogue-initiating user input may start with a wakeword and end with a command, such as "Alexa, play jeopardy," where "Alexa" is the wakeword and "play jeopardy" is the command. Subsequent user inputs of the same dialogue session may or may not start with speaking of a wakeword. Each user input of a dialogue may be associated with a unique user input identifier such that multiple user input identifiers may be associated with a single dialogue session identifier.

Dialogue data may include interactive focus information, (e.g., representing which skill was most recently invoked to execute a previous user input for the user and/or user device 110 associated with the present user input). Dialogue data may also include content focus information (e.g., representing a skill that is streaming data to the user device 110 when the data corresponding to the current user input is received by the system component(s) 120). The context data 708 may be one portion of the data used by the intent-skill pair ranker 704 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 708 may also include device data. Device data may indicate characteristics of the user device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the user device 110 is associated. The device data may also indicate whether the user device 110 is currently streaming data or was streaming data when the user input was received and sent to the system component(s) 120. The context data 708 (and/or other data 722) may include a metadata flag/indicator that represents whether the particular skill being executed is one that can handle a go-back (or other navigational) request.

The context data 708 may also include user profile data. The user profile data may represent preferences and/or characteristics of the user that originated the current user input. Such data may be received from the profile storage 270.

The context data 708 may also include location data. The location data may represent a location of the user device 110 from which the user input was received.

The context data 708 may also include anaphora data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

For example, while interacting with the system, the user may refer to an entity involved in a previous exchange in a manner that is not explicit. For example, after the system answers the Starbucks query with the location of the nearest Starbucks, the user may wish to know the hours for that Starbucks and may ask the system "how late are they open?" Even though the user did not explicitly state what "they" refers to, the user may expect the system to provide the hours (or the closing time) of the Starbucks that was just part of an exchange between the user and the system. In another example, after asking the system to "play Beethoven's $5^{th}$ Symphony" the user may ask the system "when did he write that?" In order to answer the second query, the system must understand that "he" refers to Beethoven and "that" refers to the musical work $5^{th}$ Symphony. Words that refer to an entity but do not explicitly name the entity are an example of anaphora, namely a word referring to or replacing another word.

Other references to other text may also be processed by the system. For example, exophora is a reference in text to something external to the text, endophora is a reference to something preceding or following the reference within the text, and cataphora is a reference to a following word or group or words. The system may be configured to process these, and other similar types of references (which may generally be referred to below as anaphora). Further, while a language such as English may use unknown words to substitute for anaphora/(e.g., pronouns), other languages, such as Japanese may allow phrasing of anaphora without a specific word to represent the anaphora (referred to as zero-phrase anaphora), and other languages may use other forms of reference. The present system may be used to resolve many such forms of anaphora across many different languages.

The context data 708 may also include data regarding whether one or more skills are "in focus." A skill may be in interactive focus, meaning the skill was the most recent skill that executed a user input for a user or device associated with a present user input and/or the skill may be involved with an open dialogue (e.g., series of user inputs and responses) with a user device. Interactive focus attempts to continue a conversation between a user and the system and/or a skill for purposes of processing the dialogue. However, there may be instances where a user inputs a command that may be handled by a skill that is currently in interactive focus, but which the user does not intend to be executed by such skill. The system may process the context data 708 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 708 may also include other context data not explicitly recited herein.

The intent-skill pair ranker 704 may operate one or more trained models that are configured to process the NLU results data 685, skill result data 630, and other data 722 in order to determine a single best skill for executing the current user input from the available pairs output by the intent-skill pair generator 702. The intent-skill pair ranker 704 may send queries to the skills and request a first skill and a second skill (for example the candidate skills identified by the pair generator 702), to provide potential result data indicating whether the skill can handle the intent at the particular moment and if so, what the output data for the particular skill would be (e.g., data the skill would provide to a user if the skill were selected to execute the user input) based on the NLU results data 685. For example, the intent-skill pair ranker 704 may send a first NLU hypothesis, associated with a first skill, to the first skill along with a request for the first skill to at least partially execute with respect to the first NLU hypothesis. The intent-skill pair ranker 704 may also send a second NLU hypothesis, associated with the second skill, to the second skill along with a request for the second skill to at least partially execute with respect to the second NLU hypothesis. The intent-skill pair ranker 704 receives, from the first skill, first result data 630*a* generated from the first skill's execution with respect to the first NLU hypothesis. The intent-skill pair ranker 704 also receives, from the second skill, second results data 630*b* generated from the second skill's execution with respect to the second NLU hypothesis. Based on the first results data 630*a*, a first NLU confidence score associated with the first NLU hypothesis, the second results data 630*b*, a second NLU confidence score associated with the second NLU hypothesis, and other data 722 (e.g., context data, user profile data, etc.), the intent-skill pair ranker 704 determines the best skill for executing the current user input. The intent-skill pair ranker 704 sends an indication of the best skill to a dispatcher component 714.

The dispatcher 714 may then send the selected skill the information needed to execute the user input, including an indication of the intent, the appropriate context data 708 (such as device identifier, user identifier, or the like), slot data, utterance identifier, dialogue identifier, or any other information needed.

As shown in FIG. 7, the post-NLU router 165 may also include a plan determination component 720. The plan determination component 720 may process a variety of data including other data 620, context data 708, NLU output data 625, policy data 725 and/or other data to determine a set of plans for processing and executing the incoming utterance.

The plan determination component 720 may consider a variety of data corresponding to the incoming utterance. The plan determination component 720 may use the variety of data based on it being associated with the account ID received from the orchestrator component 130. Such data corresponding to the incoming utterance is represented in FIG. 7 as other data 620, context data 708, and NLU output data 625, though other data may be used. Such data may be shown being sent directly to the plan determination component 720 but such data may be routed to the plan determination component 720 by another component, such as the orchestrator 130.) As noted above, the NLU output data 625 may include the various hypotheses and corresponding scores of the machine interpretations of the incoming utterance or other natural language input (e.g., a typed input). The utterance-related data processed by the plan determination component 720 may include an indication of an invoked assistant. For example, if a user spoke a particular wakeword corresponding to the particular assistant (e.g., "Alexa," "Car," etc.) an indication of that spoken wakeword and/or the assistant may be provided (for example as part of other data 620, context data 708, NLU output data 625, or other data) to the plan determination component 720. In another example, if a user performed a gesture, button-push or other invocation corresponding to the particular assistant an indication of that invocation and/or assistant may be provided (for example as part of other data 620, context data 708, NLU output data 625, or other data) to the plan determination component 720. In a situation where a particular assistant may not have been invoked, an indication of a default assistant or other assistant (e.g., the automotive assistant) to be primarily associated with the user device 110 may be provided (for example as part of other data 620, context data 708, NLU output data 625, or other data) to the plan determination component 720.

The plan determination component 720 may generate plan data 721 representing a list of potential plans that may be used to respond to a user input. Each plan may include a sequence of operations for responding to the user input. Each plan may be different. For example, one plan in the list may indicate that a first skill component 190 is to be invoked. Another plan in the list may indicate that a second skill component 190 is to be invoked. The plan may also include other actions to be performed, and/or an execution order of the actions. For example, a plan may indicate that the following steps are to be performed in response to the user input: (1) send a natural language output using TTS (or displayed text); (2) invoke a first skill component 190a with first data; and (3) invoke a second skill component 190b with second data. A plan may include user experience operations such as providing verbal or non-verbal output via the user device 110, and command processing operations such as calling a skill to execute with respect to the command. The plan determination component 720 may receive the account ID from the orchestrator component 130, and thus, the plan data 721 may include skills and operations that are authorized for use by the assistant associated with the account ID. Individual plans may be associated with a confidence score, and the ranked plan data 721 may include a ranked list of plans based on the respective confidence scores.

An assistant handoff may occur when the best assistant to handle the user input is not one requested by a user. For example, the user 105 may say "Car, play Jazz music" while in the vehicle 110a. The automotive assistant system may be associated with the wakeword "Car" and may be configured as a data controller that uses the other assistant system as the data processor. In an example embodiment, the automotive assistant system may not authorized to invoke a music skill component and/or may not be authorized to use entity resolvers 162 that enable determination of a music station/catalog that outputs the requested music. As described in detail below with respect to FIGS. 8A-8C, the system 100 may determine that the other assistant (e.g., Amazon Alexa) is better suited to respond to the user input, and may perform a handoff to the other assistant system, while maintaining separation of certain data. As part of the handoff, the automotive assistant may output "I think Alexa can help with that" as synthesized speech. Once processing is complete, the Alexa assistant system may output "I found a station you might like, 'Smooth Jazz' from Amazon Music" as synthesized speech, and may then begin playing the station.

To avoid sharing a first assistant's processing data with a component that also has access to a second assistant's processing data, the system 100 may use the orchestrator component 130 to perform the handoff (e.g., switch processing from a first assistant to a second assistant). As described below, the orchestrator component 130 may determine to perform a handoff to a second assistant based on the post-NLU router 165 indicating that the first assistant is unable to handle the user input. To perform the handoff, the orchestrator component 130 may request a second account ID for the second assistant, and may propagate the second account ID to the system components for processing the user input. In response to receiving a different/new account ID, the system components may process the received requests separately from the prior requests that were associated with a first account ID for the first assistant. The system 100 may not use a dedicated centralized handoff component that would need access to data from multiple assistants and/or may share runtime operational data from the first assistant to the second assistant while performing the handoff, as this configuration may not provide an appropriate level of data privacy protection discussed herein.

The user 105 may enable/authorize handoffs between the assistants, then only the above example user input may be processed to result in the above example output. If handoffs are not enabled, then the user input "Car, play Jazz music" may result in the automotive assistant responding with "I am sorry I cannot help with that," or with another undesired response.

Figure 8A:
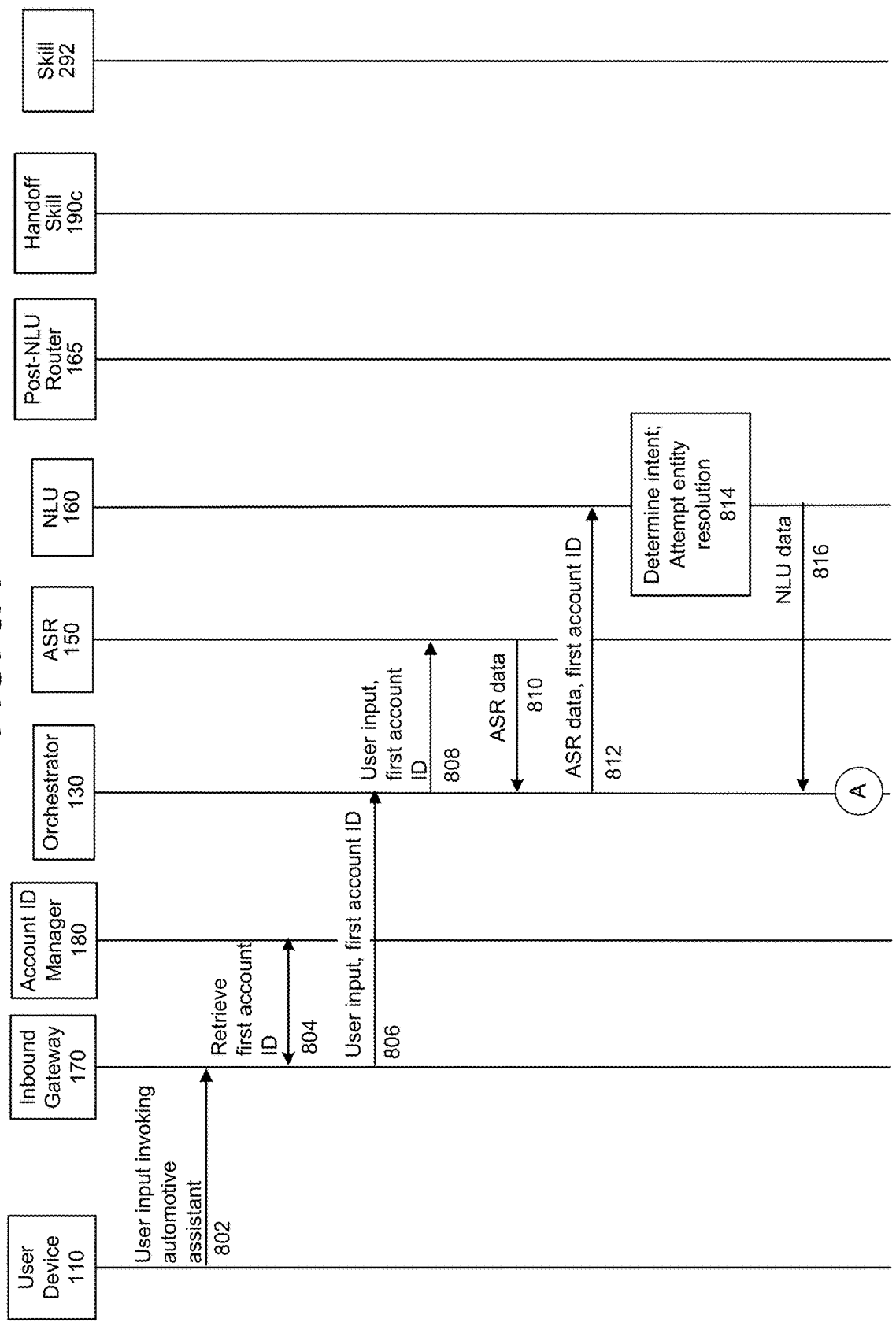

FIGS. 8A-8C is a signal flow diagram illustrating example operations of the system 100 to perform a handoff from the automotive assistant to the other assistant, while using the shared system components 120. Referring to FIG. 8A, the user device 110 may send a user input invoking the automotive assistant (802) to the inbound gateway 170. For example, the user 105 may say "Car, play Jazz music." Audio data representing the spoken input may be sent based on the wakeword detector 121 detecting a wakeword (e.g., "Car") as described above along with a device ID. The inbound gateway 170 may determine, based on the wakeword included in the user input, that the user input is directed to the automotive assistant. Based on this determination, the inbound gateway 170 may retrieve the first account ID (804) based on the device ID and similar data for the user 105 for the automotive assistant from the account ID manager 180. The inbound gateway 170 may send the user input (e.g., the audio data and/or other received input data) and the first account ID (806) to the orchestrator component 130.

The orchestrator component 130 may send the user input and the first account ID (808) (without sending the second account ID) to the ASR component 150 for ASR processing. The ASR component 150 may perform ASR processing using data available based on the first account ID, and may send ASR data (810) to the orchestrator component 130.

The orchestrator component 130 may send the ASR data and the first account ID (812) (without sending the second account ID) to the NLU component 160 for NLU processing. The NLU component 160 may use the ASR data and data available based on the first account ID to determine an intent corresponding to the user input, and may attempt to perform entity resolution (814). As described above in relation to FIG. 1A, the NLU component 160 may invoke, based on the first account ID, entity resolvers 162 that are enabled for the automotive assistant. Continuing with the example of "Car, play Jazz music," the automotive assistant may not be associated with a music catalog/service, which results in the NLU component 160 being unable to determine entity data (e.g., specific entity values) corresponding to the user input. In some embodiments, when the NLU component 160 is unable to resolve an entity, the NLU data, generated by the NLU component 160, may include data determined by NER processing (e.g., a portion of the user input, represented as text, that corresponds to an entity and the associated entity type). The NLU component 160 may send the NLU data (816) to the orchestrator component 130, where the NLU data may include an intent and a portion of the user input that corresponds to an entity.

Now referring to FIG. 8B, the orchestrator component 130 may send the NLU data and the first account ID (818) (without sending the second account ID) to the post-NLU router 165. Based on the NLU data and using data available based on the first account ID (e.g., skill components 190 enabled for the automotive assistant, the assistant metadata component 155, etc.), the post-NLU router 165 may determine that the requested assistant (the automotive assistant) cannot handle the user input (820). The plan determination component 720 of the post-NLU router 165 may determine plan data 721 as described above in relation to FIG. 7, where the plan data may include one or more plans; individual plans may include a sequence of operations to be performed to respond to a user input. In this case, the post-NLU router 165 may determine plan data indicating, among other things, that the requested assistant cannot be used to generate a plan for responding to the user input, and may send the plan data (822) to the orchestrator component 130. In some embodiments, the post-NLU router 165 may determine another assistant that can handle the user input, and may identify the other assistant in the plan data.

In response to receiving the plan data indicating that the requested assistant cannot handle the user input, the orchestrator component 130 may invoke a handoff skill component 190c and may request the handoff skill component 190c to render a handoff output (824). In the request, the orchestrator component 130 may include an indication of the other assistant (to which the user input is being handoff to). The handoff skill component 190c may generate and send, to the user device 110, a natural language output informing the user 105 of the handoff to the other assistant (826). The natural language output may be presented as synthesized speech (after being processed by the TTS component 280) or may be presented as displayed text or in another form. For example, the user device 110 may output audio along the lines of "Alexa can help you with that." A particular light color and/or pattern, associated with the respective assistant as described herein, may also be presented while or before the natural language output is presented. For example, while informing the user of the handoff, the light color and/or pattern of the automotive assistant system may be presented. While, later as described below, when a response generated by the other assistant system is presented the light color and/or pattern of the other assistant system may be presented.

The orchestrator component 130 may retrieve the second account ID (828) for the user 105 for the other assistant system. In some embodiments, ASR processing may not be re-run. The orchestrator component 130 may send the previously determined ASR data (e.g., from step 810) and the second account ID (830) (without sending the first account ID) to the NLU component 160 for NLU processing. In other embodiments, the orchestrator component 130 may execute ASR processing again, by sending the audio data and the second account ID to the ASR component 150, and may send this ASR data to the NLU component 160 for processing.

The NLU component 160 may use the ASR data and data available based on the second account ID to determine an intent and entity data corresponding to the user input. As described above in relation to FIG. 1A, the NLU component 160 may invoke, based on the second account ID, entity resolvers 162 that are enabled for the other assistant. Continuing with the example of "Car, play Jazz music," the other assistant may be associated with a music catalog/service that is capable of playing the requested music. The NLU component 160 may determine NLU data to include at least one NLU hypothesis including the intent and the entity data (832). The NLU component 160 may send the NLU data (834) to the orchestrator component 130.

Now referring to FIG. 8C, the orchestrator component 130 may send the NLU data and the second account ID (836) (without sending the first account ID) to the post-NLU router 165. Using the NLU data and data available based on the second account ID (e.g., skill components 190 enabled for the automotive assistant, the assistant metadata component 155, etc.), the post-NLU router 165 may determine new plan data for responding to the user input, where the plan data may include an indication to not generate a new/another handoff (to avoid a back and forth of handoffs between the assistants) (838). The post-NLU router 165 may send the new plan data (840) to the orchestrator component 130. The new plan data may include the assistant unauthorized skill component 292, which is only enabled for the other assistant system and not for the automotive assistant system (as described above).

The orchestrator component 130 may invoke the skill component 292, based on the new plan data, and may send a request to determine a response to the user input (842). The skill component 292 may determine an output responsive to the user input, and may send the output to the user device 110 (844). Continuing with the example above, the skill component 292 may cause the user device 110 to output synthesized speech "I found this station" and cause the user device 110 (using an audio player interface) to play music.

FIGS. 8A-8C describe an example process for performing a handoff from the automotive assistant system to the other assistant system. A handoff from the other assistant system to the automotive assistant system may be performed in a similar manner. In some embodiments, the post-NLU router 165 may use certain policies (which may be defined/included in the policy data 725 shown in FIG. 7), in determining when a handoff from the other assistant system to the automotive assistant system is to occur. In example embodiments, such policies may indicate that user inputs corresponding to certain intents, entities, and/or skills are to be processed by the automotive assistant system, where such user inputs may, for example, relate to operation of the vehicle 110, involve executing the custom assistant skill component(s) 296 for the automotive assistant system (e.g., scheduling a vehicle service appointment), purchasing parts for the vehicle, etc. For example, the user 105 may say "Alexa, turn on the headlights," the system component(s) 120 may process the user input as being directed to the other assistant system (based on the wakeword "Alexa") and using the second account ID. Similar to as described above, the post-NLU router 165 may determine that the user input is better handled by the automotive assistant system because, for example, it relates to operation of the vehicle 110, and the orchestrator component 130 may perform similar steps as described above to retrieve the first account ID and cause processing with respect to the user input in view of the first account ID.

Figure 9:
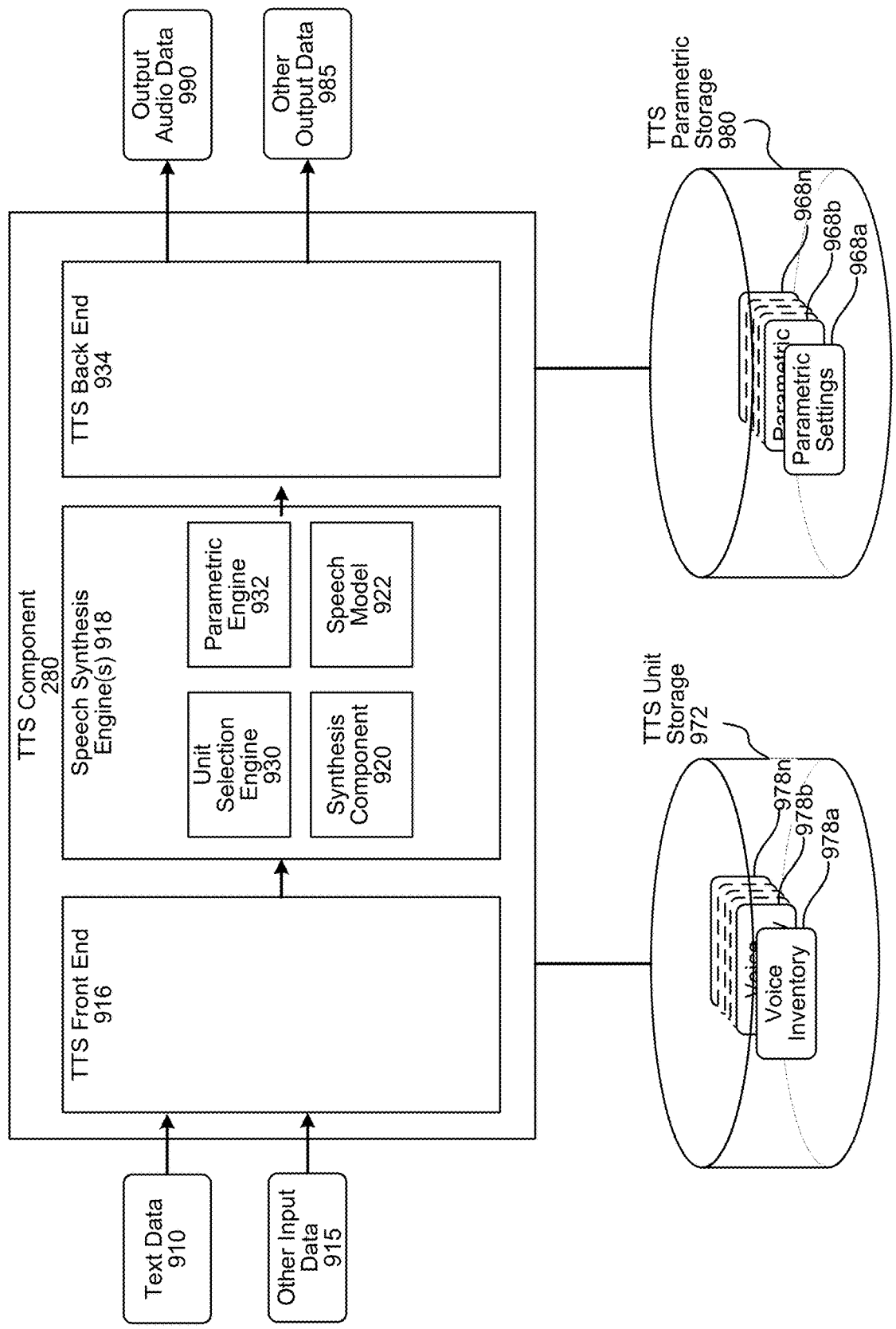
FIG. 9 is a conceptual diagram of text-to-speech components according to embodiments of the present disclosure.

Components of a system that may be used to perform unit selection, parametric TTS processing, and/or model-based audio synthesis are shown in FIG. 9. As shown in FIG. 9, the TTS component/processor 280 may include a TTS front end 916, a speech synthesis engine 918, TTS unit storage 972, TTS parametric storage 980, and a TTS back end 934. The TTS unit storage 972 may include, among other things, voice inventories 978*a*-978*n* that may include pre-recorded audio segments (called units) to be used by the unit selection engine 930 when performing unit selection synthesis as described below. The TTS parametric storage 980 may include, among other things, parametric settings 968*a*-968*n* that may be used by the parametric synthesis engine 932 when performing parametric synthesis as described below. A particular set of parametric settings 968 may correspond to a particular voice profile (e.g., whispered speech, excited speech, etc.).

In some embodiments, the system 110 may leverage the voice inventories 978 and/or parametric settings 968 to provide different assistants with different personalities as reflected in respective speech styles. For example, a first assistant could be associated with a first voice inventory 978*a* and first parametric settings 968*a*, and a second assistant could be associated with a second voice inventory 978*b* and second parametric settings 968*b*. Thus, the system 100 call the TTS component 280 for synthesized speech generation based on a particular assistant, and the TTS component 280 may return synthesized speech in a speech style (e.g., using certain audio characteristics) indicative of that assistant. The user will thus be able to tell with which assistant he or she is interacting with at a given time based on the speech style of the synthetic voice alone. A change in the speech style of the synthetic voice can indicate to the user that a handoff from one assistant to another will or has occurred.

For example, the system 100 may receive a command with an indication that the first assistant is the requested assistant to handle the command. The system 100 may, however, select the second assistant to handle the command when the first assistant is unable to handle the command. The system 100 may call, for example via a handoff skill, the TTS component 280 to generate a first message as the first assistant (e.g., using audio characteristics corresponding to the "voice" of the first assistant) to indicate that the command will be handled by the second assistant. The TTS component 280 may thus return a handoff message in a first speech style corresponding to the first assistant. The system may then call the TTS component 280 to generate a second message as the second assistant (e.g., using audio characteristics corresponding to the "voice" of the second assistant) to convey a result corresponding to the command. The TTS component 280 may thus return a response message in a second speech style corresponding to the second assistant.

In various embodiments of the present disclosure, model-based synthesis of audio data may be performed using by a speech model 922 and a TTS front-end 916. The TTS front-end 916 may be the same as front ends used in traditional unit selection or parametric systems. In other embodiments, some or all of the components of the TTS front end 916 are based on other trained models. The present disclosure is not, however, limited to any particular type of TTS front end 916. The speech model 922 may be used to synthesize speech without requiring the TTS unit storage 972 or the TTS parametric storage 980, as described in greater detail below.

TTS component receives text data 910. Although the text data 910 in FIG. 9 is input into the TTS component 280, it may be output by other component(s) (such as a skill component 190, NLU component 160, NLG component 279 or other component) and may be intended for output by the system. Thus in certain instances text data 910 may be referred to as "output text data." Further, the data 910 may not necessarily be text, but may include other data (such as symbols, code, other data, etc.) that may reference text (such as an indicator of a word) that is to be synthesized. Thus data 910 may come in a variety of forms. The TTS front end 916 transforms the data 910 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 918. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 910, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 916 may also process other input data 915, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 910 and/or the text for a TTS request may be accompanied by separate metadata indicating what text should be whispered (or have some other indicated audio characteristic). The speech synthesis engine 918 may compare the annotated phonetic units models and information stored in the TTS unit storage 972 and/or TTS parametric storage 980 for converting the input text into speech. The TTS front end 916 and speech synthesis engine 918 may include their own controller(s)/processor(s) and memory or they may use the controller/processor and memory of the system component(s) 120, device 110, or other device, for example. Similarly, the instructions for operating the TTS front end 916 and speech synthesis engine 918 may be located within the TTS component 280, within the memory and/or storage of the system component(s) 120, device 110, or within an external device.

Text data 910 input into the TTS component 280 may be sent to the TTS front end 916 for processing. The front-end may include components for performing text normalization, linguistic analysis, linguistic prosody generation, or other such components. During text normalization, the TTS front end 916 may first process the text input and generate standard text, converting such things as numbers, abbreviations (such as Apt., St., etc.), symbols ($, %, etc.) into the equivalent of written out words.

During linguistic analysis, the TTS front end 916 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 972. The linguistic analysis performed by the TTS front end 916 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTS front end 916 may then perform linguistic prosody generation where the phonetic units are annotated with desired prosodic characteristics, also called acoustic features, which indicate how the desired phonetic units are to be pronounced in the eventual output speech. During this stage the TTS front end 916 may consider and incorporate any prosodic annotations that accompanied the text input to the TTS component 280. Such acoustic features may include syllable-level features, word-level features, emotion, speaker, accent, language, pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 916, which may be referred to as a symbolic linguistic representation, may include a sequence of phonetic units annotated with prosodic characteristics. This symbolic linguistic representation may be sent to the speech synthesis engine 918, which may also be known as a synthesizer, for conversion into an audio waveform of speech for output to an audio output device and eventually to a user. The speech synthesis engine 918 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 918 may perform speech synthesis using one or more different methods. In one method of synthesis called unit selection, described further below, a unit selection engine 930 matches the symbolic linguistic representation created by the TTS front end 916 against a database of recorded speech, such as a database (e.g., TTS unit storage 972) storing information regarding one or more voice corpuses (e.g., voice inventories 978*a-n*). Each voice inventory may correspond to various segments of audio that was recorded by a speaking human, such as a voice actor, where the segments are stored in an individual inventory 978 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 930 may then use the information about each unit to select units to be joined together to form the speech output.

The unit selection engine 930 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 920) to form output audio data 990 representing synthesized speech. Using all the information in the unit database, a unit selection engine 930 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 932, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 920) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS unit storage 972 based on feedback of the results of TTS processing, thus enabling the TTS component 280 to improve speech synthesis.

The TTS unit storage 972 may be customized for an individual user based on his/her individualized desired speech output. In particular, the speech unit stored in a unit database may be taken from input audio data of the user speaking. For example, to create the customized speech output of the system, the system may be configured with multiple voice inventories 978a-978n, where each unit database is configured with a different "voice" to match desired speech qualities. Such voice inventories may also be linked to user accounts. The voice selected by the TTS component 280 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 978 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 968) and used for speech synthesis when the specific speech quality is desired. Customized voices may be created based on multiple desired speech qualities combined (for either unit selection or parametric synthesis). For example, one voice may be "shouted" while another voice may be "shouted and emphasized." One voice may correspond to a first assistant while another voice may correspond to a second assistant. Many such combinations are possible.

Unit selection speech synthesis may be performed as follows. Unit selection includes a two-step process. First a unit selection engine 930 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 930. As part of unit selection, the unit selection engine 930 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 972 or in another storage component. For example, different unit selection databases may be stored in TTS unit storage 972. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 918 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 932 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 916.

The parametric synthesis engine 932 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 918, the state may change or stay the same, based on the processing of the new text. For example, the pronunciation of a previously processed word might change based on later processed words. A Viterbi algorithm may be used to find the most likely sequence of states based on the processed text. The HMIs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 932 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 932 may lead to a number of potential audio output sequences. Based on the acoustic model and other potential models, the potential audio output sequences may be scored according to a confidence level of the parametric synthesis engine 932. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 968, which may represent acoustic settings matching a particular parametric "voice", may be used by the synthesis component 920 to ultimately create the output audio data 990.

When performing unit selection, after a unit is selected by the unit selection engine 930, the audio data corresponding to the unit may be passed to the synthesis component 920. The synthesis component 920 may then process the audio data of the unit to create modified audio data where the modified audio data reflects a desired audio quality. The synthesis component 920 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 280. For each unit that corresponds to the selected portion, the synthesis component 920 may process the audio data for that unit to create a modified unit audio data. The modified unit audio data may then be concatenated to form the output audio data 990. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 280. In that case, other output data 985 may be output along with the output audio data 990 so that an ultimate playback device (e.g., device 110) receives instructions for playback that can assist in creating the desired output audio. Thus, the other output data 985 may include instructions or other data indicating playback device settings (such as volume, playback rate, etc.) or other data indicating how output audio data including synthesized speech should be output. For example, for whispered speech, the output audio data 990 may include other output data 985 that may include a prosody tag or other indicator that instructs the device 110 to slow down the playback of the output audio data 990, thus making the ultimate audio sound more like whispered speech, which is typically slower than normal speech. In another example, the other output data 985 may include a volume tag that instructs the device 110 to output the speech at a volume level less than a current volume setting of the device 110, thus improving the quiet whisper effect.

One or more of the system components of the system component(s) may implement one or more models, which may be trained and operated according to various machine learning techniques.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 10:
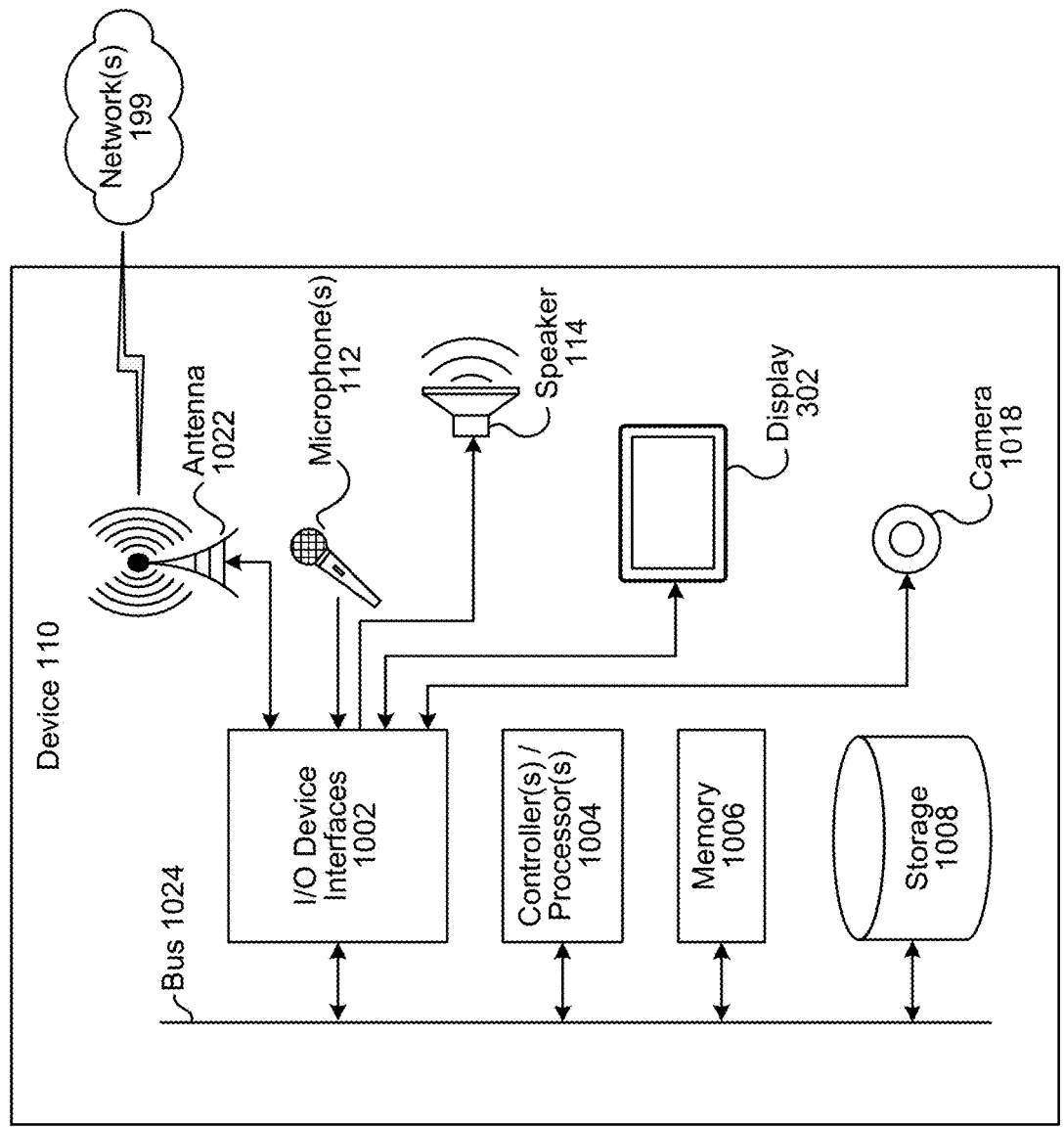
FIG. 10 is a block diagram conceptually illustrating example components of a device, according to embodiments of the present disclosure.
Figure 11:
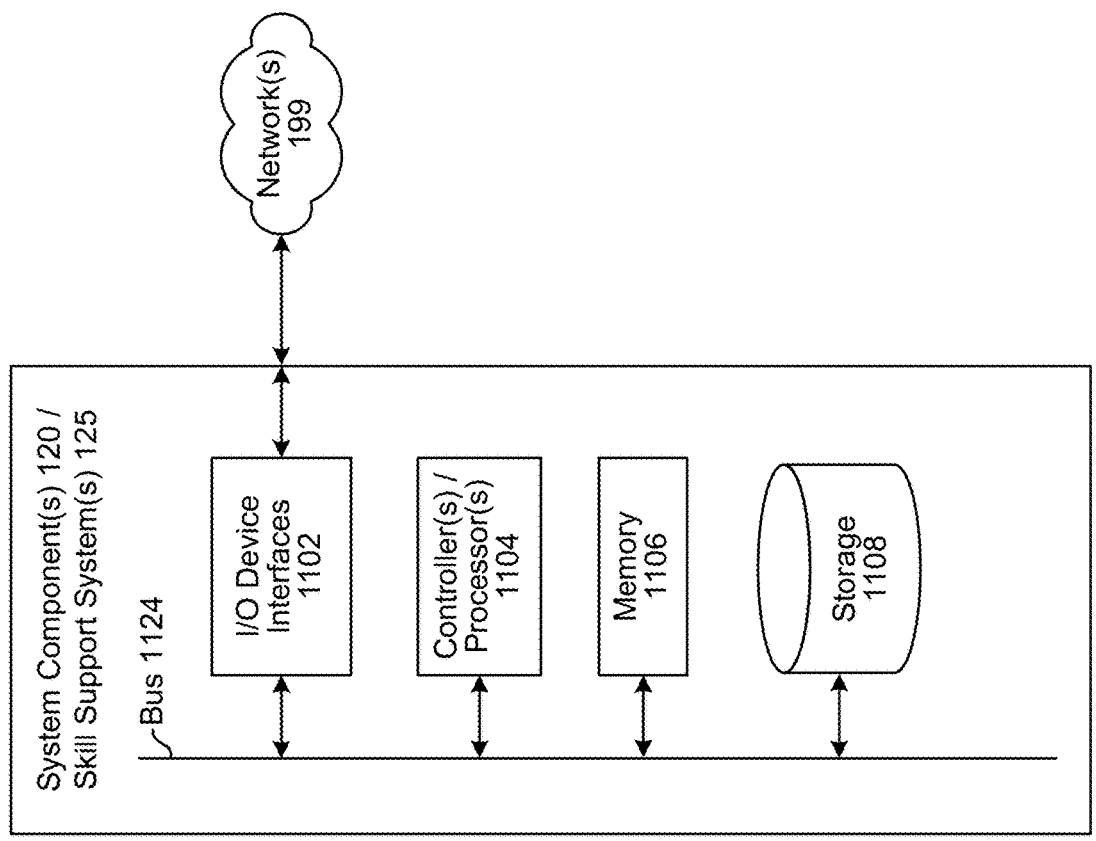
FIG. 11 is a block diagram conceptually illustrating example components of a system, according to embodiments of the present disclosure.

FIG. 10 is a block diagram conceptually illustrating a device 110 that may be used with the system. FIG. 11 is a block diagram conceptually illustrating example components of a system, such as the system component(s) 120, which may assist with ASR processing, NLU processing, etc., and a skill support system(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more system components 120 for performing ASR processing, one or more system components 120 for performing NLU processing, one or more skill support systems 125, etc. In operation, each of these systems may include computer-readable and computer-executable instructions that reside on the respective device (120/125), as will be discussed further below.

Each of these devices (110/120/125) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/125) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1002/1102).

Computer instructions for operating each device (110/120/125) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/125) includes input/output device interfaces (1002/1102). A variety of components may be connected through the input/output device interfaces (1002/1102), as will be discussed further below. Additionally, each device (110/120/125) may include an address/data bus (1024/1124) for conveying data among components of the respective device. Each component within a device (110/120/125) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 114, a wired headset or a wireless headset (not illustrated), or other component capable of outputting audio. The device 110 may also include an audio capture component. The audio capture component may be, for example, a microphone 112 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 302 for displaying content. The device 110 may further include a camera 1018.

Via antenna(s) 1022, the input/output device interfaces 1002 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the natural language command processing system component(s) 120, or a skill support system 125 may include their own dedicated processors, memory, and/or storage. Alternatively, one or more of the components of the device(s) 110, the system component(s) 120, or a skill support system 125 may utilize the I/O interfaces (1002/1102), processor(s) (1004/1104), memory (1006/1106), and/or storage (1008/1108) of the device(s) 110, the system component(s) 120, or the skill support system(s) 125, respectively. Thus, the ASR component 150 may have its own I/O interface(s), processor(s), memory, and/or storage; the NLU component 160 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component(s) 120, and a skill support system 125, as described herein, are illustrative, and may be located as a stand-alone device or may be included, in whole or in part, as a component of a larger device or system.

As illustrated in FIG. 12, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a vehicle 110a, a smart phone 110b, a smart watch 110c, a tablet computer 110d, a speech-detection device 110e, a display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system components 120, the skill support system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, the NLU component 160, etc. of the system components 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a user device, a first request including:
first audio data representing a first spoken input,
a first indication of a first wakeword being included in the first spoken input,
a device type associated with the user device, and
a first account identifier (ID) associated with the user device, the first account ID used by a first assistant system to identify a user;
determining, based at least in part on the first spoken input including the first wakeword, that the first spoken input is directed to a second assistant system;
sending, to a data storage component, a second request to receive a second account ID associated with the second assistant system and corresponding to the first account ID;
determining, using the device type, that the user device is enabled for multi-assistant operation;
in response to determining that the user device is enabled for multi-assistant operation, receiving, in response to the second request, the second account ID;
sending, to an automatic speech recognition (ASR) component, the first audio data and the second account ID to enable the ASR component to access first data associated with the second assistant system;
receiving, from the ASR component, first ASR results data corresponding to the first spoken input;
sending, to a natural language understanding (NLU) component, the first ASR results data and the second account ID to enable the NLU component to access the first data;
receiving, from the NLU component, first NLU results data corresponding to the first spoken input;
sending, to a post-NLU component, the first NLU results data and the second account ID to enable the post-NLU component to access the first data;
receiving, from the post-NLU component, second data indicating a first skill component is capable of responding to the first spoken input, the first skill component being authorized for use by the second assistant system;
determining, using the first skill component, first output data responsive to the first spoken input; and
sending, to the user device, the first output data.

2. The computer-implemented method of claim 1, further comprising:
- receiving, from the user device, a second request including second audio data representing a second spoken input, an indication of a second wakeword being included in the second spoken input, and the first account identifier (ID);
- determining, based at least in part on the second spoken input including the second wakeword, that the second spoken input is directed to the first assistant system;
- sending, to the ASR component, the second audio data and the first account ID to enable the ASR component to access third data associated with the first assistant system;
- receiving, from the ASR component, second ASR data corresponding to the first spoken input;
- sending, to the NLU component, the second ASR data and the first account ID to enable the NLU component to access the third data;
- receiving, from the NLU component, second NLU data corresponding to the second spoken input;
- sending, to a post-NLU component, the second NLU data and the first account ID to enable the post-NLU component to access the third data;
- receiving, from the post-NLU component, fourth data indicating a second skill component capable of responding to the second spoken input, the second skill component being authorized for use by the first assistant system;
- determining, using the second skill component, second output data responsive to the second spoken input; and
- sending, to the user device, the second output data.

3. The computer-implemented method of claim 1, further comprising:
- receiving, from the user device, a second request including:
  - second audio data representing a second spoken input,
  - a second indication of a second wakeword being included in the second spoken input, and
  - the first account identifier (ID);
- determining, based at least in part on the second spoken input including the second wakeword, that the second spoken input is directed to the first assistant system;
- associating the second spoken input with the first account ID;
- processing, the second spoken input associated with the first account ID using one or more system components;
- based at least in part on the processing, determining that the first assistant system is unable to respond to the second spoken input;
- determining that the second assistant system is capable of handling the second spoken input;
- determining, the second account ID corresponding to the first account ID, by accessing the data storage component storing an association between the first account ID and the second account ID, wherein the second account ID enables access to third data authorized for use by the first assistant system;
- associating the second spoken input with the second account ID;
- processing the second spoken input associated with the second account ID using the one or more system components to enables access to the first data;
- determining, based at least in part on the processing of the second spoken input, second output data responsive to the second spoken input; and
- sending, to the user device, the second output data.

4. The computer-implemented method of claim 1, further comprising:
- storing, in a data storage, third data including the first ASR results data, the first NLU results data and the second account ID;
- storing, in the data storage, fourth data including second ASR results data, second NLU results data, and the first account ID;
- receiving, from a training component, a request for data to be used to train a machine learning model for the second assistant system;
- sending, to the training component and in response to the request, the third data based at least in part on the request being received from the second assistant system;
- determining, by the training component and using at least the third data, a first machine learning model configured to perform NLU processing;
- receiving a second machine learning model configured to perform NLU processing and determined based at least in part on the fourth data;
- determining a third machine learning model using the first machine learning model and the second machine learning model; and
- configuring the NLU component using the third machine learning model.

5. A computer-implemented method comprising:
- receiving, from a user device, a first request including first audio data representing a first spoken input and a first account identifier (ID) associated with the user device, the first account ID used by a first assistant system to identify a user profile;
- determining, using the first audio data, that a first wakeword included in the first spoken input corresponds to a second assistant system;
- determining a second account ID corresponding to the first account ID, the second account ID used by the second assistant system to identify the user profile;
- associating the first spoken input with the second account ID;
- processing the first spoken input associated with the second account ID using one or more system components shared by the first assistant system and the second assistant system, wherein the second account ID enables access to first data to be used to process inputs corresponding to the second assistant system;
- determining, based at least in part on the processing of the first spoken input, a first output responsive to the first spoken input; and
- sending, to the user device, the first output.

6. The computer-implemented method of claim 5, further comprising:
- receiving, from the user device, a second request including second audio data representing a second spoken input and the first account identifier (ID);
- determining, using the second audio data, that a second wakeword included in the second spoken input corresponds to the first assistant system;
- associating the second spoken input with the first account ID;
- processing the second spoken input associated with the first account ID using the one or more system components, wherein the first account ID enables access to second data to be used to process inputs corresponding to the first assistant system;

determining, based at least in part on the processing of the second spoken input, a second output responsive to the second spoken input; and sending, to the user device, the second output.

7. The computer-implemented method of claim 5, further comprising:
   receiving, from the user device, a second request including second audio data representing a second spoken input and the first account identifier (ID);
   determining, using the second audio data, that a second wakeword included in the second spoken input corresponds to the first assistant system;
   associating the second spoken input with the first account ID;
   processing the second spoken input associated with the first account ID using the one or more system components, wherein the first account ID enables access to second data to be used to process inputs corresponding to the first assistant system;
   determining, based at least in part on the processing of the second spoken input, that the first assistant system is unable to handle the second spoken input; and
   sending, to an orchestrator component, an indication that the first assistant system is unable to handle the second spoken input, wherein the orchestrator component is permitted to access a data storage component storing an association between the first account ID and the second account ID.

8. The computer-implemented method of claim 7, further comprising:
   determining that the second assistant system is capable of handling the second spoken input;
   determining, by the orchestrator component, the second account ID corresponding to the first account ID;
   associating the second spoken input with the second account ID;
   processing the second spoken input associated with the second account ID using the one or more system components to enables access to the first data;
   determining, based at least in part on the processing of the second spoken input, a second output responsive to the second spoken input; and
   sending, to the user device, the second output.

9. The computer-implemented method of claim 7, further comprising:
   determining that the second assistant system is capable of handling the second spoken input;
   determining natural language output data representing that the second assistant system is capable of handling the second spoken input;
   determining, using text-to-speech (TTS) processing and voice parameters associated with the first assistant system, output audio data representing synthesized speech corresponding to the natural language output data; and
   sending, to the user device, the output audio data.

10. The computer-implemented method of claim 5, further comprising:
    based at least in part on the first spoken input being associated with the second account ID and the first wakeword, storing, using a data storage component, the first audio data and processing data related to the processing of the first spoken input, where the data storage component provides data for updating the one or more system components; and
    based at least in part on a second spoken input being associated with the first account ID and a second wakeword corresponding to the first assistant system, discarding second audio data corresponding to the second spoken input.

11. The computer-implemented method of claim 5, processing the first spoken input associated with the second account ID using the one or more system components comprises:
    determining a first skill component authorized for the first assistant system;
    determining a second skill component authorized for use for the second assistant system; and
    based at least in part on the first spoken input being associated with the second account ID, selecting the second skill component as capable of responding to the first spoken input.

12. The computer-implemented method of claim 5, further comprising:
    storing, in a data storage, second data including first ASR results data, first NLU results data and the first account ID;
    storing, in the data storage, third data including second ASR results data, second NLU results data, and the second account ID;
    receiving, from a first component, a second request for data to be used to train a first machine learning model for the first assistant system;
    sending, to the first component and in response to the second request, the second data based at least in part on the second request being related to the first assistant system;
    receiving, from a second component, a third request for data to be used to train a second machine learning model for the second assistant system; and
    sending, to the second component and in response to the third request, the third data based at least in part on the third request being related to the second assistant system.

13. A system, comprising:
    at least one processor; and
    at least one memory comprising instructions that, when executed by the at least one processor, cause the system to:
       receive, from a user device, a first request including first audio data representing a first spoken input and a first account identifier (ID) associated with the user device, the first account ID used by a first assistant system to identify a user profile;
       determine, using the first audio data, that a first wakeword included in the first spoken input corresponds to a second assistant system;
       determine a second account ID corresponding to the first account ID, the second account ID used by the second assistant system to identify the user profile;
       associate the first spoken input with the second account ID;
       process the first spoken input associated with the second account ID using one or more system components shared by the first assistant system and the second assistant system, wherein the second account ID enables access to first data to be used to process inputs corresponding to the second assistant system;
       determine, based at least in part on the processing of the first spoken input, a first output responsive to the first spoken input; and
       send, to the user device, the first output.

14. The system of claim 13, wherein the at least one memory further comprises instructions that, when executed by the at least one processor, further cause the system to:
- receive, from the user device, a second request including second audio data representing a second spoken input and the first account identifier (ID);
- determine, using the second audio data, that a second wakeword included in the second spoken input corresponds to the first assistant system;
- associate the second spoken input with the first account ID;
- process the second spoken input associated with the first account ID using the one or more system components, wherein the first account ID enables access to second data to be used to process inputs corresponding to the first assistant system;
- determine, based at least in part on the processing of the second spoken input, a second output responsive to the second spoken input; and
- send, to the user device, the second output.

15. The system of claim 13, wherein the at least one memory further comprises instructions that, when executed by the at least one processor, further cause the system to:
- receive, from the user device, a second request including second audio data representing a second spoken input and the first account identifier (ID);
- determine, using the second audio data, that a second wakeword included in the second spoken input corresponds to the first assistant system;
- associate the second spoken input with the first account ID;
- process the second spoken input associated with the first account ID using the one or more system components, wherein the first account ID enables access to second data to be used to process inputs corresponding to the first assistant system;
- determine, based at least in part on the processing of the second spoken input, that the first assistant system is unable to handle the second spoken input; and
- send, to an orchestrator component, an indication that the first assistant system is unable to handle the second spoken input, wherein the orchestrator component is permitted to access a data storage component storing an association between the first account ID and the second account ID.

16. The system of claim 15, wherein the at least one memory further comprises instructions that, when executed by the at least one processor, further cause the system to:
- determine that the second assistant system is capable of handling the second spoken input;
- determine, by the orchestrator component, the second account ID corresponding to the first account ID;
- associate the second spoken input with the second account ID;
- process the second spoken input associated with the second account ID using the one or more system components to enables access to the first data;
- determine, based at least in part on the processing of the second spoken input, a second output responsive to the second spoken input; and
- send, to the user device, the second output.

17. The system of claim 15, wherein the at least one memory further comprises instructions that, when executed by the at least one processor, further cause the system to:
- determine that the second assistant system is capable of handling the second spoken input;
- determine natural language output data representing that the second assistant system is capable of handling the second spoken input;
- determine, using text-to-speech (TTS) processing and voice parameters associated with the first assistant system, output audio data representing synthesized speech corresponding to the natural language output data; and
- send, to the user device, the output audio data.

18. The system of claim 13, wherein the at least one memory further comprises instructions that, when executed by the at least one processor, further cause the system to:
- based at least in part on the first spoken input being associated with the second account ID and the first wakeword, storing, using a data storage component, the first audio data and processing data related to the processing of the first spoken input, where the data storage component provides data for updating the one or more system components; and
- based at least in part on a second spoken input being associated with the first account ID and a second wakeword corresponding to the first assistant system, discard second audio data corresponding to the second spoken input.

19. The system of claim 13, wherein the at least one memory further comprises instructions that, when executed by the at least one processor, further cause the system to:
- determine a first skill component authorized for the first assistant system;
- determine a second skill component authorized for use for the second assistant system; and
- based at least in part on the first spoken input being associated with the second account ID, select the second skill component as capable of responding to the first spoken input.

20. The system of claim 13, wherein the at least one memory further comprises instructions that, when executed by the at least one processor, further cause the system to:
- store, in a data storage, second data including first ASR results data, first NLU results data and the first account ID;
- store, in the data storage, third data including second ASR results data, second NLU results data, and the second account ID;
- receive, from a first component, a second request for data to be used to train a first machine learning model for the first assistant system;
- send, to the first component and in response to the second request, the second data based at least in part on the second request being related to the first assistant system;
- receive, from a second component, a third request for data to be used to train a second machine learning model for the second assistant system; and
- send, to the second component and in response to the third request, the third data based at least in part on the third request being related to the second assistant system.

* * * * *